US012794642B2

(12) United States Patent
Gong et al.

(10) Patent No.: US 12,794,642 B2
(45) Date of Patent: Nov. 10, 2026

(54) TB PPDU TRANSMISSION METHOD AND RELATED APPARATUS

(71) Applicant: HUAWEI TECHNOLOGIES CO., LTD., Shenzhen (CN)

(72) Inventors: Bo Gong, Shenzhen (CN); Chenchen Liu, Shenzhen (CN); Jian Yu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 302 days.

(21) Appl. No.: 18/586,109

(22) Filed: Feb. 23, 2024

(65) Prior Publication Data

US 2024/0195582 A1 Jun. 13, 2024

Related U.S. Application Data

(63) Continuation of application No. PCT/CN2022/113586, filed on Aug. 19, 2022.

(30) Foreign Application Priority Data

Aug. 24, 2021 (CN) ......................... 202110976676.4

(51) Int. Cl.
*H04W 4/00* (2018.01)
*H04L 5/00* (2006.01)

(52) U.S. Cl.
CPC .................................. *H04L 5/0053* (2013.01)

(58) Field of Classification Search
CPC ... H04L 5/0053; H04L 5/0041; H04L 5/0049; H04W 84/12; H04W 72/0453
See application file for complete search history.

(56) References Cited

U.S. PATENT DOCUMENTS

| | | | | |
|---|---|---|---|---|
| 10,389,565 | B2 * | 8/2019 | Lin | H04L 47/34 |
| 12,401,470 | B2 * | 8/2025 | Dong | H04W 72/0453 |
| 2017/0317868 | A1 * | 11/2017 | Lin | H04L 1/0071 |
| 2020/0014509 | A1 * | 1/2020 | Asterjadhi | H04L 5/0041 |
| 2021/0068104 | A1 * | 3/2021 | Chen | H04L 5/0094 |
| 2021/0143955 | A1 | 5/2021 | Yang et al. | |
| 2021/0360628 | A1 * | 11/2021 | Kim | H04L 5/0037 |
| 2022/0255690 | A1 * | 8/2022 | Hu | H04L 1/0008 |

(Continued)

FOREIGN PATENT DOCUMENTS

CN 108702375 A 10/2018

OTHER PUBLICATIONS

Office Action in Japanese Appln. No. 2024-512171, mailed on Jan. 21, 2025, 17 pages (with English translation).

(Continued)

*Primary Examiner* — Abdelnabi O Musa
(74) *Attorney, Agent, or Firm* — Fish & Richardson P.C.

(57) ABSTRACT

This application relates to a TB PPDU transmission method and apparatus. The method includes: A station receives a triggering frame from an AP, where the triggering frame includes DRU indication information indicating information about a DRU allocated to the station, and the DRU is one or more of predefined discrete resource blocks. Then, the station determines, based on an indication of the DRU indication information, the DRU allocated to the station, and sends a TB PPDU by using the DRU allocated to the station.

20 Claims, 10 Drawing Sheets

(56) References Cited

U.S. PATENT DOCUMENTS

| | | | | |
|---|---|---|---|---|
| 2023/0035113 | A1* | 2/2023 | Shellhammer | H04L 5/0044 |
| 2023/0048884 | A1* | 2/2023 | Yang | H04L 5/0044 |
| 2023/0124579 | A1* | 4/2023 | Yang | H04L 5/0092<br>370/328 |

OTHER PUBLICATIONS

IEEE P802.11be™/D0.01, "Draft Standard for Information technology—Telecommunications and information exchange between systems; Local and metropolitan area networks—Specific requirements; Part 11: Wireless LAN Medium Access Control (MAC) and Physical Layer (PHY) Specifications; Amendment 7: Enhancements for extremely high throughput (EHT)," Jul. 2020, 33 pages.

IEEE Std 802.11a—1999, "Supplement to IEEE Standard for Information technology—Telecommunications and information exchange between systems; Local and metropolitan area networks—Specific requirements; Part 11: Wireless LAN Medium Access Control (MAC) and Physical Layer (PHY) specifications: High-speed Physical Layer in the 5 GHZ Band," Sep. 16, 1999, 90 pages.

IEEE Std 802.11b—1999/Cor 1-2001, "IEEE Standard for Information technology—Telecommunications and information exchange between systems; Local and metropolitan area networks—Specific requirements; Part 11: Wireless LAN Medium Access Control (MAC) and Physical Layer (PHY) specifications; Amendment 2: Higher-speed Physical Layer (PHY), extension in the 2.4 GHz band-Corrigendum 1," Nov. 7, 2001, 24 pages.

IEEE Std 802.11g™—2003, "IEEE Standard for Information technology—Telecommunications and information exchange between systems; Local and metropolitan area networks—Specific requirements; Part 11: Wireless LAN Medium Access Control (MAC) and Physical Layer (PHY) specifications; Amendment 4: Further Higher Data Rate Extension in the 2.4 GHz Band," Jun. 27, 2003, 78 pages.

IEEE Std 802.11n™—2009, "IEEE Standard for Information technology—Telecommunications and information exchange between systems; Local and metropolitan area networks—Specific requirements; Part 11: Wireless LAN Medium Access Control (MAC) and Physical Layer (PHY) specifications; Amendment 5:Enhancements for Higher Throughput," Oct. 29, 2009, 536 pages.

IEEE P802.11ax™/D8.0, "Draft Standard for Information technology—Telecommunications and information exchange between systems; Local and metropolitan area networks—Specific requirements; Part 11: Wireless LAN Medium Access Control (MAC) and Physical Layer (PHY) Specifications; Amendment 1: Enhancements for High Efficiency WLAN," Oct. 2020, 820 pages.

IEEE Std 802.11ac™—2013, "IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," Dec. 11, 2013, 425 pages.

Office Action in Australian Appln. No. 2022334501, mailed on Sep. 25, 2024, 3 pages.

* cited by examiner

TB PPDU TRANSMISSION METHOD AND RELATED APPARATUS

CROSS-REFERENCE TO RELATED APPLICATIONS

This application is a continuation of International Application No. PCT/CN2022/113586, filed on Aug. 19, 2022, which claims priority to Chinese Patent Application No. 202110976676.4, filed on Aug. 24, 2021. The disclosures of the aforementioned applications are hereby incorporated by reference in their entireties.

TECHNICAL FIELD

This application relates to the field of wireless communication technologies, and in particular, to a trigger-based physical layer protocol data unit (trigger-based physical layer protocol data unit, TB PPDU) transmission method and a related apparatus.

BACKGROUND

The Federal Communications Commission of the United States issues a regulation on the 6 GHz spectrum recently. The regulation defines a low power indoor (low power indoor, LPI) communication mode, and strictly limits a maximum transmit power and a maximum frequency spectral density. For a station (Station, STA), a maximum transmit power is limited to 24 dBm and a maximum power spectral density is limited to −1 dBm/MHz. That is, a transmit power of a device is limited by both a maximum power and a maximum power spectral density. To be specific, the transmit power cannot exceed a maximum power value, and a transmit power spectral density cannot exceed the maximum power spectral density, either. The maximum power spectral density is more strictly limited than the maximum power, and an allowed maximum transmit power is usually more limited by the power spectral density. For the station, when a bandwidth is 320 MHz, a transmit power of the station reaches a limit of a specified maximum power. When a bandwidth is less than 320 MHz, due to a limitation of the maximum power spectral density, the station can only use a lower power (herein, a power lower than the specified maximum power) for sending.

In addition, Europe also issues a regulation on the 6 GHz spectrum recently. For the LPI communication mode, the maximum transmit power is limited to 23 dBm, and the maximum power spectral density is limited to 10 dBm/MHz. When a bandwidth does not exceed 20 MHz, a transmit power of an access point (access point, AP)/a STA is mainly limited by the power spectral density. When a bandwidth is greater than 20 MHz, a transmit power of an AP/a STA is mainly limited by the maximum power.

A 20 MHz bandwidth is used as an example. In this case, the transmit power of the station is mainly limited by the power spectral density. Therefore, for the 20 MHz bandwidth, how to increase the transmit power of the STA without an increase of the power spectral density, to obtain a higher gain becomes an urgent problem to be resolved.

SUMMARY

Embodiments of this application provide a TB PPDU transmission method and a related apparatus, to increase a transmit power of a STA without an increase of a power spectral density, to obtain a higher gain.

The following describes this application from different aspects. It should be understood that mutual reference may be made to the following implementations and beneficial effects of the different aspects.

According to a first aspect, this application provides a TB PPDU transmission method. The method includes: A station receives a triggering frame (triggering frame), where the triggering frame includes discrete resource unit (Distributed resource unit, DRU) indication information, and the DRU indication information indicates information about a DRU allocated to the station; and the station determines, based on the DRU indication information, the DRU allocated to the station, and sends a TB PPDU by using the DRU allocated to the station. An operating bandwidth of the station is 20 MHz, and the DRU allocated to the station is one or more of predefined discrete resource blocks. An absolute value of a difference between indices of any two data subcarriers in each resource block in the predefined discrete resource blocks is greater than 1. The discrete RU is also referred to as a distributed RU, and corresponds to a continuous RU. The continuous RU is an RU including a plurality of contiguous subcarriers. Correspondingly, the discrete RU includes a plurality of subcarriers that are discrete in frequency domain. It should be understood that the resource block is also referred to as a resource unit, and the resource block and the resource unit are interchangeably used.

It can be learned that, because a bandwidth spanned by the discrete RU from a low-frequency start location to a high-frequency end location in frequency domain is greater than a frequency domain bandwidth occupied by the continuous RU, when maximum power spectral densities are the same, a total transmit power of the discrete RU is higher than a total transmit power of the continuous RU. In other words, when a power spectral density is limited, a limited quantity of subcarriers (for example, 26 subcarriers included in a 26-tone RU) are discretized on a larger bandwidth, that is, more subcarriers (for example, odd-numbered subcarriers in two 26-tone RUs), so that a transmit power can be increased. Therefore, in comparison with a solution in which a continuous RU is used, in this solution, subcarriers included in a resource unit are discretized on a larger bandwidth. When data is transmitted by using a discrete RU, a transmit power of a STA can be increased without an increase of a power spectral density, to obtain a higher gain.

According to a second aspect, this application provides a TB PPDU transmission method. The method includes: An access point sends a triggering frame, where the triggering frame includes DRU indication information, and the DRU indication information indicates information about a DRU allocated to a station; and the access point receives a TB PPDU on the DRU. An operating bandwidth of the station is 20 MHz, and the DRU allocated to the station is one or more of predefined discrete resource blocks. An absolute value of a difference between indices of any two data subcarriers in each resource block in the predefined discrete resource blocks is greater than 1. It should be understood that the AP may simultaneously allocate a resource unit to one or more stations. For ease of description, an example in which the AP allocates a DRU to one station is used for description herein.

According to a third aspect, this application provides a communication apparatus. The communication apparatus may be a station or a chip, for example, a Wi-Fi chip, in a station. The communication apparatus includes: a transceiver unit, configured to receive a triggering frame (triggering frame), where the triggering frame includes discrete resource unit DRU indication information, the DRU indication information indicates information about a DRU allocated to the communication apparatus, an operating bandwidth of the communication apparatus is 20 MHz, the DRU is one or more of predefined discrete resource blocks, and an absolute value of a difference between indices of any two data subcarriers in each resource block in the predefined discrete resource blocks is greater than 1; and a determining unit, configured to determine, based on an indication of the DRU indication information, the DRU allocated to the station. The transceiver unit is further configured to send a TB PPDU by using the DRU.

According to a fourth aspect, this application provides a communication apparatus. The communication apparatus may be an access point or a chip, for example, a Wi-Fi chip, in an access point. The communication apparatus includes: a transceiver unit, configured to send a triggering frame, where the triggering frame includes discrete resource unit DRU indication information, the DRU indication information indicates information about a DRU allocated to a station, an operating bandwidth of the station is 20 MHz, the DRU is one or more of predefined discrete resource blocks, and an absolute value of a difference between indices of any two data subcarriers in each resource block in the predefined discrete resource blocks is greater than 1. The transceiver unit is further configured to receive a TB PPDU on the DRU.

In a possible implementation of any one of the foregoing aspects, the triggering frame includes a type of control frame in a MAC frame specified in a standard, where the type of control frame is referred to as a trigger frame (trigger frame), for example, a trigger frame in 802.11be, or may be another MAC frame having a trigger function. The another MAC frame having a trigger function may also be referred to as a MAC frame having a TRS (triggered response scheduling, triggered response scheduling) function, and the function is generally implemented by using a TRS control subfield (TRS control subfield) included in the MAC frame. In a specific example, the DRU indication information may be carried in an RU allocation field in a user information field in the trigger frame, or may be carried in an RU allocation field in the TRS control subfield in the another MAC frame.

In a possible implementation of any one of the foregoing aspects, the DRU indication information indicates a size and a location of the DRU allocated to the station. The size of the DRU refers to a quantity of subcarriers in the DRU, and the location of the DRU refers to a location of a subcarrier in the DRU in frequency domain. For example, the DRU indication information is carried in an RU allocation subfield, an uplink bandwidth subfield, an uplink bandwidth extension subfield, and a primary/secondary 160 subfield.

In a possible implementation of any one of the foregoing aspects, the predefined discrete resource blocks include nine discrete resource blocks DRUs 26 in each of which a quantity of subcarriers is 26. Indices of the subcarriers included in the DRU 26 comply with Table 4a or Table 4b in the following embodiment. Details are not described herein. The predefined discrete resource blocks include four discrete resource blocks DRUs 52 in each of which a quantity of subcarriers is 52. Indices of the subcarriers included in the DRU 52 comply with Table 5 in the following embodiment. Details are not described herein. The predefined discrete resource blocks include two discrete resource blocks DRUs 106 in each of which a quantity of subcarriers is 106. Indices of the subcarriers included in the DRU 106 comply with Table 6 in the following embodiment. Details are not described herein.

In a possible implementation of any one of the foregoing aspects, the predefined discrete resource blocks include nine discrete resource blocks DRUs 26 in each of which a quantity of subcarriers is 26. Indices of the subcarriers included in the DRU 26 comply with Table 7a or Table 7b. Details are not described herein. The predefined discrete resource blocks include four discrete resource blocks DRUs 52 in each of which a quantity of subcarriers is 52. Indices of the subcarriers included in the DRU 52 comply with Table 8 in the following embodiment. Details are not described herein. The predefined discrete resource blocks include two discrete resource blocks DRUs 106 in each of which a quantity of subcarriers is 106. Indices of the subcarriers included in the DRU 106 comply with Table 9 in the following embodiment. Details are not described herein.

In a possible implementation of any one of the foregoing aspects, the predefined discrete resource blocks include nine discrete resource blocks DRUs 26 in each of which a quantity of subcarriers is 26. Indices of the subcarriers included in the DRU 26 comply with Table 10a or Table 10b. Details are not described herein. The predefined discrete resource blocks include four discrete resource blocks DRUs 52 in each of which a quantity of subcarriers is 52. Indices of the subcarriers included in the DRU 52 comply with Table 11 in the following embodiment. Details are not described herein. The predefined discrete resource blocks include two discrete resource blocks DRUs 106 in each of which a quantity of subcarriers is 106. Indices of the subcarriers included in the DRU 106 comply with Table 12 in the following embodiment. Details are not described herein.

It can be learned that, in the foregoing three implementations of the predefined discrete resource blocks, when the power spectral density is given, a maximum power amplification multiple can be reached for each DRU on a 20 MHz bandwidth in comparison with a continuous RU having a same size as the DRU. An example in which a station performs uplink transmission by using a 26-tone DRU is used. 13 contiguous subcarriers are randomly selected. It is assumed that a quantity of subcarriers carrying a signal in uplink transmission of the station does not exceed 2. In this case, in comparison with a case in which a 26-tone continuous RU is used, a power of the station can be increased by 13/2=6.5 times. If the power is further amplified, only 13 contiguous subcarriers can be randomly selected, and a maximum of one data/pilot subcarrier is included to carry a signal. In this case, at least 13*26=338 subcarriers are required to discretize 26 subcarriers that are in the 26-tone DRU and that carry a signal. This exceeds a quantity of subcarriers (256 subcarriers) included on the 20 MHz bandwidth, and cannot be implemented. Therefore, for the 26-tone DRU, 6.5 times is a maximum power amplification multiple. The same applies to a 52-tone DRU and a 106-tone DRU.

Optionally, the foregoing three types of predefined discrete resource blocks have one or more of the following characteristics.

(1) A change of a quantity of subcarriers spaced between two adjacent data subcarriers whose indices are both positive numbers or both negative numbers does not exceed 1 or 2.

(2) There are at least 12 subcarriers spaced between two adjacent data subcarriers whose indices are a positive number and a negative number and that are included in the predefined discrete resource block.

It should be noted that the two adjacent data subcarriers are adjacent data subcarriers whose subcarrier indices are arranged in ascending order of frequencies.

Optionally, the foregoing three types of predefined discrete resource blocks follow one or more of the following characteristics a, b, and c.

a. A data subcarrier set and a pilot subcarrier set are included. For each 26-tone DRU and each 52-tone DRU on the 20 MHz bandwidth, a used data subcarrier set includes 216 subcarriers, and a used pilot subcarrier set includes 18 subcarriers. For each 106-tone DRU on the 20 MHz bandwidth, a used data subcarrier set includes 228 subcarriers, and a used pilot subcarrier set includes eight subcarriers.

b. The data subcarrier set includes M subcarrier sets (tone sets), where M is greater than 18, and M is a positive integer. Preferably, M is 36 or 72. Quantities of subcarriers included in all subcarrier sets are the same, and indices of the subcarriers are evenly distributed as much as possible. Specific subcarriers included in the M data subcarrier sets comply with Table 13, Table 17, or Table 21 in the following embodiment. Details are not described herein.

c. Data subcarriers in DRUs (or the foregoing three types of predefined discrete resource blocks) on the 20 MHz bandwidth include a plurality of evenly discrete subcarrier sets in the M subcarrier sets. For subcarrier sets that are in the M subcarrier sets and that are specifically included in the data subcarriers in the DRUs (or the foregoing three types of predefined discrete resource blocks) on the 20 MHz bandwidth, refer to a description in the following embodiment. Details are not described herein.

That the indices of the subcarriers are "evenly distributed as much as possible" means that a quantity of subcarriers spaced between two adjacent data subcarriers whose indices are both positive numbers or negative numbers in each group of data subcarriers is greater than 1. Spacings are the same as much as possible, or a change of a spacing does not exceed 1 or 2. In addition, two adjacent data subcarriers whose indices are one positive number and one negative number in each group of data subcarriers are spaced by at least 46 subcarriers.

For example, in this solution, the data subcarrier set may include 36 groups, and each group includes six subcarriers. This can ensure sufficient discretization of the data subcarriers. For example, a 26-tone DRU includes four groups of data subcarriers in the data subcarrier set, and the four groups of data subcarriers included in the 26-tone DRU have a characteristic of a largest and even subcarrier spacing. Further, the 26-tone DRU includes two pilot subcarriers, and the pilot subcarriers follow a principle of one positive frequency and one negative frequency, to ensure that a pilot subcarrier spacing is large enough and data/pilot subcarriers are discrete enough.

Further, in this solution, a 52-tone DRU or a 106-tone DRU includes a plurality of 26-tone DRUs. In other words, it may also be understood that the 52-tone DRU or the 106-tone DRU is obtained by merging/combining the plurality of 26-tone DRUs. The plurality of 26-tone DRUs included in the 52-tone DRU or the 106-tone DRU follow a principle of even allocation and a largest spacing, to ensure that a spacing of carriers included in the DRU is as large as possible. This increases a transmit power.

According to a fifth aspect, this application provides a communication apparatus. The communication apparatus is specifically a station or a chip, for example, a Wi-Fi chip, in a station. The communication apparatus includes a processor and a transceiver. The transceiver is configured to receive a triggering frame (triggering frame), where the triggering frame includes discrete resource unit DRU indication information, the DRU indication information indicates information about a DRU allocated to the communication apparatus, an operating bandwidth of the communication apparatus is 20 MHz, the DRU is one or more of predefined discrete resource blocks, and an absolute value of a difference between indices of any two data subcarriers in each resource block in the predefined discrete resource blocks is greater than 1. The processor is configured to determine, based on an indication of the DRU indication information, the DRU allocated to the station. The transceiver is further configured to send a TB PPDU by using the DRU.

According to a sixth aspect, this application provides a communication apparatus. The communication apparatus is specifically an access point or a chip, for example, a Wi-Fi chip, in a station. The communication apparatus includes a transceiver. The transceiver is configured to send a triggering frame, where the triggering frame includes discrete resource unit DRU indication information, the DRU indication information indicates information about a DRU allocated to a station, an operating bandwidth of the station is 20 MHz, the DRU is one or more of predefined discrete resource blocks, and an absolute value of a difference between indices of any two data subcarriers in each resource block in the predefined discrete resource blocks is greater than 1. The transceiver is further configured to receive a TB PPDU on the DRU.

Optionally, the communication apparatus may further include a processor, configured to generate the triggering frame.

According to a seventh aspect, this application provides an apparatus. The apparatus is implemented in a product form of a chip, and includes an input/output interface and a processing circuit. The apparatus is a chip in a station. The input/output interface is configured to input or output data or information, and the processing circuit is configured to process the data or the information. For example, the input/output interface is configured to input a triggering frame (triggering frame) received through an antenna and a radio frequency circuit, where the triggering frame includes discrete resource unit DRU indication information, the DRU indication information indicates information about a DRU allocated to the station, an operating bandwidth of the station is 20 MHz, the DRU is one or more of predefined discrete resource blocks, and an absolute value of a difference between indices of any two data subcarriers in each resource block in the predefined discrete resource blocks is greater than 1. The processing circuit is configured to determine, based on an indication of the DRU indication information, the DRU allocated to the station. The input/output interface is further configured to: output a TB PPDU, and send the TB PPDU through the antenna by using the DRU after the TB PPDU is processed through the antenna and the radio frequency circuit.

According to an eighth aspect, this application provides an apparatus. The apparatus is implemented in a product form of a chip, includes an input/output interface, and optionally further includes a processing circuit. The apparatus is a chip in an access point. The input/output interface is configured to input or output data or information, and the processing circuit is configured to process the data or the information. For example, the processing circuit is configured to generate a triggering frame. The input/output interface is configured to: output the triggering frame, and send the triggering frame through the antenna after the triggering frame is processed through an antenna and a radio frequency circuit, where the triggering frame includes discrete resource unit DRU indication information, the DRU indication information indicates information about a DRU allocated to a station, an operating bandwidth of the station is 20 MHz, and the DRU is one of predefined discrete resource blocks. The input/output interface is further configured to input a TB PPDU received on the DRU through the antenna and the radio frequency circuit.

It should be noted that the communication apparatus provided in the third aspect, the fifth aspect, or the seventh aspect may implement any one of the first aspect and the possible implementations of the first aspect, and the communication apparatus provided in the fourth aspect, the sixth aspect, or the eighth aspect may implement any one of the second aspect and the possible implementations of the second aspect. For specific implementations and beneficial effects, refer to descriptions of the first aspect and the possible implementations of the first aspect, and the second aspect and the possible implementations of the second aspect. For brevity, details are not described herein again.

According to a ninth aspect, this application provides an apparatus, including at least one processor and a memory. The memory is configured to store a computer program or instructions. When the apparatus runs, the at least one processor executes the computer program or the instructions, so that the communication apparatus performs the method according to the first aspect or the implementations of the first aspect or the method according to the second aspect or the implementations of the second aspect.

Optionally, the apparatus further includes a transceiver, and the transceiver is configured to receive or send information or a signal.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read only memory (read only memory, ROM). The memory and the processor may be integrated on a same chip, or may be separately disposed on different chips. A type of the memory and a manner of disposing the memory and the processor are not limited in embodiments of this application.

According to a tenth aspect, this application provides a computer-readable storage medium. The computer-readable storage medium stores program instructions. When the program instructions are run on a computer, the computer is enabled to perform the TB PPDU transmission method according to either of the first aspect and the second aspect.

According to an eleventh aspect, this application provides a computer program product including program instructions. When the program instructions are run on a computer, the computer is enabled to perform the TB PPDU transmission method according to either of the first aspect or the second aspect.

According to embodiments of this application, a transmit power of a STA can be increased without an increase of a power spectral density, to obtain a higher gain.

BRIEF DESCRIPTION OF DRAWINGS

To describe technical solutions in embodiments of this application more clearly, the following briefly describes the accompanying drawings used for describing the embodiments.

DESCRIPTION OF EMBODIMENTS

Figure 1:
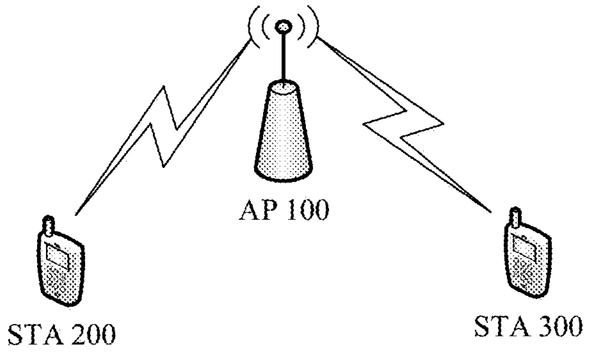
FIG. 1 is a schematic diagram of an architecture of a wireless communication system according to an embodiment of this application.

The following clearly describes the technical solutions in embodiments of this application with reference to the accompanying drawings in embodiments of this application.

In descriptions of this application, unless otherwise specified, "/" means "or". For example, A/B may indicate A or B. A term "and/or" in this specification describes only an association relationship between associated objects and indicates that there may be three relationships. For example, A and/or B may indicate the following three cases: Only A exists, both A and B exist, and only B exists. In addition, "at least one" means one or more, and "a plurality of" means two or more. "At least one of the following items (pieces)" or a similar expression thereof indicates any combination of these items, including a single item (piece) or any combination of a plurality of items (pieces). For example, at least one item (piece) of a, b, or c may indicate a, b, c, a and b, a and c, b and c, or a, b, and c. a, b, and c each may be singular or plural.

In the descriptions of this application, terms such as "first" and "second" do not limit a quantity or an execution sequence, and the terms such as "first" and "second" do not indicate a definite difference.

In this application, the word such as "example" or "for example" represents giving an example, an illustration, or a description. Any embodiment or design scheme described by using "example", "in an example", or "for example" in this application should not be construed as being more preferred or having more advantages than another embodiment or design scheme. Exactly, use of the word "example", "in an example", "for example", or the like is intended to present a related concept in a specific manner.

It should be understood that, in this application, "when" and "if" mean that an apparatus performs corresponding processing in an objective situation, but do not constitute a limitation on time, do not require that the apparatus should have a determining action during implementation, and do not mean any other limitation.

In this application, an element represented in a singular form is intended to indicate "one or more", but does not indicate "only one", unless otherwise specified.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

In this application, unless otherwise specified, for same or similar parts in embodiments or implementations, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The following implementations of this application are not intended to limit the protection scope of this application.

For ease of understanding a method provided in embodiments of this application, the following describes a system architecture of the method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions provided in this application may be applied to various communication systems, for example, a system using the 802.11 standard. For example, the 802.11 standard includes but is not limited to the 802.11be standard or a next-generation 802.11 standard. The technical solutions in this application are applied to a scenario of communication between an AP and one or more STAs, communication between APs, or communication between STAs. In embodiments of this application, the term "communication" may also be described as "data transmission", "information transmission", or "transmission".

FIG. 1 is a schematic diagram of an architecture of a wireless communication system according to an embodiment of this application. As shown in FIG. 1, the wireless communication system may include one or more APs (for example, an AP 100 in FIG. 1) and one or more STAs (for example, a STA 200 and a STA 300 in FIG. 1). The AP and the STA support a WLAN communication protocol. The communication protocol may include 802.11be (or referred to as Wi-Fi 7, an extremely high throughput (extremely high throughput, EHT) protocol), and may further include protocols such as 802.11ax and 802.11ac. Certainly, the communication protocol may further include a next-generation protocol of 802.11be and the like with continuous evolution and development of communication technologies. A WLAN is used as an example. An apparatus for implementing the method in this application may be an AP or a STA in the WLAN, or a chip or a processing system installed in an AP or a STA.

Optionally, an access point (for example, the AP 100 in FIG. 1) in this application is an apparatus having a wireless communication function, supports in performing communication by using a wireless local area network (wireless local area network, WLAN) protocol, has a function of communicating with another device (for example, a station or another access point) in a WLAN network, and certainly, may further have a function of communicating with another device. In a WLAN system, the access point may be referred to as an access point station (access point station, AP STA). The apparatus having a wireless communication function may be an entire device, or may be a chip or a processing system installed in an entire device. The device in which the chip or the processing system is installed may implement the method and the function in embodiments of this application under control of the chip or the processing system. The AP in embodiments of this application is an apparatus that provides a service for the STA, and may support the 802.11 series protocols. For example, the AP may be a communication entity such as a communication server, a router, a switch, or a bridge. The AP may include a macro base station, a micro base station, a relay station, and the like in various forms. Certainly, the AP may alternatively be a chip or a processing system in these devices in various forms, to implement the method and the function in embodiments of this application.

Optionally, a station (for example, the STA 200 or the STA 300 in FIG. 1) in this application is an apparatus having a wireless communication function, supports in performing communication by using a WLAN protocol, and has a capability of communicating with another station or an access point in a WLAN network. In a WLAN system, the station may be referred to as a non-access point station (non-access point station, non-AP STA). For example, the STA is any user communication device that allows a user to communicate with an AP and further communicate with a WLAN. The apparatus having a wireless communication function may be an entire device, or may be a chip or a processing system installed in an entire device. The device in which the chip or the processing system is installed may implement the method and the function in embodiments of this application under control of the chip or the processing system. For example, the STA may be user equipment that can connect to the internet, for example, a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), or a mobile phone; or may be an internet of things node in the internet of things, an in-vehicle communication apparatus in the internet of vehicles, an entertainment device, a game device or system, a global positioning system device, or the like. The STA may alternatively be a chip and a processing system in the foregoing terminals.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops, and warehousing. Certainly, a device (for example, an access point or a station) that supports WLAN communication may be a sensor node (for example, a smart water meter, a smart electricity meter, or a smart air detection node) in a smart city, a smart device (for example, a smart camera, a projector, a display, a television, a speaker, a refrigerator, or a washing machine) in a smart home, a node in the internet of things, an entertainment terminal (for example, a wearable device such as augmented reality (augmented reality, AR) or virtual reality (virtual reality, VR)), a smart device (for example, a printer, a projector, a loudspeaker, or a speaker) in a smart office, an internet of vehicles device in the internet of vehicles, infrastructure (for example, a vending machine, a self-service navigation console in a supermarket, a self-service cashier, or a self-service ordering machine) in a daily life scenario, a device in a large-scale stadium or music venue, or the like. Specific forms of the STA and the AP are not limited in embodiments of this application, and are merely examples for description herein.

Figure 2A:
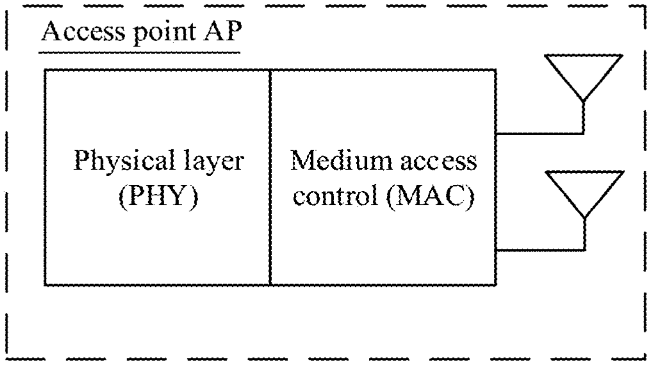
FIG. 2*a* is a schematic diagram of a structure of an access point according to an embodiment of this application.
Figure 2B:
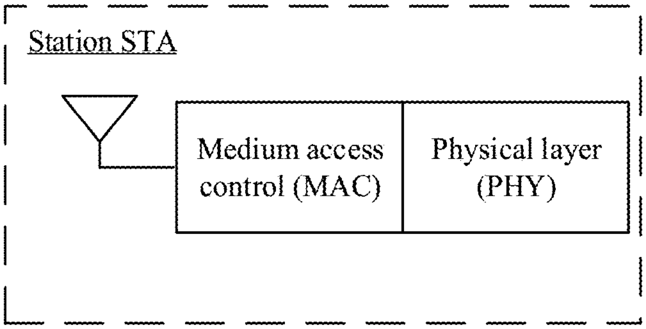
FIG. 2*b* is a schematic diagram of a structure of a station according to an embodiment of this application.

It should be understood that the 802.11 standard focuses on a physical layer (physical layer, PHY) and a medium access control (medium access control, MAC) layer. Refer to FIG. 2*a* for an example. FIG. 2*a* is a schematic diagram of a structure of an access point according to an embodiment of this application. The AP may be a multi-antenna/multi-radio frequency AP, or may be a single-antenna/single-radio frequency AP. The antenna/radio frequency is configured to send/receive a data packet (the data packet in this specification may also be referred to as a physical layer protocol data unit, that is, a PPDU). In an implementation, an antenna part or a radio frequency part of the AP may be separated from a main body of the AP, that is, may be remotely disposed. In FIG. 2*a*, the AP may include a physical layer processing circuit and a medium access control processing circuit. The physical layer processing circuit may be configured to process a physical layer signal, and the MAC layer processing circuit may be configured to process a MAC layer signal. Refer to FIG. 2*b* for another example. FIG. 2*b* is a schematic diagram of a structure of a station according to an embodiment of this application. FIG. 2*b* is a schematic diagram of a structure of a single-antenna/radio frequency STA. In an actual scenario, the STA may alternatively be a multi-antenna/multi-radio frequency STA, and may be a device having more than two antennas. The antenna/radio frequency is configured to send/receive a data packet. In an implementation, an antenna part or a radio frequency part of the STA may be separated from a main body of the STA, that is, may be remotely disposed. In FIG. 2*b*, the STA may include a PHY processing circuit and a MAC processing circuit. The physical layer processing circuit may be configured to process a physical layer signal, and the MAC layer processing circuit may be configured to process a MAC layer signal.

The foregoing content briefly describes the system architecture in embodiments of this application. To better understand the technical solutions in embodiments of this application, the following describes content related to embodiments of this application.

1. Carrier Plan (Tone Plan) Based on a Resource Unit (Resource Unit, RU)

The 802.11ax standard (also referred to as a high efficiency (high efficiency, HE) standard) supports bandwidth configurations of 20 MHz, 40 MHz, 80 MHz, 160 MHz, and 80+80 MHz. A difference between 160 MHz and 80+80 MHz lies in that 160 MHz is a contiguous frequency band, and 80+80 MHz is two discontiguous 80 MHz (each 80 MHz is a contiguous frequency band). To meet ultra-large bandwidth, ultra-high transmission rate, and ultra-high throughput requirements of users, the 802.11be standard (also referred to as the EHT standard) expands a bandwidth from 160 MHz to 320 MHz. In other words, the 802.11be standard supports a bandwidth configuration of 320 MHz/160+160 MHz. In addition, in the 802.11be standard, resource allocation is performed in a unit of RU. The following separately describes subcarrier distributions and RU distributions of different bandwidth sizes.

Figure 3:
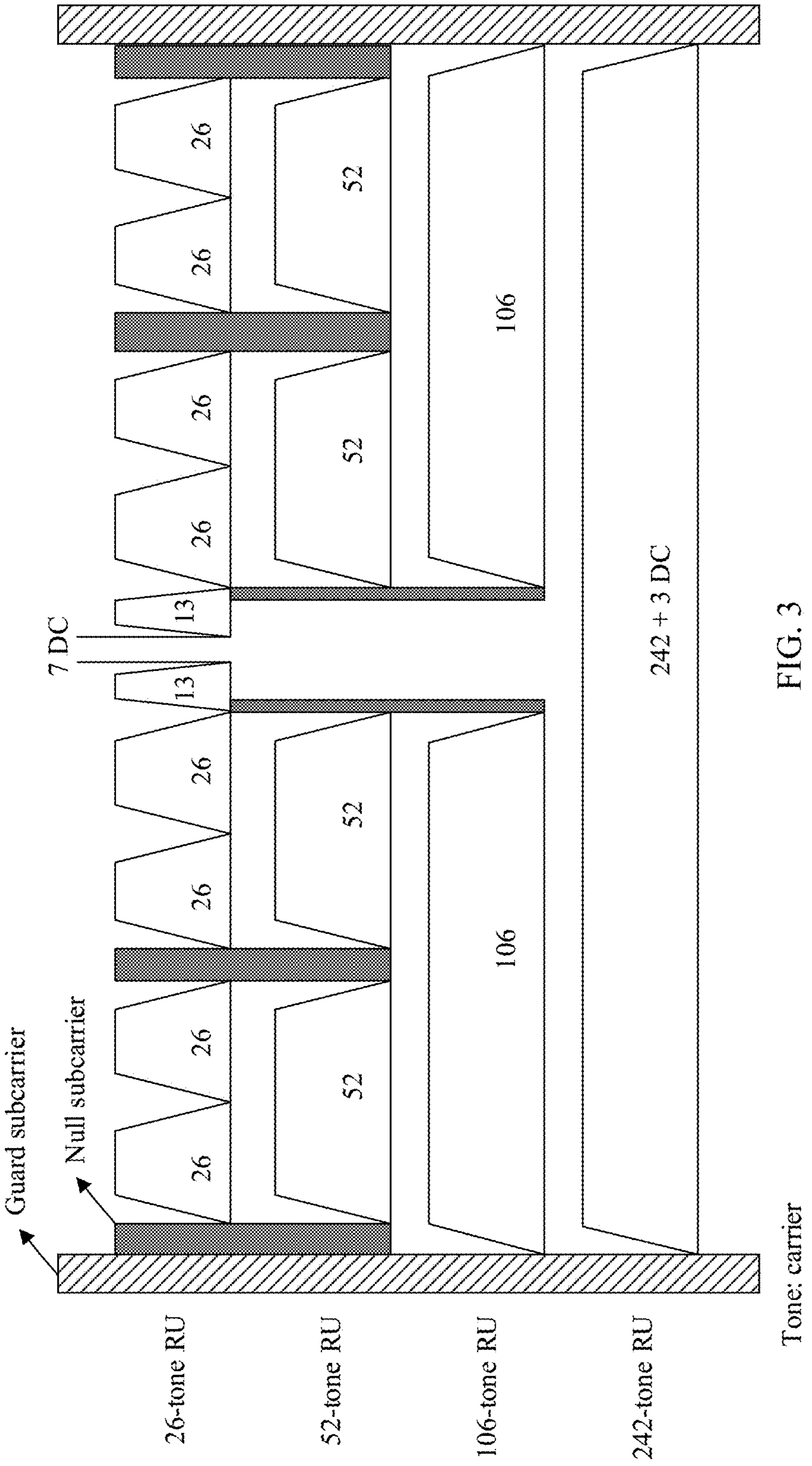
FIG. 3 is a schematic diagram of a subcarrier distribution and a continuous RU distribution of 20 MHz.

FIG. 3 is a schematic diagram of a subcarrier distribution and an RU distribution of 20 MHz. As shown in FIG. 3, when a bandwidth is 20 MHz, the entire bandwidth (that is, 20 MHz) includes one 242-tone RU, or includes various combinations of a 26-tone RU, a 52-tone RU, and a 106-tone RU. Each RU includes a data subcarrier and a pilot subcarrier, the data subcarrier is used to carry data information, and the pilot subcarrier is used to estimate a phase offset and/or a frequency offset. In addition to the RU, the 20 MHz bandwidth further includes some guard (guard) subcarriers, null subcarriers, and/or direct current (direct current, DC) subcarriers. Specifically, for a range (subcarrier range) of subcarriers included in the RU, refer to Table 27-7 in 802.11ax.

It should be understood that the 242-tone RU may be understood as an RU including 242 subcarriers. Similarly, the 26-tone RU may be understood as an RU including 26 subcarriers, the 52-tone RU may be understood as an RU including 52 subcarriers, and the 106-tone RU may be understood as an RU including 106 subcarriers.

Figure 4:
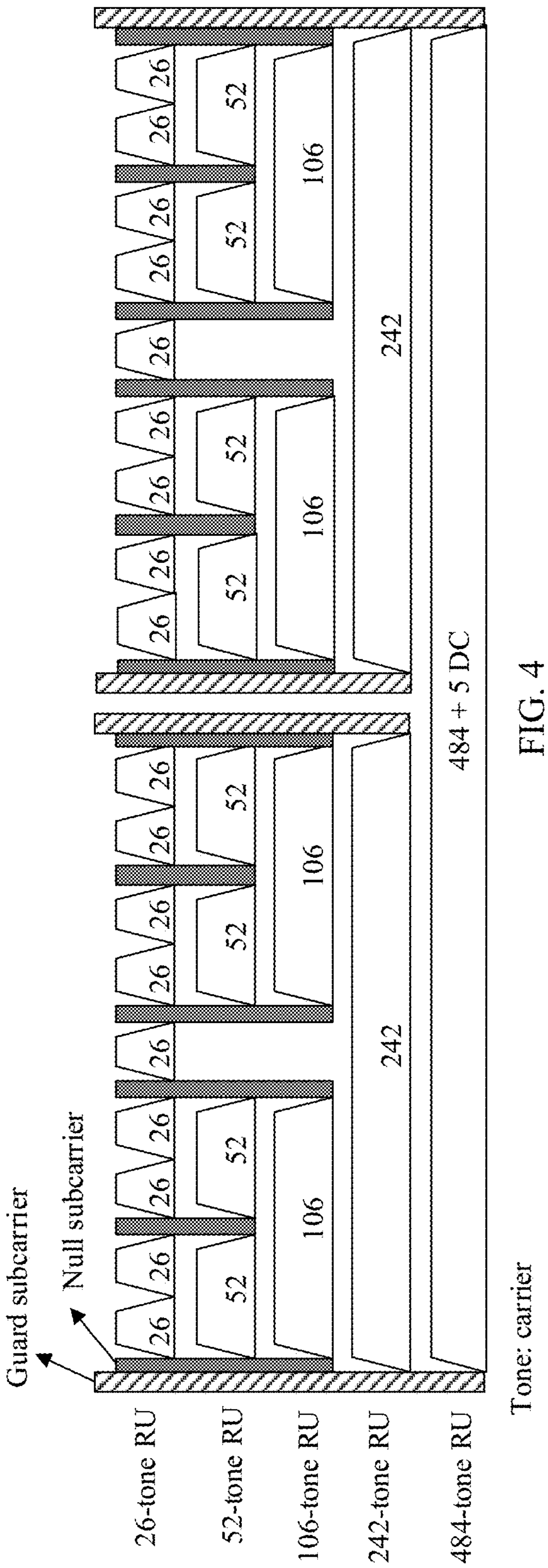
FIG. 4 is a schematic diagram of a subcarrier distribution and a continuous RU distribution of 40 MHz.

FIG. 4 is a schematic diagram of a subcarrier distribution and an RU distribution of 40 MHz. As shown in FIG. 4, an entire bandwidth (that is, 40 MHz) includes one 484-tone RU, or includes various combinations of a 26-tone RU, a 52-tone RU, a 106-tone RU, and a 242-tone RU. The 484-tone RU may be understood as an RU including 484 subcarriers. Specifically, for a range of subcarriers included in the RU, refer to Table 27-8 in 802.11ax.

Figure 5:
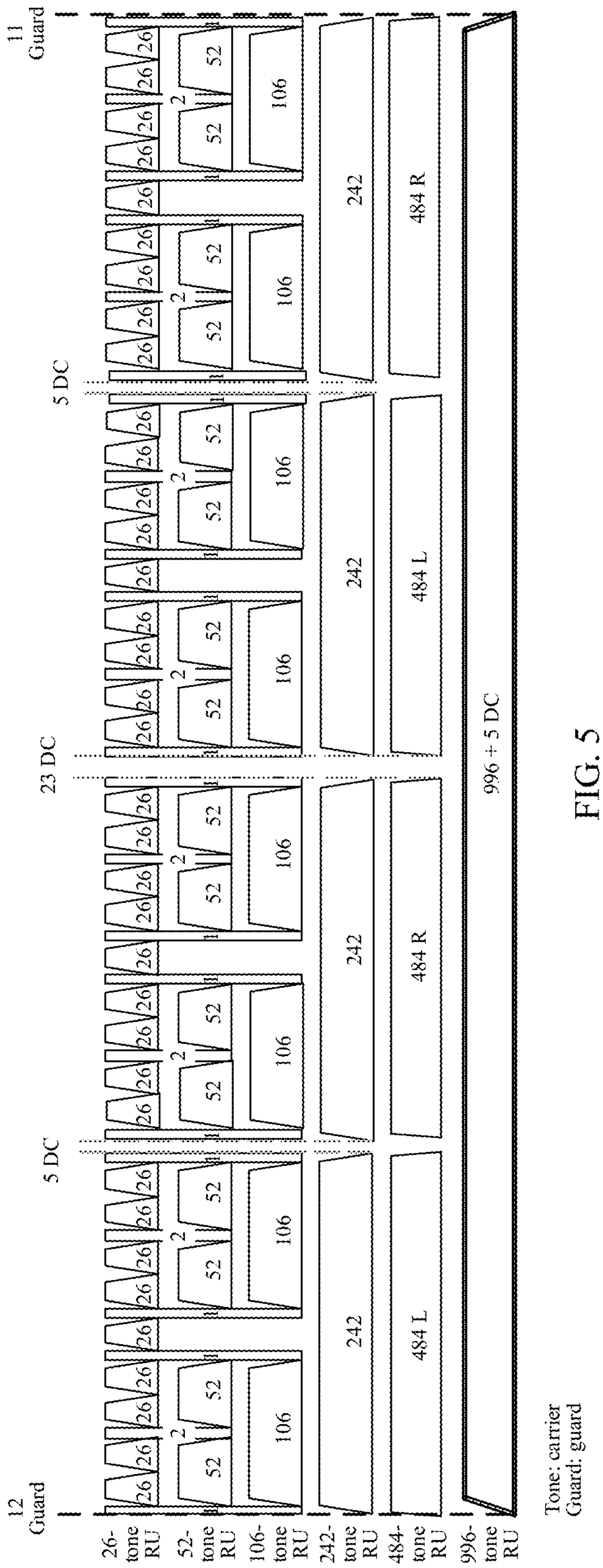
FIG. 5 is a schematic diagram of a subcarrier distribution and a continuous RU distribution of 80 MHz.

FIG. 5 is a schematic diagram of a subcarrier distribution and an RU distribution of 80 MHz. As shown in FIG. 5, an entire bandwidth (that is, 80 MHz) includes one 996-tone RU, or includes various combinations of a 26-tone RU, a 52-tone RU, a 106-tone RU, a 242-tone RU, and a 484-tone RU. As shown in FIG. 5, 484L in FIG. 5 represents the left half part of the 484-tone RU (that is, a subcarrier range [−500: −17] or a subcarrier range [17: 500]), 484R in FIG. 5 represents the right half part of the 484-tone RU, and each half part includes 242 subcarriers. This is another schematic manner of 484+5DC. Specifically, for a location of a subcarrier included in the RU, refer to Table 27-8 in 802.11ax. The 996-tone RU may be understood as an RU including 996 subcarriers. “Left” and “right” herein indicates only a relationship relative to a central location in frequency domain. The 484-tone RU [−500: −17] is used as an example. On an actual frequency domain resource, “484L”

represents a low frequency part relative to a frequency domain center of the 484-tone RU, that is, [−500: −259]; and "484R" represents a high frequency part relative to the frequency domain center of the 484-tone RU, that is, [−258: −17]. Similarly, the 484-tone RU [17: 500] is used as an example. "484L" represents [17: 258], and "484R" represents [259: 500].

When a bandwidth is 160 MHz, the entire bandwidth (that is, 160 MHz) may be understood as a replication of two subcarrier distributions of 80 MHz. The entire bandwidth (that is, 160 MHz) includes two 996-tone RUs, or includes various combinations of a 26-tone RU, a 52-tone RU, a 106-tone RU, a 242-tone RU, a 484-tone RU, and a 996-tone RU. When a bandwidth is 320 MHz, the entire bandwidth (that is, 320 MHz) may be understood as a replication of four subcarrier distributions of 80 MHz. Details are not described one by one herein.

In the foregoing various types of subcarrier distributions shown in FIG. 3 to FIG. 5, a 242-tone RU is used as a unit. It is assumed that a leftmost RU in FIG. 3 to FIG. 5 is at a lowest frequency, and a rightmost RU in FIG. 3 to FIG. 5 is at a highest frequency. From left to right, 242-tone RUs may be numbered as: first (1st), second (2nd), . . . , and sixteenth (16th). It should be understood that, the 320 MHz bandwidth is used as an example, and in this case, a data (Data) field in a radio frame occupies a maximum of 16 242-tone RUs. In other words, in the data field, a maximum of 16 242-tone RUs are in a one-to-one correspondence with 16 20 MHz channels in ascending order of frequencies.

In terms of bandwidth, a 26-tone RU corresponds to 2 MHz, a 52-tone RU corresponds to 4 MHz, a 106-tone RU corresponds to 8 MHz, and a 242-tone RU corresponds to 20 MHz. A bandwidth corresponding to an RU of another size may be correspondingly obtained through addition or multiplication. Details are not described herein.

It should be understood that, because the 802.11be standard allows allocation of a plurality of RUs to one STA, that is, a plurality of RUs are combined and allocated to one STA, the 802.11be standard supports a multiple resource unit (multiple RU, MRU). In other words, in addition to the foregoing several types of RUs, the 802.11be standard further includes some MRUs. For example, one 52-tone RU and one 26-tone RU constitute a 52+26-tone MRU, and one 106-tone RU and one 26-tone RU constitute a 106+26-tone MRU. For example, one 996-tone RU and one 484-tone RU constitute a 996+484-tone MRU, two 996-tone RUs and one 484-tone RU constitute a 2*996+484-tone MRU, three 996-tone RUs constitute a 3*996-tone MRU, and three 996-tone RUs and one 484-tone RU constitute a 3*996+484-tone RU. It should be further understood that the symbol "*" in this specification represents "multiply" or "multiplication".

2. Uplink Multi-User Transmission

Figure 6:
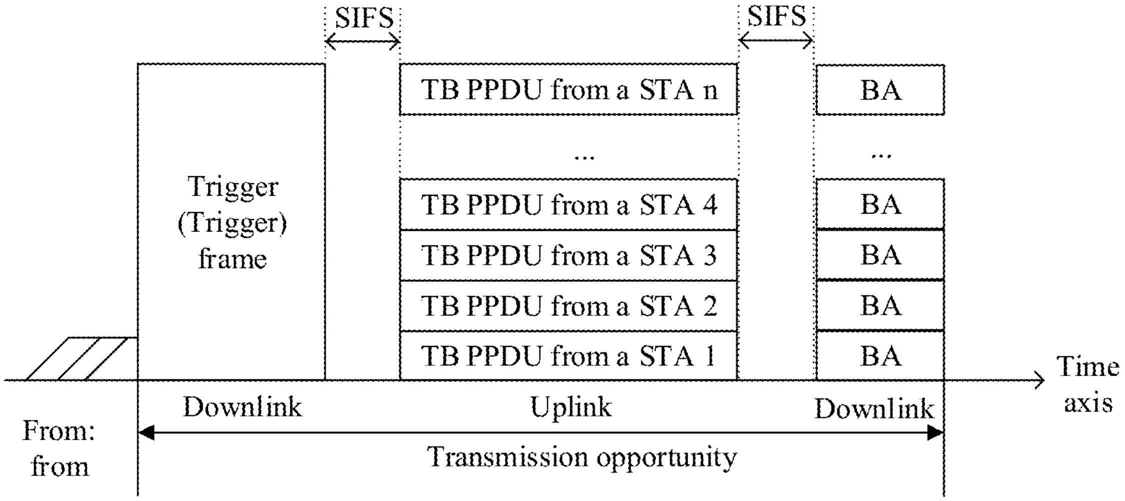
FIG. 6 is a schematic flowchart of uplink multi-user transmission.

In 802.11ax and 802.11be, uplink multi-user transmission is an important technology. FIG. 6 is a schematic flowchart of uplink multi-user transmission. As shown in FIG. 6, an uplink multi-user transmission procedure includes: An AP sends a trigger frame to trigger uplink multi-user transmission, where the trigger frame carries identifier information and resource allocation information of one or more stations; and after receiving the trigger frame, each station sends an uplink data frame on an allocated resource unit (RU) by using a TB PPDU, and receives, after a short interframe space (short interframe space, SIFS), an acknowledgment (block acknowledge, BA) frame sent by the AP.

Figure 7A:
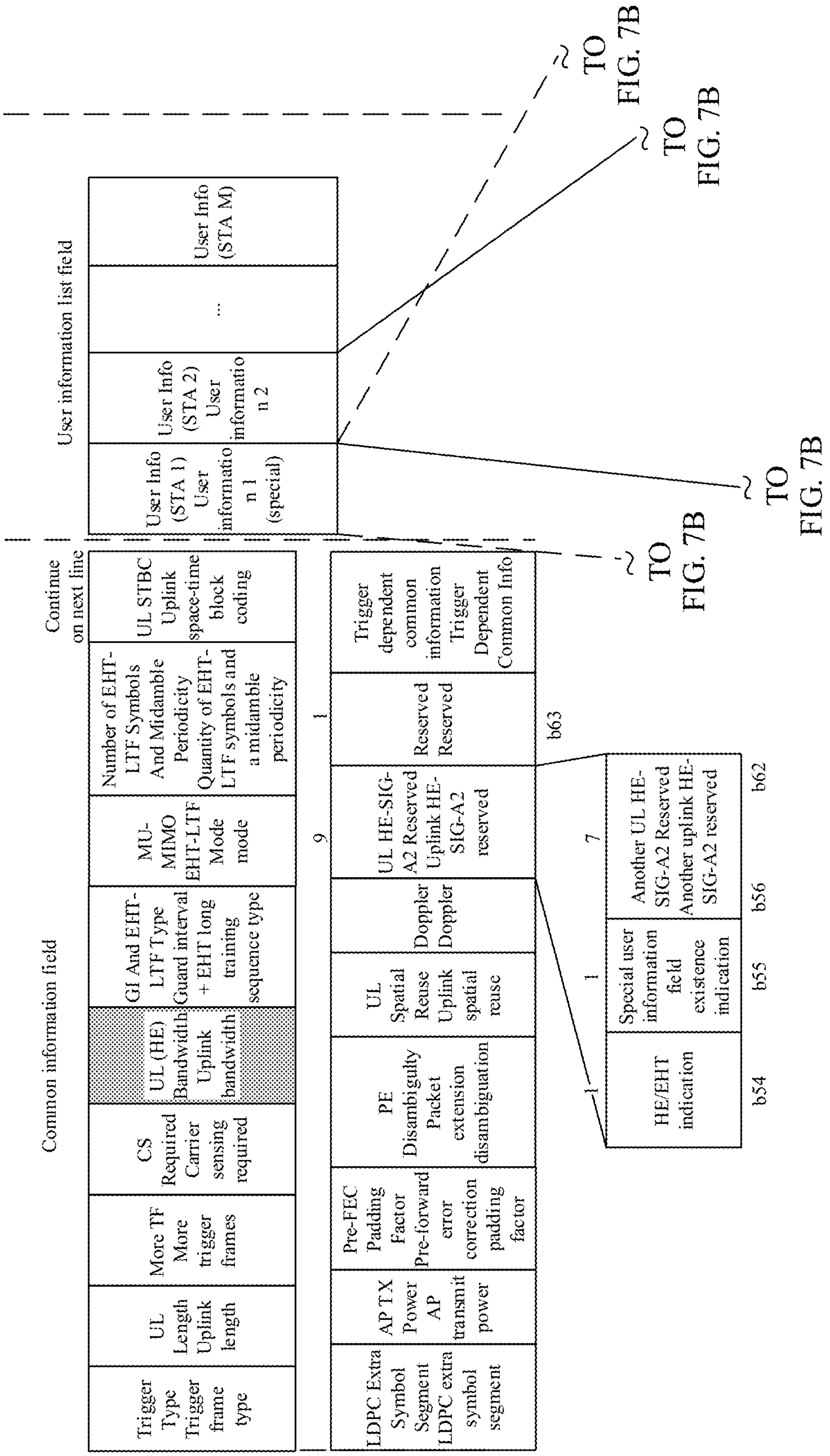
FIG. 7A and FIG. 7B are a schematic diagram of a frame format of an 802.11be trigger frame.
Figure 7B:
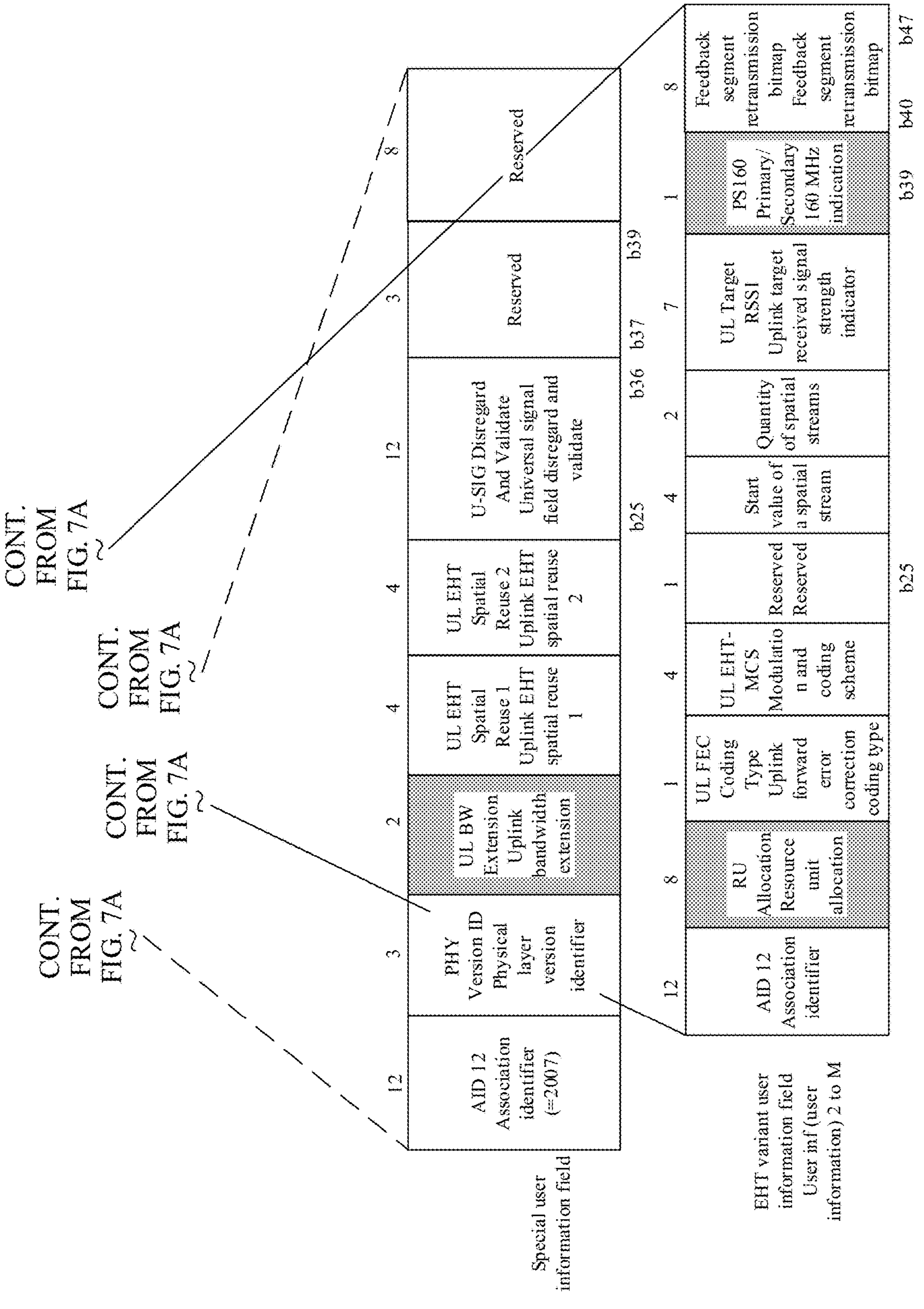

Optionally, FIG. 7A and FIG. 7B are a schematic diagram of a frame format of an 802.11be trigger frame. As shown in FIG. 7A and FIG. 7B, the 802.11be trigger frame includes but is not limited to a common information field and a user information list field. The common information field includes common information that needs to be read by all STAs (the STAs herein include at least one of an HE STA and an EHT STA). The EHT STA in this specification is a station that not only supports an EHT protocol, but also is compatible with an HE protocol and an earlier protocol. In some scenarios and embodiments, the HE STA in this application supports the HE protocol at most, but does not support a future Wi-Fi protocol, for example, the EHT protocol. However, it should not be understood that in this application, all HE STAs are limited to be unable to support a future Wi-Fi protocol. The common information field includes but is not limited to an uplink bandwidth (UL BW) subfield. The uplink bandwidth subfield is used together with an uplink bandwidth extension subfield (UL BW Extension subfield) in a special user information field to indicate a total uplink transmission bandwidth. The user information list field includes but is not limited to one special user information field (a value of an association identifier 12 subfield is equal to 2007) and one or more EHT variant user information fields. The special user information field includes common information that needs to be read by all EHT STAs. One EHT variant user information field includes information that needs to be read by one EHT STA. One EHT variant user information field includes but is not limited to an association identifier 12 (association identification 12, AID 12) subfield and an RU allocation (RU allocation) subfield. The AID 12 subfield indicates an association identifier of a STA, and the RU allocation subfield indicates a location of a specific resource unit allocated to the STA (that is, the STA indicated by the AID 12 subfield).

For an EHT STA, an RU or an MRU allocated to the EHT STA may be indicated by using the following subfields in the trigger frame together: a resource unit allocation subfield (RU Allocation subfield), an uplink bandwidth subfield (UL BW subfield), an uplink bandwidth extension subfield (UL BW Extension subfield), and a primary/secondary 160 subfield (PS160 subfield). It can be learned from the format of the trigger frame shown in FIG. 7A and FIG. 7B that, the common information field includes a special user information field existence indication subfield. The special user information field existence indication subfield indicates whether a special user information field exists in the user information field. For an EHT TB PPDU sent by a station, a bandwidth of the EHT TB PPDU is determined by both the UL BW subfield and the UL BW extension subfield. A mapping relationship between B0 of the RU allocation subfield, B7-B1 of the RU allocation subfield, and PS160 is shown in the following Table 1.

The bandwidth (Bandwidth) in Table 1 is determined by both the UL BW subfield and the UL BW extension subfield, and N may be obtained according to a formula N=2*X1+X0. For values of X1 and X0, refer to the following Table 2. Table 2 shows conversion from logical parameters PS160 and B0 to physical parameters X1 and X0.

TABLE 1

Interpretation of an RU allocation subfield and a PS160 subfield in an 802.11be trigger frame

| PS160 subfield (PS160 subfield) | BO of the RU allocation subfield (BO of the resource unit allocation subfield) | B7-B1 of the RU allocation subfield (B7-B1 of the resource unit allocation subfield) | Bandwidth (MHz) (bandwidth) | RU/MRU size (RU or MRU size) | RU/MRU index (RU or MRU index) | PHY RU/MRU index (physical RU or MRU index) |
|---|---|---|---|---|---|---|
| 0-3: (indicates 80 MHz on which the RU is located) | | 0-8 | 20, 40, 80, 160, or 320 | 26 | RU 1 to RU 9, respectively (respectively/sequentially/in sequence) | 37 × N + RU index |
| | | 9-17 | 40, 80, 160, or 320 | | RU 10 to RU 18, respectively | |
| | | 18 | 80, 160, or 320 | | Reserved (reserved) | |
| | | 19-36 | 80, 160, or 320 | | RU 20 to RU 37, respectively | |
| | | 37-40 | 20, 40, 80, 160, or 320 | 52 | RU 1 to RU 4, respectively | 16 × N + RU index |
| | | 41-44 | 40, 80, 160, or 320 | | RU 5 to RU 8, respectively | |
| | | 45-52 | 80, 160, or 320 | | RU 9 to RU 16, respectively | |
| | | 53, 54 | 20, 40, 80, 160, or 320 | 106 | RU 1 and RU 2, respectively | 8 × N + RU index |
| | | 55, 56 | 40, 80, 160, or 320 | | RU 3 and RU 4, respectively | |
| | | 57-60 | 80, 160, or 320 | | RU 5 to RU 8, respectively | |
| | | 61 | 20, 40, 80, 160, or 320 | 242 | RU 1 | 4 × N + RU index |
| | | 62 | 40, 80, 160, or 320 | | RU 2 | |
| | | 63, 64 | 80, 160, or 320 | | RU 3 and RU 4, respectively | |
| | | 65 | 40, 80, 160, or 320 | 484 | RU 1 | 2 × N + RU index |
| | | 66 | 80, 160, or 320 | | RU 2 | |
| | | 67 | 80, 160, or 320 | 996 | RU 1 | N + RU index |
| 0-1: (indicates 160 MHz on which the RU is located) | 0 | 68 | Reserved (reserved) | | | Reserved (reserved) |
| | 1 | | 160 or 320 | 2 × 996 | RU 1 | X1 + RU index |
| 0 | 0 | 69 | Reserved (reserved) | | | Reserved (reserved) |
| 0 | 1 | | | | | |
| 1 | 0 | | | | | |
| 1 | 1 | | 320 | 4 × 996 | RU 1 | RU 1 |
| 0-3: indicates 80 MHz on which the MRU is located | | 70-72 | 20, 40, 80, 160, or 320 | 52 + 26 | MRU 1 to MRU 3, respectively | 12 × N + MRU index |
| | | 73-75 | 40, 80, 160, or 320 | 52 + 26 | MRU 4 to MRU 6, respectively | |
| | | 76-81 | 80, 160, or 320 | 52 + 26 | MRU 7 to MRU 12, respectively | |
| | | 82, 83 | 20, 40, 80, 160, or 320 | 106 + 26 | MRU 1 and MRU 2, respectively | 8 × N + MRU index |
| | | 84, 85 | 40, 80, 160, or 320 | 106 + 26 | MRU 3 and MRU 4, respectively | |
| | | 86-89 | 80, 160, or 320 | 106 + 26 | MRU 5 to MRU 8, respectively | |

TABLE 1-continued

Interpretation of an RU allocation subfield and a PS160 subfield in an 802.11be trigger frame

| PS160 subfield (PS160 subfield) | BO of the RU allocation subfield (BO of the resource unit allocation subfield) | B7-B1 of the RU allocation subfield (B7-B1 of the resource unit allocation subfield) | Bandwidth (MHz) (bandwidth) | RU/MRU size (RU or MRU size) | RU/MRU index (RU or MRU index) | PHY RU/MRU index (physical RU or MRU index) |
|---|---|---|---|---|---|---|
| | | 90-93 | 80, 160, or 320 | 484 + 242 | MRU 1 to MRU 4, respectively | 4 × N + MRU index |
| 0-1: indicates 160 MHz on which the MRU is located | 0 | 94, 95 | 160 or 320 | 996 + 484 | MRU 1 and MRU 2, respectively | 4 × X1 + MRU index |
| | 1 | | | | MRU 3 and MRU 4, respectively | |
| 0-1: indicates 160 MHz on which the MRU is located | 0 | 96-99 | 160 or 320 | 996 + 484 + 242 | MRU 1 to MRU 4, respectively | 8 × X1 + MRU index |
| | 1 | | | | MRU 5 to MRU 8, respectively | |
| 0 | 0 | 100-103 | 320 | 2 × 996 + 484 | MRU 1 to MRU 4, respectively | MRU index |
| 0 | 1 | | | | MRU 5 and MRU 6, respectively | |
| 1 | 0 | | | | MRU 7 and MRU 8, respectively | |
| 1 | 1 | | | | MRU 9 to MRU 12, respectively | |
| 0 | 0 | 104 | 320 | 3 × 996 | MRU 1 | MRU index |
| 0 | 1 | | | | MRU 2 | |
| 1 | 0 | | | | MRU 3 | |
| 1 | 1 | | | | MRU 4 | |
| 0 | 0 | 105, 106 | 320 | 3 × 996 + 484 | MRU 1 and MRU 2, respectively | MRU index |
| 0 | 1 | | | | MRU 3 and MRU 4, respectively | |
| 1 | 0 | | | | MRU 5 and MRU 6, respectively | |
| 1 | 1 | | | | MRU 7 and MRU 8, respectively | |
| Any | Any | 107-127 | Any (any) | Reserved | Reserved | Reserved |

Note:

On primary 160 MHz, if B0 of the RU allocation subfield is set to 0, it indicates that RU/MRU allocation is applied to primary 80 MHz; or if B0 of the RU allocation subfield is set to 1, it indicates that RU/MRU allocation is applied to secondary 80 MHz.

On secondary 160 MHz, if B0 of the RU allocation subfield is set to 0, it indicates that RU/MRU allocation is applied to 80 MHz at a lower frequency; or if B0 of the RU allocation subfield is set to 1, it indicates that RU/MRU allocation is applied to 80 MHz at a higher frequency.

TABLE 2

Conversion from a logical parameter to a physical parameter

| | Logical input | | | | Physical outputs/ Physical output | | |
|---|---|---|---|---|---|---|---|
| Bandwidth (MHz) | Frequency band configuration | PS160 | B0 | | X0 | X1 | N |
| 20/40/80 | [P80] | 0 | 0 | | 0 | 0 | 0 |
| 160 | [P80 S80] | 0 | 0 | | 0 | 0 | 0 |
| | | 0 | 1 | | 1 | 0 | 1 |
| | [S80 P80] | 0 | 0 | | 1 | 0 | 1 |
| | | 0 | 1 | | 0 | 0 | 0 |
| 320 | [P80 S80 S160] | 0 | 0 | | 0 | 0 | 0 |
| | | 0 | 1 | | 1 | 0 | 1 |
| | | 1 | 0 | | 0 | 1 | 2 |
| | | 1 | 1 | | 1 | 1 | 3 |
| | [S80 P80 S160] | 0 | 0 | | 1 | 0 | 1 |
| | | 0 | 1 | | 0 | 0 | 0 |
| | | 1 | 0 | | 0 | 1 | 2 |
| | | 1 | 1 | | 1 | 1 | 3 |
| | [S160 P80 S80] | 0 | 0 | | 0 | 1 | 2 |
| | | 0 | 1 | | 1 | 1 | 3 |
| | | 1 | 0 | | 0 | 0 | 0 |
| | | 1 | 1 | | 1 | 0 | 1 |
| | [S160 S80 P80] | 0 | 0 | | 1 | 1 | 3 |
| | | 0 | 1 | | 0 | 1 | 2 |
| | | 1 | 0 | | 0 | 0 | 0 |
| | | 1 | 1 | | 1 | 0 | 1 |

It should be understood that in Table 2, P80 represents a primary 80 MHz channel, S80 represents a secondary 80 MHz channel, and S160 represents a secondary 160 MHz channel.

The frequency band configuration in Table 2 refers to a sequence of P80, S80, and S160 in absolute frequencies. From left to right, a low frequency to a high frequency are sequentially represented. For example, [P80 S80] indicates that the primary 80 MHz channel is the first 80 MHz channel in ascending order of frequencies, and the secondary 80 MHz channel is the second 80 MHz channel in ascending order of frequencies; or in other words, [P80 S80] indicates that the primary 80 MHz channel is a low 80 MHz channel, and the secondary 80 MHz channel is a high 80 MHz channel. For another example, [S80 P80 S160] indicates that the secondary 80 MHz channel is a low 80 MHz channel of a low 160 MHz channel, the primary 80 MHz channel is a high 80 MHz channel of the low 160 MHz channel, and the secondary 160 MHz channel is a high 160 MHz channel.

3. Distributed (Distributed) RU/Discrete RU

In a low power indoor (Low Power Indoor, LPI) communication scenario, a maximum transmit power and a maximum power spectral density are limited. The maximum power spectral density is more strictly limited than a maximum power, and an allowed maximum transmit power is usually more limited by the power spectral density. Due to a limitation of the maximum power spectral density, a transmit power of a single continuous RU is limited. It should be understood that the continuous RU in this application is an RU including a plurality of contiguous subcarriers, or the continuous RU is an RU including two contiguous subcarrier groups. A plurality of subcarriers included in each contiguous subcarrier group are contiguous, and the two contiguous subcarrier groups are spaced by only a guard subcarrier, a null subcarrier, or a direct current subcarrier. Certainly, the continuous RU may have another names. The name of the continuous RU is not limited in this application.

The maximum power spectral density refers to a maximum transmit power of 1 MHz, or in other words, the maximum power spectral density is limited in a form in which a transmit power of 1 MHz does not exceed x dBm (dBm=10 lg(mW), where lg represents a logarithm to base 10). A minimum granularity of the maximum power spectral density is 1 MHz. Therefore, in a case in which the transmit power of 1 MHz is not changed, that is, in a case in which the power spectral density is not changed, a discrete RU technology, or referred to as a distributed RU technology, is provided to increase a transmit power. A discrete RU/distributed RU corresponds to the continuous RU. The discrete RU includes a plurality of subcarriers that are discrete in frequency domain. A part or all of the plurality of discrete subcarriers may be discrete. In other words, the plurality of discrete subcarriers may include a part of subcarriers that are contiguous in frequency, and a part of subcarriers that are discontiguous in frequency; or all of the plurality of discrete subcarriers may be discontiguous in frequency. It should be understood that "the discrete RU", "the distributed RU", and "the DRU" in this specification are used interchangeably. It should be further understood that the discrete RU/distributed RU/DRU in this specification is an RU whose subcarriers are discrete in frequency domain. In other words, an RU having this characteristic is referred to as a discrete RU/distributed RU/DRU in this specification. However, in practice, the RU having this characteristic may alternatively have another name. This is not limited in this application.

For a discrete RU and a continuous RU that include a same quantity of subcarriers, a bandwidth spanned by the discrete RU from a low-frequency start location to a high-frequency end location in frequency domain is greater than a frequency domain bandwidth occupied by the continuous RU. In this way, when maximum power spectral densities are the same, a total transmit power of the discrete RU is higher than a total transmit power of the continuous RU. In other words, when a power spectral density is limited, a limited quantity of subcarriers (for example, 26 subcarriers included in a contiguous 26-tone RU) are discretized on a larger bandwidth, that is, more subcarriers (for example, odd-numbered subcarriers in two contiguous 26-tone RUs), so that a transmit power can be increased. Therefore, in comparison with the continuous RU, when data transmission is performed by using the discrete RU, a transmit power of a single RU can be increased, so that a transmit power on a single subcarrier is increased, and a signal-to-noise ratio (signal-to-noise ratio, SNR) is increased.

In embodiments of this application, it may be understood that, in one sending process of a user (a STA), transmit powers on all subcarriers in a resource block RU allocated to the STA are the same. A carrier spacing of 78.125 kHz is used as an example. 1 MHz includes 12.8 (about 13) subcarriers. It is assumed that a transmit power of 1 MHz does not exceed p mW (that is, the maximum power spectral density). A maximum value of a quantity of subcarriers carrying a signal in any 13 contiguous subcarriers is used to determine an average power on each subcarrier, and further determine a transmit power of the signal. The transmit power of the signal is equal to a product of the average power on each subcarrier and the quantity of subcarriers. For example, it is assumed that a maximum of five subcarriers in any 13 contiguous subcarriers (1 MHz) carry a signal, and an average power on each subcarrier on the 1 MHz bandwidth is (p/5) mW. It is assumed that a maximum of two subcarriers in any 13 contiguous subcarriers (1 MHz) carry a signal, and an average power on each subcarrier on the 1 MHz bandwidth is (p/2) mW. In other words, when the maximum power spectral density is given, a larger quantity of subcarriers carrying a signal in any 13 contiguous subcarriers indicates a lower average power on each subcarrier and a lower total transmit power. It can be learned that, it is assumed that the resource unit allocated to the STA is a discrete 26-tone RU, that is, a quantity of subcarriers carrying a signal is 26. If a maximum of two subcarriers in any 13 contiguous subcarriers carry a signal, that is, a bandwidth occupied by the discrete 26-tone RU is 26/2=13 MHz, an average power on each subcarrier on a 1 MHz bandwidth is (p/2) mW. In this case, a total transmit power of the discrete 26-tone RU may be calculated based on a total transmit power on the subcarriers, and is specifically (p/2)*26 mW; or may be calculated based on the bandwidth occupied by the subcarriers, and is specifically 13*p mW. If the resource element allocated to the STA is a 26-tone continuous RU, because the 26-tone continuous RU includes 26 contiguous subcarriers (two groups of 13 contiguous subcarriers), that is, a bandwidth occupied by the 26-tone continuous RU is 2 MHz, an average power on each subcarrier on a 1 MHz bandwidth is (p/13) mW. In this case, a total transmit power of the contiguous 26-tone RU may be calculated based on a total transmit power on the subcarriers, and is specifically (p/13)*26 mW; or may be calculated based on the bandwidth occupied by the subcarriers, and is specifically 2*p mW. In comparison, with the same maximum power spectral density, the total transmit power of the discrete 26-tone RU is 6.5 times higher than the total transmit power of the contiguous 26-tone RU.

The subcarriers included in the resource unit are discretized on a larger bandwidth (which is larger than the bandwidth occupied by the continuous RU). In this case, a transmit power can be increased, but specific subcarriers included in each resource unit are not determined. Therefore, this application provides a design of a carrier plan (tone plan) for a discrete RU/distributed RU on a 20 MHz bandwidth. The carrier plan for a distributed RU may be applied to uplink or downlink transmission. For example, the distributed RU is applied to uplink multi-user transmission. This application provides a TB PPDU transmission method. A plurality of users (or STAs) send discrete RUs in an alternate manner. In a condition that a bandwidth is specific and a power spectral density requirement is met, this manner can increase a transmit power of each user in comparison with a transmission manner in which a continuous RU is used. Further, a continuous RU signaling indication method may be reused, to reduce complexity.

The following describes in detail the technical solutions provided in this application with reference to more accompanying drawings.

Optionally, a station in this application may be any STA shown in FIG. 1, for example, the STA 200. An access point in this application may be any AP shown in FIG. 1, for example, the AP 100. Both the station and the access point in this application support the 802.11be protocol, and may further support another WLAN communication protocol, for example, a protocol such as 802.11ax or 802.11ac. It should be understood that the station and the access point in this application may further support a next-generation protocol of 802.11be. In other words, the method provided in this application is applicable to not only the 802.11be protocol, but also the next-generation protocol of 802.11be.

Figure 8:
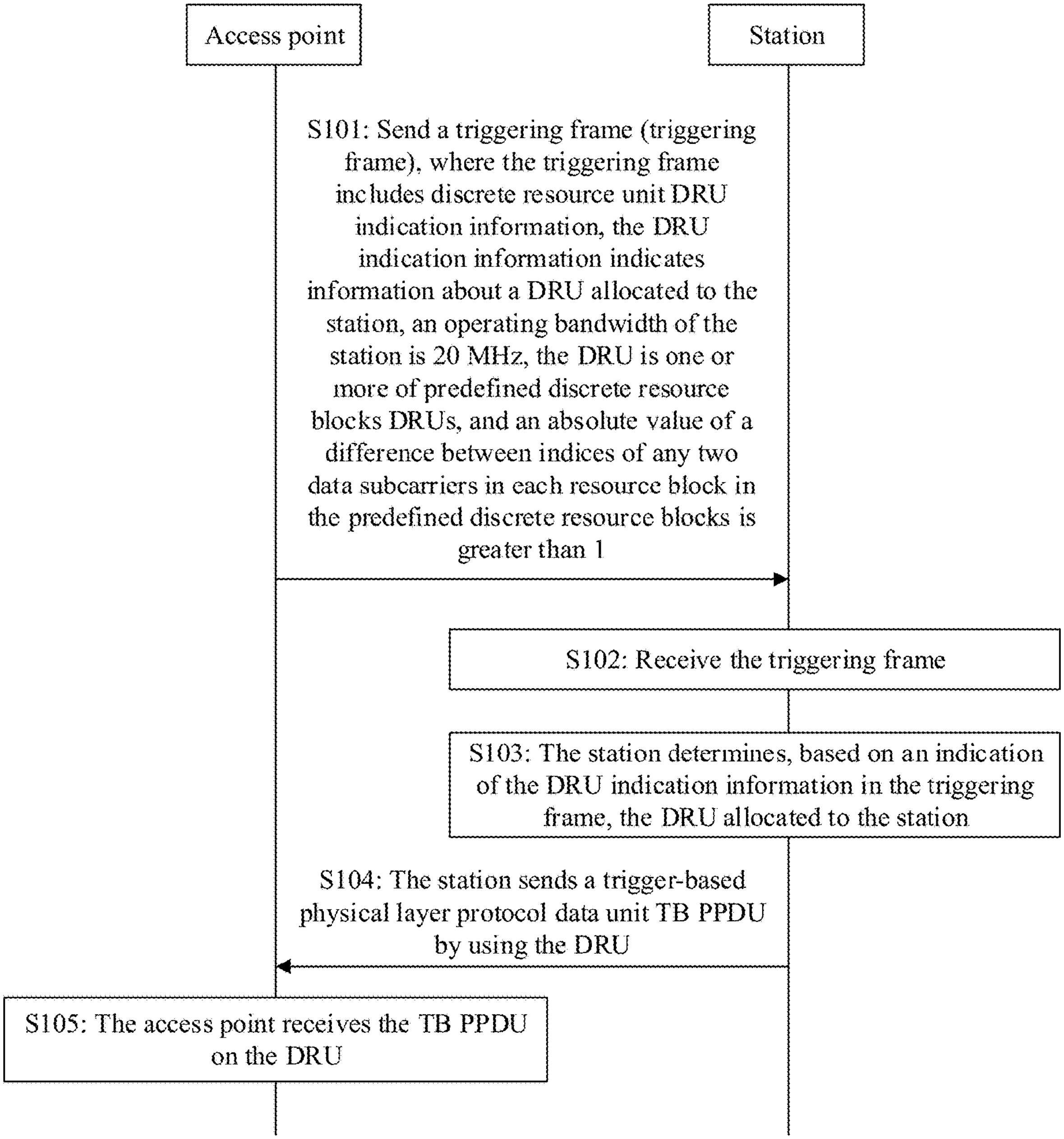
FIG. 8 is a schematic flowchart of a TB PPDU transmission method according to an embodiment of this application.

FIG. 8 is a schematic flowchart of a TB PPDU transmission method according to an embodiment of this application. As shown in FIG. 8, the TB PPDU transmission method includes but is not limited to the following steps.

S101: An access point AP sends a triggering frame (triggering frame), where the triggering frame includes discrete resource unit DRU indication information, the DRU indication information indicates information about a DRU allocated to a station, an operating bandwidth of the station is 20 MHz, the DRU is one or more of predefined discrete resource blocks DRUs, and an absolute value of a difference between indices of any two data subcarriers in each resource block in the predefined discrete resource blocks is greater than 1.

Specifically, for the predefined DRU, refer to a resource block in subsequent implementations.

Herein, there may be one or more stations, and the access point allocates a corresponding DRU to each of the one or more stations. In addition, a transmission bandwidth for the one or more stations to perform transmission by using a distributed RU is 20 MHz. The transmission bandwidth herein may also be understood as a channel bandwidth or an operating bandwidth for the one or more stations to perform uplink transmission.

It should be further noted that the 20 MHz bandwidth may be an operating bandwidth for uplink multi-user STA transmission, or may be a part of an operating bandwidth for uplink multi-user transmission. For example, an operating bandwidth for uplink multi-user transmission scheduled by the AP may be equal to 20 MHz or may be greater than 20 MHz. When the operating bandwidth for uplink multi-user transmission scheduled by the AP is greater than 20 MHz, in a possible implementation, one or more stations in stations scheduled by the AP perform transmission by using a distributed RU, and a channel bandwidth occupied by one or more distributed RUs used by the one or more stations is 20 MHz. A station other than a part of stations that use distributed RUs for transmission uses a continuous RU for transmission. A channel bandwidth occupied by the continuous RU is the operating bandwidth for uplink multi-user transmission scheduled by the AP minus a channel bandwidth of the distributed RUs. For example, the operating bandwidth for uplink multi-user transmission is 320 MHz, where 20 MHz may be used for transmission of the distributed RU, and remaining 300 MHz may be used for the continuous RU. In this way, hybrid transmission of the distributed RU and the continuous RU on a large bandwidth (a bandwidth greater than 20 MHz may be considered as a large bandwidth).

S102: The station receives the triggering frame.

S103: The station determines, based on an indication of the DRU indication information in the triggering frame, the DRU allocated to the station.

The DRU includes a plurality of discrete data subcarriers. Indices of half of the plurality of discrete data subcarriers are positive integers, and indices of the other half of the plurality of discrete data subcarriers are negative integers. Two adjacent data subcarriers in the plurality of discrete data subcarriers are spaced by at least one subcarrier.

S104: The station sends a trigger-based physical layer protocol data unit TB PPDU by using the DRU.

S105: The access point receives the TB PPDU on the DRU.

It may be understood that the triggering frame in this embodiment may have various possible frame formats, and may be a type of control frame in a MAC frame specified in a standard, where the type of control frame is referred to as a trigger frame (trigger frame), for example, a trigger frame in 802.11be, or may be another MAC frame having a trigger function. The another MAC frame having a trigger function may also be referred to as a MAC frame having a TRS (triggered response scheduling, triggered response scheduling) function, and the function is generally implemented by using a TRS control subfield (TRS control subfield) included in the MAC frame. In a specific example, the DRU indication information in step S101 may be carried in an RU allocation (RU allocation) field in a user info field (user information field) in the trigger frame, or may be carried in an RU allocation field in the TRS control subfield in the another MAC frame.

Specifically, the DRU indication information indicates a size and a location of the DRU allocated to the station. The size of the DRU refers to a quantity of subcarriers in the DRU, and the location of the DRU refers to a location of a subcarrier in the DRU in frequency domain. Generally, a subcarrier index range (subcarrier index range) indicates the location of the subcarrier in the DRU in frequency domain. The size and the location of the DRU are a size and a location that are predefined in a standard. The DRU indication information may be a predefined RU allocation subfield (RU allocation subfield). Refer to Table 1. In Table 1, the "RU or MRU index" is a predefined logical index of the DRU. For a set of the logical index of the DRU and indices of subcarriers included in the DRU, refer to any one of subsequent Table 4a to Table 12.

Optionally, the AP determines, based on a carrier plan for a distributed RU on a 20 MHz bandwidth and signal quality of each subcarrier on the 20 MHz bandwidth, a distributed RU to be allocated to the one or more stations. For example, the AP allocates a distributed RU that includes a subcarrier having relatively good quality to a station. The AP sends a trigger frame. The trigger frame is used to trigger uplink multi-user transmission, and the trigger frame includes DRU indication information of the one or more stations. Correspondingly, the AP schedules each station of uplink multi-user transmission to receive the trigger frame. For ease of understanding, one station is used as an example for description in this embodiment of this application. A frame format of the trigger frame may be as shown in FIG. 7A and FIG. 7B. Details are not described herein again. The DRU indication information included in the trigger frame indicates a DRU (including a size and a location) allocated to the station. The DRU may be a distributed/discrete RU, and a size of the DRU may be less than that of a 242-tone RU (that is, a bandwidth of the DRU is less than 20 MHz). The DRU indication information includes an RU allocation subfield, an uplink bandwidth subfield, an uplink bandwidth extension subfield, and a primary/secondary 160 subfield. For an indication manner of the DRU indication information, refer to the following Table 3. Table 3 is similar to Table 1, and a difference lies in that the RU in Table 1 is replaced with a DRU in Table 3. An MDRU in Table 3 is a larger DRU obtained by combining corresponding DRUs. A combination principle is consistent with that of combining continuous RUs into an MRU. Details are not described herein. In other words, the AP may allocate a resource unit to the STA in the manner in Table 1. In other words, in this embodiment of this application, an existing continuous RU indication manner may be reused to allocate a discrete resource block to the STA, so that compatibility can be improved, and product implementation complexity can be reduced.

TABLE 3

| DRU allocation subfield and PS160 subfield | | | | | | |
|---|---|---|---|---|---|---|
| PS160 subfield (PS160 subfield) | B0 of the RU allocation subfield (B0 of the resource unit allocation subfield) | B7-B1 of the RU allocation subfield (B7-B1 of the resource unit allocation subfield) | Bandwidth (MHz) (bandwidth) | DRU/MDRU size (RU or MRU size) | DRU/DMRU index (RU or MRU index) | PHYDRU/ DMRU index (physical RU or MRU index) |
| 0-3: (indicates 80 MHz on which the DRU is located) | | 0-8 | 20, 40, 80, 160, or 320 | 26 | DRU 1 to DRU 9, respectively (respectively/ sequentially/ in sequence) | 37 × N + DRU index |
| | | 9-17 | 40, 80, 160, or 320 | | DRU 10 to DRU 18, respectively | |
| | | 18 | 80, 160, or 320 | | Reserved (reserved) | |
| | | 19-36 | 80, 160, or 320 | | DRU 20 to DRU 37, respectively | |
| | | 37-40 | 20, 40, 80, 160, or 320 | 52 | DRU 1 to DRU 4, respectively | 16 × N + DRU index |
| | | 41-44 | 40, 80, 160, or 320 | | DRU 5 to DRU 8, respectively | |
| | | 45-52 | 80, 160, or 320 | | DRU 9 to DRU 16, respectively | |
| | | 53, 54 | 20, 40, 80, 160, or 320 | 106 | DRU 1 and DRU 2, respectively | 8 × N + DRU index |
| | | 55, 56 | 40, 80, 160, or 320 | | DRU 3 and DRU 4, respectively | |

TABLE 3-continued

DRU allocation subfield and PS160 subfield

| PS160 subfield (PS160 subfield) | B0 of the RU allocation subfield (B0 of the resource unit allocation subfield) | B7-B1 of the RU allocation subfield (B7-B1 of the resource unit allocation subfield) | Bandwidth (MHz) (bandwidth) | DRU/MDRU size (RU or MRU size) | DRU/DMRU index (RU or MRU index) | PHYDRU/DMRU index (physical RU or MRU index) |
|---|---|---|---|---|---|---|
| | | 57-60 | 80, 160, or 320 | | DRU 5 to DRU 8, respectively | |
| | | 61 | 20, 40, 80, 160, or 320 | 242 | DRU 1 | 4 × N + DRU index |
| | | 62 | 40, 80, 160, or 320 | | DRU 2 | |
| | | 63, 64 | 80, 160, or 320 | | DRU 3 and DRU 4, respectively | |
| | | 65 | 40, 80, 160, or 320 | 484 | DRU 1 | 2 × N + DRU index |
| | | 66 | 80, 160, or 320 | | DRU 2 | |
| | | 67 | 80, 160, or 320 | 996 | DRU 1 | N + DRU index |
| 0-1: (indicates 160 MHz on which the DRU is located) | 0 | 68 | Reserved (reserved) | | | Reserved (reserved) |
| | 1 | | 160 or 320 | 2 × 996 | DRU 1 | X1 + DRU index |
| 0 | 0 | 69 | Reserved (reserved) | | | Reserved (reserved) |
| 0 | 1 | | | | | |
| 1 | 0 | | | | | |
| 1 | 1 | | 320 | 4 × 996 | DRU 1 | DRU 1 |
| 0-3: indicates 80 MHz on which the MDRU is located | | 70-72 | 20, 40, 80, 160, or 320 | 52 + 26 | MDRU 1 to MDRU 3, respectively | 12 × N + MDRU index |
| | | 73-75 | 40, 80, 160, or 320 | 52 + 26 | MDRU 4 to MDRU 6, respectively | |
| | | 76-81 | 80, 160, or 320 | 52 + 26 | MDRU 7 to MDRU 12, respectively | |
| | | 82, 83 | 20, 40, 80, 160, or 320 | 106 + 26 | MDRU 1 and MDRU 2, respectively | 8 × N + MDRU index |
| | | 84, 85 | 40, 80, 160, or 320 | 106 + 26 | MDRU 3 and MDRU 4, respectively | |
| | | 86-89 | 80, 160, or 320 | 106 + 26 | MDRU 5 to MDRU 8, respectively | |
| | | 90-93 | 80, 160, or 320 | 484 + 242 | MDRU 1 to MDRU 4, respectively | 4 × N + MDRU index |
| 0-1: indicates 160 MHz on which the MDRU is located | 0 | 94, 95 | 160 or 320 | 996 + 484 | MDRU 1 and MDRU 2, respectively | 4 × X1 + MDRU index |
| | 1 | | | | MDRU 3 and MDRU 4, respectively | |
| 0-1: indicates 160 MHZ on which the MDRU is located | 0 | 96-99 | 160 or 320 | 996 + 484 + 242 | MDRU 1 to MDRU 4, respectively | 8 × X1 + MDRU index |
| | 1 | | | | MDRU 5 to MDRU 8, respectively | |
| 0 | 0 | 100-103 | 320 | 2 × 996 + 484 | MDRU 1 to MDRU 4, respectively | MDRU index |
| 0 | 1 | | | | MDRU 5 and MDRU 6, respectively | |

TABLE 3-continued

DRU allocation subfield and PS160 subfield

| PS160 subfield (PS160 subfield) | B0 of the RU allocation subfield (B0 of the resource unit allocation subfield) | B7-B1 of the RU allocation subfield (B7-B1 of the resource unit allocation subfield) | Bandwidth (MHz) (bandwidth) | DRU/MDRU size (RU or MRU size) | DRU/DMRU index (RU or MRU index) | PHYDRU/ DMRU index (physical RU or MRU index) |
|---|---|---|---|---|---|---|
| 1 | 0 | | | | MDRU 7 and MDRU 8, respectively | |
| 1 | 1 | | | | MDRU 9 to MDRU 12, respectively | |
| 0 | 0 | 104 | 320 | 3 × 996 | MDRU 1 | MDRU index |
| 0 | 1 | | | | MDRU 2 | |
| 1 | 0 | | | | MDRU 3 | |
| 1 | 1 | | | | MDRU 4 | |
| 0 | 0 | 105, 106 | 320 | 3 × 996 + 484 | MDRU 1 and MDRU 2, respectively | MDRU index |
| 0 | 1 | | | | MDRU 3 and MDRU 4, respectively | |
| 1 | 0 | | | | MDRU 5 and MDRU 6, respectively | |
| 1 | 1 | | | | MDRU 7 and MDRU 8, respectively | |
| Any | Any | 107-127 | Any (any) | Reserved | Reserved | Reserved |

Note:

On primary 160 MHz, if B0 of the RU allocation subfield is set to 0, it indicates that RU/MRU allocation is applied to primary 80 MHz; or if B0 of the RU allocation subfield is set to 1, it indicates that DRU/MDRU allocation is applied to secondary 80 MHz.

On secondary 160 MHz, if B0 of the RU allocation subfield is set to 0, it indicates that DRU/MDRU allocation is applied to 80 MHz at a lower frequency; or if B0 of the RU allocation subfield is set to 1, it indicates that DRU/MDRU allocation is applied to 80 MHz at a higher frequency.

It should be understood that, because the AP may simultaneously schedule a plurality of STAs to perform uplink transmission, the AP may determine, based on a resource unit allocated to each STA and the carrier plan for a distributed RU on a 20 MHz bandwidth, data on which subcarriers belongs to a same STA, so that the AP can distinguish uplink data from different STAs.

Optionally, the trigger frame includes indication information indicating whether the station uses a distributed RU or a continuous RU. After receiving the trigger frame, the station may learn, based on the indication information, a type of a scheduled RU, that is, whether the scheduled RU is a distributed RU or a continuous RU. In this way, the distributed RU and the continuous RU can be compatibly used without an increase of signaling overheads. Optionally, the indication information may be carried in a subfield in a common information field (Common info Field) of the trigger frame. The subfield in the Common info Field may be a reserved field (a reserved field in 11be) in the common information field of the trigger frame, or may be another field. This is not specifically limited in this application. If the reserved field in the common information field of the trigger frame is used to carry the indication information, the reserved field is used, and is no longer considered as a reserved field. It should be understood that the trigger frame herein may alternatively be replaced with a MAC frame having a TRS function, and the indication information indicating whether the station uses a distributed RU or a continuous RU may be located in a reserved bit or a newly added subfield of a TRS subfield. Similarly, when the reserved bit is used, the reserved bit is no longer considered as a reserved bit.

In a possible implementation, in addition to the data subcarriers, the DRU further includes pilot subcarriers. The station may send data information of the TB PPDU by using the data subcarriers included in the DRU, and may send pilot information of the TB PPDU by using the pilot subcarriers included in the DRU.

It may be understood that, after receiving the trigger frame sent by the AP, the STA may determine, based on the indication of the DRU indication information in the trigger frame, the DRU allocated to the station. A specific subcarrier included in the DRU may be determined based on the carrier plan (tone plan) for a distributed RU on a 20 MHz bandwidth. A plurality of implementations of this application provide different carrier plans (tone plans) for a distributed RU on a 20 MHz bandwidth. For details, refer to the following embodiments.

In a carrier plan for a distributed RU, the 20 MHz bandwidth includes nine 26-tone DRUs, and each 26-tone DRU includes 24 data subcarriers and two pilot subcarriers.

The carrier plan for a distributed RU may alternatively include: The 20 MHz bandwidth includes four 52-tone DRUs, and each 52-tone DRU may be considered as a combination of two 26-tone DRUs. In other words, each 52-tone DRU includes 48 data subcarriers and four pilot subcarriers.

The carrier plan for a distributed RU may alternatively include: The 20 MHz bandwidth includes two 106-tone DRUs, and each 106-tone DRU may be considered as a combination of two 52-tone DRUs and two supplementary subcarriers. Because two 52-tone DRUs include eight pilot subcarriers, and one 106-tone DRU needs only four pilot subcarriers, optionally, four pilot subcarriers are selected from the eight pilot subcarriers as pilot subcarriers of the 106-tone DRU, and the other four pilot subcarriers are used as data subcarriers of the 106-tone DRU. In other words, each 106-tone DRU includes 100 data subcarriers, two supplementary subcarriers, and four pilot subcarriers. Because the supplementary subcarrier is also a data subcarrier, it is equivalent that each 106-tone DRU includes 102 data subcarriers and four pilot subcarriers. The 26-tone DRU may be understood as a distributed RU including 26 subcarriers, and may also be briefly referred to as a DRU 26. Similarly, the 52-tone DRU may be understood as a distributed RU including 52 subcarriers, and may also be briefly referred to as a DRU 52; and the 106-tone DRU may be understood as a distributed RU including 106 subcarriers, and may also be briefly referred to as a DRU 106. It should be further understood that DRUs of other sizes/sizes have a similar understanding, and may also have corresponding short names. Details are not described one by one herein.

Specifically, for subcarriers included in the 26-tone DRU, the 52-tone DRU, and the 106-tone DRU in the foregoing implementation, refer to the following description.

It should be understood that there are a total of 256 subcarriers on the 20 MHz bandwidth, and indices of the 256 subcarriers may be represented as [−128: 127], to be specific, −128, −127, −126, . . . , −1, 0, 1, . . . , 125, 126, and 127. Indices of subcarriers in this application may be numbered in ascending order of frequencies. To be specific, a subcarrier with a smallest index value corresponds to a lowest frequency, and a subcarrier with a largest index value corresponds to a highest frequency. Indices of guard subcarriers on the 20 MHz bandwidth are [−128: −123, 123: 127], and indices of direct current subcarriers on the 20 MHz bandwidth are [−3: 3]. Indices of data and pilot subcarriers are [−122: −4, 4: 122]. Specifically, for total quantities of data subcarriers and total quantities of pilot subcarriers corresponding to resource units of different sizes/sizes on the 20 MHz bandwidth, refer to the following description. Details are not described herein.

It should be noted that, during designing of the carrier plan for a distributed RU on a 20 MHz bandwidth, data and pilot subcarriers whose indices are [−122: −4, 4: 122] may be used as an initial subcarrier set, and a data subcarrier set and a pilot subcarrier set that correspond to a distributed RU of a corresponding size are selected from the initial subcarrier set. For example, for a DRU whose distributed RU size is 26-tone, the 20 MHz bandwidth may include nine 26-tone DRUs, each 26-tone DRU includes 24 data subcarriers and two pilot subcarriers. For example, 24*9 data subcarriers in [−122: −4, 4: 122] may be used as a data subcarrier set, and then a part in the initial subcarrier set [−122: −4, 4: 122] except the data subcarrier set is used as a pilot subcarrier set. A data subcarrier set and a pilot subcarrier set of a larger distributed RU may be adjusted based on the data subcarrier set and the pilot subcarrier set of the 26-tone DRU, or a corresponding data subcarrier set and a corresponding pilot subcarrier set are re-determined based on a DRU (for example, a 52-tone RU, a 106-tone RU, or a 242-tone RU) of a corresponding size. This is not limited in this application. Further, provided that the transmit power of the STA can be increased, which subcarriers are specifically used as the data subcarrier set and the pilot subcarrier set is not limited in this application. A 26-tone DRU is used as an example. A middle part of indices [−122: −4, 4: 122] may be used as a data subcarrier set on the 20 MHz bandwidth, and a part in the subcarrier set [−122: −4, 4: 122], except the data subcarrier set is used as a pilot subcarrier set. The middle part herein may be understood as subcarriers whose positive and negative frequencies (positive and negative subcarrier indices) are symmetric with respect to a center frequency (a subcarrier whose index is 0). Alternatively, the data subcarrier set may include not all of the middle part of [−122: −4, 4: 122]. The middle part may be shifted leftward or rightward by several subcarriers. In other words, the negative subcarrier indices and the positive subcarrier indices of the data subcarrier set are not completely symmetric.

In this embodiment of this application, an example in which a part of subcarriers on positive and negative frequency bands (that is, subcarriers whose indices are [−122: −4, 4: 122]) are used as a data subcarrier set on the 20 MHz bandwidth and a part in the subcarrier set [−122: −4, 4: 122] except the data subcarrier set is used as a pilot subcarrier set is used for specific description.

Example 1: In a carrier plan for a distributed RU on a 20 MHz bandwidth (20 MHz tone plan), 216 subcarriers whose indices are [−115: −8, 8: 115] are used as a data subcarrier set on the 20 MHz bandwidth, 18 of 22 subcarriers whose subcarrier range is [−122: −116, −7: −4, 4: 7, 114: 122] are used as pilot subcarriers, and the other four subcarriers are used as null subcarriers (for a 26-tone RU and a 52-tone RU) or are used as supplementary subcarriers of two 106-tone RUs.

In the 20 MHz tone plan, subcarriers included in a 26-tone DRU on the 20 MHz bandwidth are shown in the following Table 4a. It can be learned from Table 4a that start indices of data subcarriers in 26-tone DRUs whose indices are 1 to 9 are respectively −115, −114, −113, −112, −111, −110, −109, −108, and −107. For each 26-tone DRU, in a data subcarrier set (a total of 24 data subcarriers) included in each 26-tone DRU, two adjacent data subcarriers whose indices are both negative numbers are spaced by eight subcarriers, or in other words, an absolute value of a difference between indices of two adjacent data subcarriers whose indices are both negative numbers is 9; two adjacent data subcarriers whose indices are both positive numbers are spaced by eight subcarriers, or in other words, an absolute value of a difference between indices of two adjacent data subcarriers whose indices are both positive numbers is 9; and two adjacent data subcarriers whose indices are one positive number and one negative number are spaced by 23 subcarriers, or in other words, an absolute value of a difference between indices of two adjacent data subcarriers whose indices are one positive number and one negative number is 24. For adjacent 26-tone DRUs, a $j^{th}$ data subcarrier in a DRU 26 whose index is i is contiguous with a $j^{th}$ data subcarrier in a DRU 26 whose index is adjacent to i, that is, data subcarriers that are located at a same location in respective data subcarrier sets included in two adjacent DRUs are contiguous. Both i and j are positive integers. For example, a first data subcarrier (whose index is −115) in a DRU 26-1 (that is, a DRU whose index is 1) is contiguous with a first data subcarrier (whose index is −114) in a DRU 26-2 (that is, a DRU whose index is 2); and a third data subcarrier (whose index is −94) in a DRU 26-4 (that is, a DRU whose index is 4) is contiguous with both a third data subcarrier (whose index is −93) in a DRU 26-5 (that is, a DRU whose index is 5) and a third data subcarrier (whose index is −95) in a DRU 26-3 (that is, a DRU whose index is 3).

In addition, for pilot subcarriers included in a 26-tone DRU, in a possible implementation, each of the 26-tone DRUs whose indices are 1 to 9 includes two pilot subcarriers, and start indices of the pilot subcarriers are respectively −7, −6, −5, −4, −122, −121, −120, −119, and −118.

Two pilot subcarriers included in a 26-tone DRU whose index is 5 are spaced by 243 subcarriers, or in other words, an absolute value of a difference between indices of two pilot subcarriers included in a 26-tone DRU whose index is 5 is 244; and pilot subcarriers included in each of the other eight DRUs 26 except the 26-tone DRU whose index is 5 are spaced by 124 subcarriers, or in other words, an absolute value of a difference between indices of pilot subcarriers included in each of the other eight DRUs 26 except the 26-tone DRU whose index is 5 is 125.

TABLE 4a

| DRU 26 index | Indices of data subcarriers belonging to a corresponding DRU 26 | Indices of pilot subcarriers belonging to the corresponding DRU 26 |
|---|---|---|
| 1 | −115, −106, −97, −88, −79, −70, −61, −52, −43, −34, −25, −16, 8, 17, 26, 35, 44, 53, 62, 71, 80, 89, 98, 107 | −7, 118 |
| 2 | −114, −105, −96, −87, −78, −69, −60, −51, −42, −33, −24, −15, 9, 18, 27, 36, 45, 54, 63, 72, 81, 90, 99, 108 | −6, 119 |
| 3 | −113, −104, −95, −86, −77, −68, −59, −50, −41, −32, −23, −14, 10, 19, 28, 37, 46, 55, 64, 73, 82, 91, 100, 109 | −5,120 |
| 4 | −112, −103, −94, −85, −76, −67, −58, −49, −40, −31, −22, −13, 11, 20, 29, 38, 47, 56, 65, 74, 83, 92, 101, 110 | −4, 121 |
| 5 | −111, −102, −93, −84, −75, −66, −57, −48, −39, −30, −21, −12, 12, 21, 30, 39, 48, 57, 66, 75, 84, 93, 102, 111 | −122, 122 |
| 6 | −110, −101, −92, −83, −74, −65, −56, −47, −38, −29, −20, −11, 13, 22, 31, 40, 49, 58, 67, 76, 85, 94, 103, 112 | −121, 4 |
| 7 | −109, −100, −91, −82, −73, −64, −55, −46, −37, −28, −19, −10, 14, 23, 32, 41, 50, 59, 68, 77, 86, 95, 104, 113 | −120, 5 |
| 8 | −108, −99, −90, −81, −72, −63, −54, −45, −36, −27, −18, −9, 15, 24, 33, 42, 51, 60, 69, 78, 87, 96, 105, 114 | −119, 6 |
| 9 | −107, −98, −89, −80, −71, −62, −53, −44, −35, −26, −17, −8, 16, 25, 34, 43, 52, 61, 70, 79, 88, 97, 106, 115 | −118, 7 |

Data subcarriers included in each 26-tone DRU on the 20 MHz bandwidth shown in Table 4a may alternatively be represented in another form. For example, data subcarriers whose indices are positive numbers and data subcarriers whose indices are negative numbers that are included in each 26-tone DRU may be separately represented by using an equal-spaced sequence, that is, [a: b: c], where a represents a subcarrier index start value, b represents an absolute value of a difference between index values of adjacent subcarriers, and c represents a subcarrier index end value. Specifically, indices of data subcarriers included in the DRU 26 whose index is 1 (DRU 26-1) are represented as [−115: 9: −16] and [8: 9: 107]. Indices of data subcarriers included in the DRU 26 whose index is 2 (DRU 26-2) are represented as [−114: 9: −15] and [9: 9: 108]. Indices of data subcarriers included in the DRU 26 whose index is 3 (DRU 26-3) are represented as [−113: 9: −14] and [10: 9: 109]. Indices of data subcarriers included in the DRU 26 whose index is 4 (DRU 26-4) are represented as [−112: 9: −13] and [11: 9: 110]. Indices of data subcarriers included in the DRU 26 whose index is 5 (DRU 26-5) are represented as [−111: 9: −12] and [12: 9: 111]. Indices of data subcarriers included in the DRU 26 whose index is 6 (DRU 26-6) are represented as [−110: 9: −11] and [13: 9: 112]. Indices of data subcarriers included in the DRU 26 whose index is 7 (DRU 26-7) are represented as [−109: 9: −10] and [14: 9: 113]. Indices of data subcarriers included in the DRU 26 whose index is 8 (DRU 26-8) are represented as [−108: 9: −9] and [15: 9: 114]. Indices of data subcarriers included in the DRU 26 whose index is 9 (DRU 26-9) are represented as [−107: 9: −8] and [16: 9: 115]. Briefly, Table 4a may be replaced with Table 4b.

TABLE 4b

| DRU 26 index | Indices of data subcarriers belonging to a corresponding DRU 26 | Indices of pilot subcarriers belonging to the corresponding DRU 26 |
|---|---|---|
| 1 | [−115: 9: −16] and [8: 9: 107] | −7, 118 |
| 2 | [−114: 9: −15] and [9: 9: 108] | −6, 119 |
| 3 | [−113: 9: −14] and [10: 9: 109] | −5, 120 |
| 4 | [−112: 9: −13] and [11: 9: 110] | −4, 121 |
| 5 | [−111: 9: −12] and [12: 9: 111] | −122, 122 |

TABLE 4b-continued

| DRU 26 index | Indices of data subcarriers belonging to a corresponding DRU 26 | Indices of pilot subcarriers belonging to the corresponding DRU 26 |
|---|---|---|
| 6 | [−110: 9: −11] and [13: 9: 112] | −121, 4 |
| 7 | [−109: 9: −10] and [14: 9: 113] | −120, 5 |
| 8 | [−108: 9: −9] and [15: 9: 114] | −119, 6 |
| 9 | [−107: 9: −8] and [16: 9: 115] | −118, 7 |

In the foregoing carrier plan for a distributed RU, the 20 MHz bandwidth may include four 52-tone DRUs, and it may be considered that each 52-tone DRU includes two 26-tone DRUs. Specifically included subcarriers are shown in the following Table 5. It can be learned from Table 5 that start indices of data subcarriers in 52-tone DRUs whose indices are 1 to 4 are respectively −115, −114, −113, and −112. For each 52-tone DRU, in a data subcarrier set (a total of 48 data subcarriers) included in each 52-tone DRU, an absolute value of a difference between index values of two adjacent subcarriers whose indices are both positive numbers and an absolute value of a difference between index values of two adjacent subcarriers whose indices are both negative numbers alternately appear as [5, 4], or in other words, a quantity of subcarriers spaced between two adjacent subcarriers whose indices are both positive numbers and a quantity of subcarriers spaced between two adjacent subcarriers whose indices are both negative numbers alternately appear as [4, 3]. For example, in the first 24 data subcarriers (24 data subcarriers whose indices are all negative numbers) in the data subcarrier set (the total of 48 data subcarriers) included in each 52-tone DRU, a first data subcarrier and a second data subcarrier are spaced by four subcarriers, the second data subcarrier and a third data subcarrier are spaced by three subcarriers, the third data subcarrier and a fourth data subcarrier are spaced by four subcarriers, the fourth data subcarrier and a fifth data subcarrier are spaced by three subcarriers, the fifth data subcarrier and a sixth data subcarrier are spaced by four subcarriers, the sixth data subcarrier and a seventh data subcarrier are spaced by three subcarriers, and so on. Similarly, the last 24 data subcarriers (24 data subcarriers whose indices are all positive numbers) in the data subcarrier set (the total of 48 data subcarriers) included in each 52-tone DRU also meet this relation. In the data subcarrier set (the total of 48 data subcarriers) included in each 52-tone DRU, two adjacent data subcarriers whose indices are one positive number and one negative number are spaced by 18 subcarriers, or in other words, an absolute value of a difference between indices of two adjacent data subcarriers whose indices are one positive number and one negative number is 19. For adjacent 52-tone DRUs, a $j^{th}$ data subcarrier in a DRU 52 whose index is i is contiguous with a $j^{th}$ data subcarrier in a DRU 52 whose index is adjacent to i, that is, data subcarriers that are located at a same location in respective data subcarrier sets included in two adjacent DRUs are contiguous. For example, a first data subcarrier (whose index is −115) in a DRU 52-1 (that is, a DRU whose index is 1) is contiguous with a first data subcarrier (whose index is −114) in a DRU 52-2 (that is, a DRU whose index is 2). For another example, a third data subcarrier (whose index is −105) in the DRU 52-2 (that is, the DRU whose index is 2) is contiguous with both a third data subcarrier (whose index is −104) in a DRU 52-3 (that is, a DRU whose index is 3) and a third data subcarrier (whose index is −103) in a DRU 52-4 (that is, a DRU whose index is 4).

In addition, for pilot subcarriers included in a 52-tone DRU, in a possible implementation, in four pilot subcarriers included in each DRU 52, two adjacent pilot subcarriers whose indices are both positive numbers and two adjacent pilot subcarriers whose indices are both negative numbers are each spaced by 113 subcarriers, or in other words, an absolute value of a difference between indices of two adjacent pilot subcarriers whose indices are both positive numbers and an absolute value of a difference between indices of two adjacent pilot subcarriers whose indices are both negative numbers are each 114; and two adjacent pilot subcarriers whose indices are one positive number and one negative number are spaced by 10 subcarriers, or in other words, an absolute value of a difference between indices of two adjacent pilot subcarriers whose indices are one positive number and one negative number is 11.

TABLE 5

| DRU 52 index | Indices of DRUs 26 belonging to a corresponding DRU 52 | Indices of data subcarriers belonging to the corresponding DRU 52 | Indices of pilot subcarriers belonging to the corresponding DRU 52 |
|---|---|---|---|
| 1 | 1, 6 | −115, −110, −106, −101, −97, −92, −88, −83, −79, −74, −70, −65, −61, −56, −52, −47, −43, −38, −34, −29, −25, −20, −16, −11, 8, 13, 17, 22, 26, 31, 35, 40, 44, 49, 53, 58, 62, 67, 71, 76, 80, 85, 89, 94, 98, 103, 107, 112 | −121, −7, 4, 118 |
| 2 | 2, 7 | −114, −109, −105, −100, −96, −91, −87, −82, −78, −73, −69, −64, −60, −55, −51, −46, −42, −37, −33, −28, −24, −19, −15, −10, 9, 14, 18, 23, 27, 32, 36, 41, 45, 50, 54, 59, 63, 68, 72, 77, 81, 86, 90, 95, 99, 104, 108, 113 | −120, −6, 5, 119 |
| 3 | 3, 8 | −113, −108, −104, −99, −95, −90, −86, −81, −77, −72, −68, −63, −59, −54, −50, −45, −41, | −119, −5, 6, 120 |

TABLE 5-continued

| DRU 52 index | Indices of DRUs 26 belonging to a corresponding DRU 52 | Indices of data subcarriers belonging to the corresponding DRU 52 | Indices of pilot subcarriers belonging to the corresponding DRU 52 |
|---|---|---|---|
| 4 | 4, 9 | −36, −32, −27, −23, −18, −14, −9, 10, 15, 19, 24, 28, 33, 37, 42, 46, 51, 55, 60, 64, 69, 73, 78, 82, 87, 91, 96, 100, 105, 109, 114 −112, −107, −103, −98, −94, −89, −85, −80, −76, −71, −67, −62, −58, −53, −49, −44, −40, −35, −31, −26, −22, −17, −13, −8, 11, 16, 20, 25, 29, 34, 38, 43, 47, 52, 56, 61, 65, 70, 74, 79, 83, 88, 92, 97, 101, 106, 110, 115 | −118, −4, 7, 121 |

In the 20 MHz tone plan, the 20 MHz bandwidth may include two 106-tone DRUs, and each 106-tone DRU includes 102 data subcarriers and four pilot subcarriers. It may be considered that each 106-tone DRU includes two 52-tone DRUs and two supplementary subcarriers. In other words, it may alternatively be considered that each 106-tone DRU includes four 26-tone DRUs and two supplementary subcarriers. Specifically included subcarriers are shown in the following Table 6. Pilot subcarriers, supplementary subcarriers, and data subcarriers switched from pilot subcarriers in a 106-tone DRU are not considered. In this case, it can be learned from Table 6 that start indices of data subcarriers in 106-tone DRUs whose indices are 1 and 2 are respectively −115 and −114. In a data subcarrier set included in each 106-tone DRU (a total of 96 data subcarriers, where the 96 data subcarriers herein are data subcarriers in the two 52-tone DRUs included in the 106-tone DRU), a quantity of subcarriers spaced between two adjacent subcarriers whose indices are both positive numbers and a quantity of subcarriers spaced between two adjacent subcarriers whose indices are both negative numbers alternately appear as [1, 2, 1, 1], or in other words, an absolute value of a difference between index values of two adjacent subcarriers whose indices are both positive numbers and an absolute value of a difference between index values of two adjacent subcarriers whose indices are both negative numbers alternately appear as [2, 3, 2, 2]. For example, in the first 48 data subcarriers (48 data subcarriers whose indices are negative numbers) in the data subcarrier set (96 in total) included in each 106-tone DRU, a first data subcarrier and a second data subcarrier are spaced by one subcarrier, the second data subcarrier and a third data subcarrier are spaced by two subcarriers, the third data subcarrier and a fourth data subcarrier are spaced by one subcarrier, the fourth data subcarrier and a fifth data subcarrier are spaced by one subcarrier, the fifth data subcarrier and a sixth data subcarrier are spaced by one subcarrier, the sixth data subcarrier and a seventh data subcarrier are spaced by two subcarriers, the seventh data subcarrier and an eighth data subcarrier are spaced by one subcarrier, the eighth data subcarrier and a ninth data subcarrier are spaced by one subcarrier, and so on. Similarly, the last 48 data subcarriers (48 data subcarriers whose indices are positive numbers) in the data subcarrier set (the total of 96 data subcarriers) included in each 106-tone DRU also meet this relation. In the data subcarrier set (the total of 96 data subcarriers) included in each 106-tone DRU, two adjacent data subcarriers whose indices are one positive number and one negative number are spaced by 16 subcarriers, or in other words, an absolute value of a difference between index values of two adjacent data subcarriers whose indices are one positive number and one negative number is 17. For adjacent 106-tone DRUs, a $j^{th}$ data subcarrier in a DRU 106 whose index is i is contiguous with a $j^{th}$ data subcarrier in a DRU 106 whose index is adjacent to i, that is, data subcarriers that are located at a same location in respective data subcarrier sets included in two adjacent DRUs are contiguous. For example, a first data subcarrier (whose index is −115) in a DRU 106-1 (that is, a DRU whose index is 1) is contiguous with a first data subcarrier (whose index is −114) in a DRU 106-2 (that is, a DRU whose index is 2).

In addition, for pilot subcarriers included in a 106-tone DRU, in a possible implementation, in four pilot subcarriers included in each DRU 106, two adjacent pilot subcarriers whose indices are both positive numbers and two adjacent pilot subcarriers whose indices are both negative numbers are each spaced by 113 subcarriers, or in other words, an absolute value of a difference between index values of two adjacent pilot subcarriers whose indices are both positive numbers and an absolute value of a difference between index values of two adjacent pilot subcarriers whose indices are both negative numbers are each 114; and two adjacent subcarriers whose indices are one positive number and one negative number are spaced by 12 subcarriers, or in other words, an absolute value of a difference between index values of two adjacent subcarriers whose indices are one positive number and one negative number is 13.

TABLE 6

| DRU 106 index | Indices of data subcarriers belonging to a corresponding DRU 106 | | | Indices of pilot subcarriers belonging to the corresponding DRU 106 |
|---|---|---|---|---|
| | Indices of data subcarriers included in DRUs 52 or DRUs 26 belonging to the corresponding DRU 106 | Supplementary subcarriers | Data subcarriers switched from pilot subcarriers | |
| 1 | −115, −113, −110, −108, −106, −104, −101, −99, −97, −95, −92, −90, −88, −86, −83, −81, −79, −77, −74, −72, −70, −68, −65, −63, | −117, 116 | −119, −5, 118, 4 | −121, −7, 6, 120 |

TABLE 6-continued

| DRU 106 index | Indices of data subcarriers belonging to a corresponding DRU 106: Indices of data subcarriers included in DRUs 52 or DRUs 26 belonging to the corresponding DRU 106 | Supplementary subcarriers | Data subcarriers switched from pilot subcarriers | Indices of pilot subcarriers belonging to the corresponding DRU 106 |
|---|---|---|---|---|
| | −61, −59, −56, −54, −52, −50, −47, −45, −43, −41, −38, −36, −34, −32, −29, −27, −25, −23, −20, −18, −16, −14, −11, −9, 8, 10, 13, 15, 17, 19, 22, 24, 26, 28, 31, 33, 35, 37, 40, 42, 44, 46, 49, 51, 53, 55, 58, 60, 62, 64, 67, 69, 71, 73, 76, 78, 80, 82, 85, 87, 89, 91, 94, 96, 98, 100, 103, 105, 107, 109, 112, 114 | | | |
| 2 | −114, −112, −109, −107, −103, −100, −105, −98, −96, −94, −91, −89, −87, −85, −82, −80, −78, −76, −73, −71, −69, −67, −64, −62, −60, −58, −55, −53, −51, −49, −46, −44, −42, −40, −37, −33, −35, −31, −28, −26, −24, −22, −19, −17, −15, −13, −10, −8, 9, 11, 14, 16, 18, 20, 23, 25, 27, 29, 32, 34, 36, 38, 41, 43, 45, 47, 50, 52, 54, 56, 59, 63, 61, 65, 68, 70, 72, 74, 77, 79, 81, 83, 86, 88, 90, 92, 95, 97, 99, 101, 104, 108, 113, 110, 106, 115 | −116, 117 | −118, −4, 119, 5 | −120, −6, 7, 121 |

It can be learned from Table 6 that indices of DRUs 52 included in the DRU 106 whose index is 1 are 1 and 3, or indices of DRUs 26 included in the DRU 106 whose index is 1 are 1, 3, 6, and 8. Indices of DRUs 52 included in the DRU 106 whose index is 2 are 2 and 4, or indices of DRUs 26 included in the DRU 106 whose index is 2 are 2, 4, 7, and 9. It may be understood that because two 52-tone DRUs (or four 26-tone DRUs) include eight pilot subcarriers, and one 106-tone DRU needs only four pilot subcarriers, optionally, for a 106-tone DRU, four pilot subcarriers may be selected from the eight pilot subcarriers as pilot subcarriers of the 106-tone DRU, and the other four subcarriers are switched to data subcarriers (that is, the data subcarriers switched from the pilot subcarriers in Table 6). In other words, each 106-tone DRU includes 100 data subcarriers, two supplementary subcarriers, and four pilot subcarriers. Because the supplementary subcarrier is also a data subcarrier, it is equivalent that each 106-tone DRU includes 102 data subcarriers and four pilot subcarriers.

Example 2: In another 20 MHz tone plan, 216 subcarriers whose indices are [−117: −10, 10: 117] are used as a data subcarrier set on the 20 MHz bandwidth, 18 of a total of 22 subcarriers whose subcarrier range is [−122: −118, −9: −4, 4: 9, 118: 122] are used as pilot subcarriers, and the other four subcarriers are used as null subcarriers (for a 26-tone RU and a 52-tone RU) or are used as supplementary subcarriers of two 106-tone RUs.

In the 20 MHz tone plan, subcarriers included in a 26-tone DRU on the 20 MHz bandwidth are shown in the following Table 7a. It can be learned from Table 7a that start indices of data subcarriers in 26-tone DRUs whose indices are 1 to 9 are respectively −117, −116, −115, −114, −113, −112, −111, −110, and −109. For each 26-tone DRU, in a data subcarrier set (a total of 24 data subcarriers) included in each 26-tone DRU, two adjacent data subcarriers whose indices are both negative numbers are spaced by eight subcarriers, or in other words, an absolute value of a difference between indices of two adjacent data subcarriers whose indices are both negative numbers is 9; two adjacent data subcarriers whose indices are both positive numbers are spaced by eight subcarriers, or in other words, an absolute value of a difference between indices of two adjacent data subcarriers whose indices are both positive numbers is 9; and two adjacent data subcarriers whose indices are one positive number and one negative number are spaced by 27 subcarriers, or in other words, an absolute value of a difference between indices of two adjacent data subcarriers whose indices are one positive number and one negative number is 28. For adjacent 26-tone DRUs, a $j^{th}$ data subcarrier in a DRU 26 whose index is i is contiguous with a $j^{th}$ data subcarrier in a DRU 26 whose index is adjacent to i, that is, data subcarriers that are located at a same location in respective data subcarrier sets included in two adjacent DRUs are contiguous. Both i and j are positive integers. For example, a fifth data subcarrier (whose index is −78) in a DRU 26-4 (that is, a DRU whose index is 4) is contiguous with both a fifth data subcarrier (whose index is −77) in a DRU 26-5 (that is, a DRU whose index is 5) and a fifth data subcarrier (whose index is −79) in a DRU 26-3 (that is, a DRU whose index is 3); and a $24^{th}$ data subcarrier (whose index is 117) in a DRU 26-9 (that is, a DRU whose index is 9) is contiguous with a $24^{th}$ data subcarrier (whose index is 116) in a DRU 26-8 (that is, a DRU whose index is 8).

In addition, for pilot subcarriers included in a 26-tone DRU, in a possible implementation, each of the 26-tone DRUs whose indices are 1 to 9 includes two pilot subcarriers, and start indices of the pilot subcarriers are respectively −122, −121, −120, −119, −118, −7, −6, −5, and −4. Two pilot subcarriers included in a 26-tone DRU whose index is 5 are spaced by 235 subcarriers, or in other words, an absolute value of a difference between indices of two pilot subcarriers included in the 26-tone DRU whose index is 5 is 236. Pilot subcarriers included in each of the other eight DRUs 26 except the 26-tone DRU whose index is 5 are spaced by 125 subcarriers, or in other words, an absolute value of a difference between indices of pilot subcarriers included in each of the other eight DRUs 26 except the 26-tone DRU whose index is 5 is 126.

TABLE 7a

| DRU 26 index | Indices of data subcarriers belonging to a corresponding DRU 26 | Indices of pilot subcarriers belonging to the corresponding DRU 26 |
|---|---|---|
| 1 | −117, −108, −99, −90, −81, −72, −63, −54, −45, −36, −27, −18, 10, 19, 28, 37, 46, 55, 64, 73, 82, 91, 100, 109 | −122, 4 |
| 2 | −116, −107, −98, −89, −80, −71, −62, −53, −44, −35, −26, −17, 11, 20, 29, 38, 47, 56, 65, 74, 83, 92, 101, 110 | −121, 5 |
| 3 | −115, −106, −97, −88, −79, −70, −61, −52, −43, −34, −25, −16, 12, 21, 30, 39, 48, 57, 66, 75, 84, 93, 102, 111 | −120, 6 |
| 4 | −114, −105, −96, −87, −78, −69, −60, −51, −42, −33, −24, −15, 13, 22, 31, 40, 49, 58, 67, 76, 85, 94, 103, 112 | −119, 7 |
| 5 | −113, −104, −95, −86, −77, −68, −59, −50, −41, −32, −23, −14, 14, 23, 32, 41, 50, 59, 68, 77, 86, 95, 104, 113 | −118, 118 |
| 6 | −112, −103, −94, −85, −76, −67, −58, −49, −40, −31, −22, −13, 15, 24, 33, 42, 51, 60, 69, 78, 87, 96, 105, 114 | −7, 119 |
| 7 | −111, −102, −93, −84, −75, −66, −57, −48, −39, −30, −21, −12, 16, 25, 34, 43, 52, 61, 70, 79, 88, 97, 106, 115 | −6, 120 |
| 8 | −110, −101, −92, −83, −74, −65, −56, −47, −38, −29, −20, −11, 17, 26, 35, 44, 53, 62, 80, 89, 98, 71, 107, 116 | −5, 121 |
| 9 | −109, −100, −91, −82, −73, −64, −55, −46, −37, −28, −19, −10, 18, 27, 36, 45, 54, 63, 72, 81, 90, 99, 108, 117 | −4, 122 |

Similar to the DRU 26 in Example 1, data subcarriers included in each 26-tone DRU on the 20 MHz bandwidth shown in Table 7a may alternatively be represented in another form. For example, data subcarriers whose indices are positive numbers and data subcarriers whose indices are negative numbers that are included in each 26-tone DRU may be separately represented by using an equal-spaced sequence, that is, [a: b: c], where a represents a subcarrier index start value, b represents an absolute value of a difference between index values of adjacent subcarriers, and c represents a subcarrier index end value. Specifically, indices of data subcarriers included in the DRU 26 (DRU 26-1) whose index is 1 are represented as [−117: 9: −18] and [10: 9: 109]. Indices of data subcarriers included in the DRU 26 (DRU 26-2) whose index is 2 are represented as [−116: 9: −17] and [11: 9: 110]. Indices of data subcarriers included in the DRU 26 (DRU 26-3) whose index is 3 are represented as [−115: 9: −16] and [12: 9: 111]. Indices of data subcarriers included in the DRU 26 (DRU 26-4) whose index is 4 are represented as [−114: 9: −15] and [13: 9: 112]. Indices of data subcarriers included in the DRU 26 (DRU 26-5) whose index is 5 are represented as [−113: 9: −14] and [14: 9: 113]. Indices of data subcarriers included in the DRU 26 (DRU 26-6) whose index is 6 are represented as [−112: 9: −13] and [15: 9: 114]. Indices of data subcarriers included in the DRU 26 (DRU 26-7) whose index is 7 are represented as [−111: 9: −12] and [16: 9: 115]. Indices of data subcarriers included in the DRU 26 (DRU 26-8) whose index is 8 are represented as [−110: 9: −11] and [17: 9: 116]. Indices of data subcarriers included in the DRU 26 (DRU 26-9) whose index is 9 are represented as [−109: 9: −10] and [18: 9: 117]. Briefly, Table 7a may be replaced with Table 7b in terms of description.

TABLE 7b

| DRU 26 index | Indices of data subcarriers belonging to a corresponding DRU 26 | Indices of pilot subcarriers belonging to the corresponding DRU 26 |
|---|---|---|
| 1 | [−117: 9: −18] and [10: 9: 109] | −122, 4 |
| 2 | [−116: 9: −17] and [11: 9: 110] | −121, 5 |
| 3 | [−115: 9: −16] and [12: 9: 111] | −120, 6 |
| 4 | [−114: 9: −15] and [13: 9: 112] | −119, 7 |
| 5 | [−113: 9: −14] and [14: 9: 113] | −118, 118 |
| 6 | [−112: 9: −13] and [15: 9: 114] | −7, 119 |

TABLE 7b-continued

| DRU 26 index | Indices of data subcarriers belonging to a corresponding DRU 26 | Indices of pilot subcarriers belonging to the corresponding DRU 26 |
|---|---|---|
| 7 | [−111: 9: −12] and [16: 9: 115] | −6, 120 |
| 8 | [−110: 9: −11] and [17: 9: 116] | −5, 121 |
| 9 | [−109: 9: −10] and [18: 9: 117] | −4, 122 |

In the 20 MHz tone plan, the 20 MHz bandwidth may include four 52-tone DRUs, and it may be considered that each 52-tone DRU includes two 26-tone DRUs. Specifically included subcarriers are shown in the following Table 8. It can be learned from Table 8 that start indices of data subcarriers in 52-tone DRUs whose indices are 1 to 4 are respectively −117, −116, −115, and −114. For each 52-tone DRU, in a data subcarrier set (a total of 48 data subcarriers) included in each 52-tone DRU, an absolute value of a difference between index values of two adjacent subcarriers whose indices are both positive numbers and an absolute value of a difference between index values of two adjacent subcarriers whose indices are both negative numbers alternately appear as [5, 4], or in other words, a quantity of subcarriers spaced between two adjacent subcarriers whose indices are both positive numbers and a quantity of subcarriers spaced between two adjacent subcarriers whose indices are both negative numbers alternately appear as [4, 3]. In the data subcarrier set (the total of 48 data subcarriers) included in each 52-tone DRU, two adjacent data subcarriers whose indices are one positive number and one negative number are spaced by 22 subcarriers, or in other words, an absolute value of a difference between indices of two adjacent data subcarriers whose indices are one positive number and one negative number is 23. For adjacent 52-tone DRUs, a $j^{th}$ data subcarrier in a DRU 52 whose index is i is contiguous with a $j^{th}$ data subcarrier in a DRU 52 whose index is adjacent to i, that is, data subcarriers that are located at a same location in respective data subcarrier sets included in two adjacent DRUs are contiguous.

In addition, for pilot subcarriers included in a 52-tone DRU, in a possible implementation, in four pilot subcarriers included in each DRU 52, two adjacent pilot subcarriers whose indices are both positive numbers and two adjacent pilot subcarriers whose indices are both negative numbers are each spaced by 114 subcarriers, or in other words, an absolute value of a difference between indices of two adjacent pilot subcarriers whose indices are both positive numbers and an absolute value of a difference between indices of two adjacent pilot subcarriers whose indices are both negative numbers are each 115; and two adjacent subcarriers whose indices are one positive number and one negative number are spaced by 10 subcarriers, or in other words, an absolute value of a difference between indices of two adjacent pilot subcarriers whose indices are one positive number and one negative number is 11.

TABLE 8

| DRU 52 index | Indices of DRUs 26 belonging to a corresponding DRU 52 | Indices of data subcarriers belonging to the corresponding DRU 52 | Indices of pilot subcarriers belonging to the corresponding DRU 52 |
|---|---|---|---|
| 1 | 1, 6 | −117, −112, −108, −103, −99, −94, −90, −85, −81, −76, −72, −67, −63, −58, −54, −49, −45, −40, −36, −31, −27, −22, −18, −13, 10, 15, 19, 24, 28, 33, 37, 42, 46, 51, 55, 60, 64, 69, 73, 78, 82, 87, 91, 96, 100, 105, 109, 114 | −122, −7, 4, 119 |
| 2 | 2, 7 | −116, −111, −107, −102, −98, −93, −89, −84, −80, −75, −71, −66, −62, −57, −53, −48, −44, −39, −35, −30, −26, −21, −17, −12, 11, 16, 20, 25, 29, 34, 38, 43, 47, 52, 56, 61, 65, 70, 74, 79, 83, 88, 92, 97, 101, 106, 110, 115 | −121, −6, 5, 120 |
| 3 | 3, 8 | −115, −110, −106, −101, −97, −92, −88, −83, −79, −74, −70, −65, −61, −56, −52, −47, −43, −38, −34, −29, −25, −20, −16, −11, 12, 17, 21, 26, 30, 35, 39, 44, 48, 53, 57, 62, 66, 71, 75, 80, 84, 89, 93, 98, 102, 107, 111, 116 | −120, −5, 6, 121 |
| 4 | 4, 9 | −114, −109, −105, −100, −96, −91, −87, −82, −78, −73, −69, −64, −60, −55, −51, −46, −42, −37, −33, −28, −24, −19, −15, −10, 13, 18, 22, 27, 31, 36, 40, 45, 49, 54, 58, 63, 67, 72, 76, 81, 85, 90, 94, 99, 103, 108, 112, 117 | −119, −4, 7, 122 |

In the 20 MHz tone plan, the 20 MHz bandwidth may include two 106-tone DRUs, and each 106-tone DRU includes 102 data subcarriers and four pilot subcarriers. It may be considered that each 106-tone DRU includes two 52-tone DRUs and two supplementary subcarriers. In other words, it may alternatively be considered that each 106-tone DRU includes four 26-tone DRUs and two supplementary subcarriers. Specifically included subcarriers are shown in the following Table 9. Pilot subcarriers, supplementary subcarriers, and data subcarriers switched from pilot subcarriers in a 106-tone DRU are not considered. In this case, it can be learned from Table 9 that start indices of data subcarriers in 106-tone DRUs whose indices are 1 and 2 are respectively −117 and −116. In a data subcarrier set included in each 106-tone DRU (a total of 96 data subcarriers, where the 96 data subcarriers herein are data subcarriers in the two 52-tone DRUs included in the 106-tone DRU), a value of a quantity of subcarriers spaced between two adjacent subcarriers whose indices are both positive numbers and a value of a quantity of subcarriers spaced between two adjacent subcarriers whose indices are both negative numbers alternately appear as [1, 2, 1, 1], or in other words, an absolute value of a difference between index values of two adjacent subcarriers whose indices are both positive numbers and an absolute value of a difference between index values of two adjacent subcarriers whose indices are both negative numbers alternately appear as [2, 3, 2, 2]. In the data subcarrier set (the total of 96 data subcarriers) included in each 106-tone DRU, two adjacent data subcarriers whose indices are one positive number and one negative number are spaced by 20 subcarriers, or in other words, an absolute value of a difference between index values of two adjacent data subcarriers whose indices are one positive number and one negative number is 21. For adjacent 106-tone DRUs, a $j^{th}$ data subcarrier in a DRU 106 whose index is i is contiguous with a $j^{th}$ data subcarrier in a DRU 106 whose index is adjacent to i, that is, data subcarriers that are located at a same location in respective data subcarrier sets included in two adjacent DRUs are contiguous.

In addition, for pilot subcarriers included in a 106-tone DRU, in a possible implementation, in four pilot subcarriers included in each DRU 106, two adjacent pilot subcarriers whose indices are both positive numbers and two adjacent pilot subcarriers whose indices are both negative numbers are each spaced by 114 subcarriers, or in other words, an absolute value of a difference between index values of two adjacent pilot subcarriers whose indices are both positive numbers and an absolute value of a difference between index values of two adjacent pilot subcarriers whose indices are both negative numbers are each 115; and two adjacent subcarriers whose indices are one positive number and one negative number are spaced by 12 subcarriers, or in other words, an absolute value of a difference between index values of two adjacent subcarriers whose indices are one positive number and one negative number is 13.

TABLE 9

| | Indices of data subcarriers belonging to a corresponding DRU 106 | | | Indices of pilot |
|---|---|---|---|---|
| DRU 106 index | Indices of data subcarriers included in DRUs 52 or DRUs 26 belonging to the corresponding DRU 106 | Supplementary subcarriers | Data subcarriers switched from pilot subcarriers | subcarriers belonging to the corresponding DRU 106 |
| 1 | −117, −115, −112, −110, −108, −106, −103, −101, −99, −97, −94, −92, −90, −88, −85, −83, −81, −79, −76, −74, −72, −70, −67, −65, −63, −61, −58, −56, −54, −52, −49, −47, −45, −43, −40, −38, −36, −34, −31, −29, −27, −25, −22, −20, −18, −16, −13, −11, 10, 12, 15, 17, 19, 21, 24, 26, 28, 30, 33, 35, 37, 39, 42, 44, 46, 48, 51, 53, 55, 57, 60, 62, 64, 66, 69, 71, 73, 75, 78, 80, 82, 84, 87, 89, 91, 93, 96, 98, 100, 102, 105, 107, 109, 111, 114, 116 | −9, 8 | −120, −5, 4, 119 | −122, −7, 6, 121 |
| 2 | −116, −114, −111, −109, −107, −105, −102, −100, −98, −96, −93, −91, −89, −87, −84, −82, −80, −78, −75, −73, −71, −69, −66, −64, −62, −60, −57, −55, −53, −51, −48, −46, −44, −42, −39, −37, −35, −33, −30, −28, −26, −24, −21, −19, −17, −15, −12, −10, 11, 13, 16, 18, 20, 22, 25, 27, 29, 31, 34, 36, 38, 40, 43, 45, 47, 49, 52, 54, 56, 58, 61, 63, 65, 67, 70, 72, 74, 76, 79, 81, 83, 85, 88, 90, 92, 94, 97, 99, 101, 103, 106, 108, 110, 112, 115, 117 | −8, 9 | −119, −4, 5, 120 | −121, −6, 7, 122 |

It can be learned from Table 9 that indices of DRUs 52 included in the DRU 106 whose index is 1 are 1 and 3, or indices of DRUs 26 included in the DRU 106 whose index is 1 are 1, 3, 6, and 8. Indices of DRUs 52 included in the DRU 106 whose index is 2 are 2 and 4, or indices of DRUs 26 included in the DRU 106 whose index is 2 are 2, 4, 7, and 9. It may be understood that because two 52-tone DRUs (or four 26-tone DRUs) include eight pilot subcarriers, and one 106-tone DRU needs only four pilot subcarriers, optionally, for a 106-tone DRU, four pilot subcarriers may be selected from the eight pilot subcarriers as pilot subcarriers of the 106-tone DRU, and the other four subcarriers are switched to data subcarriers (that is, the data subcarriers switched from the pilot subcarriers in Table 9). In other words, each 106-tone DRU includes 100 data subcarriers, two supplementary subcarriers, and four pilot subcarriers. Because the supplementary subcarrier is also a data subcarrier, it is equivalent that each 106-tone DRU includes 102 data subcarriers and four pilot subcarriers.

Example 3: In still another 20 MHz tone plan, 216 subcarriers whose indices are [−113: −6, 6: 113] are used as a data subcarrier set on the 20 MHz bandwidth, 18 of a total of 22 subcarriers whose subcarrier range is [−122: −114, −5:

−4, 4: 5, 114: 122] are used as pilot subcarriers, and the other four subcarriers are used as null subcarriers (for a 26-tone RU and a 52-tone RU) or are used as supplementary subcarriers of two 106-tone RUs.

In the 20 MHz tone plan, subcarriers included in a 26-tone DRU on the 20 MHz bandwidth are shown in the following Table 10a. It can be learned from Table 10a that start indices of data subcarriers in 26-tone DRUs whose indices are 1 to 9 are respectively −113, −112, −111, −110, −109, −108, −107, −106, and −105. For each 26-tone DRU, in a data subcarrier set (a total of 24 data subcarriers) included in each 26-tone DRU, two adjacent data subcarriers whose indices are both negative numbers are spaced by eight subcarriers, or in other words, an absolute value of a difference between indices of two adjacent data subcarriers whose indices are both negative numbers is 9; two adjacent data subcarriers whose indices are both positive numbers are spaced by eight subcarriers, or in other words, an absolute value of a difference between indices of two adjacent data subcarriers whose indices are both positive numbers is 9; and two adjacent data subcarriers whose indices are one positive number and one negative number are spaced by 19 subcarriers, or in other words, an absolute value of a difference between indices of two adjacent data subcarriers whose indices are one positive number and one negative number is 20. For adjacent 26-tone DRUs, a $j^{th}$ data subcarrier in a DRU 26 whose index is i is contiguous with a $j^{th}$ data subcarrier in a DRU 26 whose index is adjacent to i, that is, data subcarriers that are located at a same location in respective data subcarrier sets included in two adjacent DRUs are contiguous. Both i and j are positive integers. For example, an eighth data subcarrier (whose index is −46) in a DRU 26-5 (that is, a DRU whose index is 5) is contiguous with both an eighth data subcarrier (whose index is −45) in a DRU 26-6 (that is, a DRU whose index is 6) and an eighth data subcarrier (whose index is −47) in a DRU 26-4 (that is, a DRU whose index is 4); and a $20^{th}$ data subcarrier (whose index is 77) in a DRU 26-9 (that is, a DRU whose index is 9) is contiguous with a $20^{th}$ data subcarrier (whose index is 76) in a DRU 26-8 (that is, a DRU whose index is 8).

In addition, for pilot subcarriers included in a 26-tone DRU, in a possible implementation, each of the 26-tone DRUs whose indices are 1 to 9 includes two pilot subcarriers, and start indices of the pilot subcarriers are respectively −5, −4, −122, −121, −120, −119, −118, −117, and −116. Two pilot subcarriers included in each of 26-tone DRUs whose indices are 3, 4, 5, 6, and 7 are spaced by 239 subcarriers, or in other words, an absolute value of a difference between indices of two pilot subcarriers included in each of 26-tone DRUs whose indices are 3, 4, 5, 6, and 7 is 240. Pilot subcarriers included in each of DRUs 26 whose indices are 1, 2, 8, and 9 are spaced by 120 subcarriers, or in other words, an absolute value of a difference between indices of pilot subcarriers included in each of the other eight DRUs 26 whose indices are 1, 2, 8, and 9 is 121.

TABLE 10a

| DRU 26 index | Indices of data subcarriers belonging to a corresponding DRU 26 | Indices of pilot subcarriers belonging to the corresponding DRU 26 |
|---|---|---|
| 1 | −113, −104, −95, −86, −77, −68, −59, −50, −41, −32, −23, −14, 6, 15, 24, 33, 42, 51, 60, 69, 78, 87, 96, 105 | −5, 116 |
| 2 | −112, −103, −94, −85, −76, −67, −58, −49, −40, −31, −22, −13, 7, 16, 25, 34, 43, 52, 61, 70, 79, 88, 97, 106 | −4, 117 |
| 3 | −111, −102, −93, −84, −75, −66, −57, −48, −39, −30, −21, −12, 8, 17, 26, 35, 44, 53, 62, 71, 80, 89, 98, 107 | −122, 118 |
| 4 | −110, −101, −92, −83, −74, −65, −56, −47, −38, −29, −20, −11, 9, 18, 27, 36, 45, 54, 63, 72, 81, 90, 99, 108 | −121, 119 |
| 5 | −109, −100, −91, −82, −73, −64, −55, −46, −37, −28, −19, −10, 10, 19, 28, 37, 46, 55, 64, 73, 82, 91, 100, 109 | −120, 120 |
| 6 | −108, −99, −90, −81, −72, −63, −54, −45, −36, −27, −18, −9, 11, 20, 29, 38, 47, 56, 65, 74, 83, 92, 101, 110 | −119, 121 |
| 7 | −107, −98, −89, −80, −71, −62, −53, −44, −35, −26, −17, −8, 12, 21, 30, 39, 48, 57, 66, 75, 84, 93, 102, 111 | −118, 122 |
| 8 | −106, −97, −88, −79, −70, −61, −52, −43, −34, −25, −16, −7, 13, 22, 31, 40, 49, 58, 67, 76, 85, 94, 103, 112 | −117, 4 |
| 9 | −105, −96, −87, −78, −69, −60, −51, −42, −33, −24, −15, −6, 14, 23, 32, 41, 50, 59, 68, 77, 86, 95, 104, 113 | −116, 5 |

Similar to the DRU 26 in Example 1, data subcarriers included in each 26-tone DRU on the 20 MHz bandwidth shown in Table 10a may alternatively be represented in another form. For example, data subcarriers whose indices are positive numbers and data subcarriers whose indices are negative numbers that are included in each 26-tone DRU may be separately represented by using an equal-spaced sequence, that is, [a: b: c], where a represents a subcarrier index start value, b represents an absolute value of a difference between index values of adjacent subcarriers, and c represents a subcarrier index end value. Specifically, indices of data subcarriers included in the DRU 26 (DRU 26-1) whose index is 1 are represented as [−113: 9: −14] and [6: 9: 105]. Indices of data subcarriers included in the DRU 26 (DRU 26-2) whose index is 2 are represented as [−112: 9: −13] and [7: 9: 106]. Indices of data subcarriers included in the DRU 26 (DRU 26-3) whose index is 3 are represented as [−111: 9: −12] and [8: 9: 107]. Indices of data subcarriers included in the DRU 26 (DRU 26-4) whose index is 4 are represented as [−110: 9: −11] and [9: 9: 108]. Indices of data subcarriers included in the DRU 26 (DRU 26-5) whose index is 5 are represented as [−109: 9: −10] and [10: 9: 109]. Indices of data subcarriers included in the DRU 26 (DRU 26-6) whose index is 6 are represented as [−108: 9: −9] and [11: 9: 110]. Indices of data subcarriers included in the DRU 26 (DRU 26-7) whose index is 7 are represented as [−107: 9: −8] and [12: 9: 111]. Indices of data subcarriers included in the DRU 26 (DRU 26-8) whose index is 8 are represented as [−106: 9: −7] and [13: 9: 112]. Indices of data subcarriers included in the DRU 26 (DRU 26-9) whose index is 9 are represented as [−105: 9: −6] and [14: 9: 113]. Briefly, Table 10a may be replaced with Table 10b.

TABLE 10b

| DRU 26 index | Indices of data subcarriers belonging to a corresponding DRU 26 | Indices of pilot subcarriers belonging to the corresponding DRU 26 |
|---|---|---|
| 1 | [−113: 9: −14] and [6: 9: 105] | −5, 116 |
| 2 | [−112: 9: −13] and [7: 9: 106] | −4, 117 |
| 3 | [−111: 9: −12] and [8: 9: 107] | −122, 118 |
| 4 | [−110: 9: −11] and [9: 9: 108] | −121, 119 |
| 5 | [−109: 9: −10] and [10: 9: 109] | −120, 120 |
| 6 | [−108: 9: −9] and [11: 9: 110] | −119, 121 |
| 7 | [−107: 9: −8] and [12: 9: 111] | −118, 122 |
| 8 | [−106: 9: −7] and [13: 9: 112] | −117, 4 |
| 9 | [−105: 9: −6] and [14: 9: 113] | −116, 5 |

In the 20 MHz tone plan, the 20 MHz bandwidth may include four 52-tone DRUs, and it may be considered that each 52-tone DRU includes two 26-tone DRUs. Specifically included subcarriers are shown in the following Table 11. It can be learned from Table 11 that start indices of data subcarriers in 52-tone DRUs whose indices are 1 to 4 are respectively −113, −112, −111, and −110. For each 52-tone DRU, in a data subcarrier set (a total of 48 data subcarriers) included in each 52-tone DRU, an absolute value of a difference between index values of two adjacent subcarriers whose indices are both positive numbers and an absolute value of a difference between index values of two adjacent subcarriers whose indices are both negative numbers alternately appear as [5, 4], or in other words, a quantity of subcarriers spaced between two adjacent subcarriers whose indices are both positive numbers and a quantity of subcarriers spaced between two adjacent subcarriers whose indices are both negative numbers alternately appear as [4, 3]. In the data subcarrier set (the total of 48 data subcarriers) included in each 52-tone DRU, two adjacent data subcarriers whose indices are one positive number and one negative number are spaced by 14 subcarriers, or in other words, an absolute value of a difference between indices of two adjacent data subcarriers whose indices are one positive number and one negative number is 15. For adjacent 52-tone DRUs, a $j^{th}$ data subcarrier in a DRU 52 whose index is i is contiguous with a $j^{th}$ data subcarrier in a DRU 52 whose index is adjacent to i, that is, data subcarriers that are located at a same location in respective data subcarrier sets included in two adjacent DRUs are contiguous.

In addition, for pilot subcarriers included in a 52-tone DRU, in a possible implementation, two adjacent pilot subcarriers whose indices are both negative numbers in four pilot subcarriers included in each of DRUs 52 whose indices are 1 and 2 are spaced by 113 subcarriers, or in other words, an absolute value of a difference between indices of two adjacent pilot subcarriers whose indices are both negative numbers is 114; two adjacent pilot subcarriers whose indices are both positive numbers are spaced by four subcarriers, or an absolute value of a difference between indices of two adjacent pilot subcarriers whose indices are both positive numbers is 5; and two adjacent subcarriers whose indices are one positive number and one negative number are spaced by 120 subcarriers, or in other words, an absolute value of a difference between indices of two adjacent pilot subcarriers whose indices are one positive number and one negative number is 121. Two adjacent pilot subcarriers whose indices are both negative numbers in four pilot subcarriers included in each of DRUs 52 whose indices are 3 and 4 are spaced by four subcarriers, or in other words, an absolute value of a difference between indices of two adjacent pilot subcarriers whose indices are both negative numbers is 5; two adjacent pilot subcarriers whose indices are both positive numbers are spaced by 113 subcarriers, or an absolute value of a difference between indices of two adjacent pilot subcarriers whose indices are both positive numbers is 114; and two adjacent subcarriers whose indices are one positive number and one negative number are spaced by 234 subcarriers, or in other words, an absolute value of a difference between indices of two adjacent pilot subcarriers whose indices are one positive number and one negative number is 235.

TABLE 11

| DRU 52 index | Indices of data subcarriers belonging to the corresponding DRU 52 | Indices of pilot subcarriers belonging to the corresponding DRU 52 |
|---|---|---|
| 1 | −113, −108, −104, −99, −95, −90, −86, −81, −77, −72, −68, −63, −59, −54, −50, −45, −41, −36, −32, −27, −23, −18, −14, −9, 6, 11, 15, 20, 24, 29, 33, 38, 42, 47, 51, 56, 60, 65, 69, 74, 78, 87, 83, 92, 96, 101, 105, 110 | −119, −5, 116, 121 |
| 2 | −112, −107, −103, −98, −94, −89, −85, −80, −76, −71, −67, −62, −58, −53, −49, −44, −40, −35, −31, −26, −22, −17, −13, −8, 7, 12, 16, 21, 25, 30, 34, 39, 43, 48, 52, 57, 61, 66, 70, 75, 79, 84, 88, 93, 97, 102, 106, 111 | −118, −4, 117, 122 |
| 3 | −111, −106, −102, −97, −93, −88, −84, −79, −75, −70, −66, −61, −57, −52, −48, −43, −39, −34, −30, −25, −21, −16, −12, −7, 8, 13, 17, 22, 26, 31, 35, 40, 44, 49, 53, 58, 62, 67, 71, 76, 80, 85, 89, 94, 98, 103, 107, 112 | −122, −117, 118, 4 |

TABLE 11-continued

| DRU 52 index | Indices of data subcarriers belonging to the corresponding DRU 52 | Indices of pilot subcarriers belonging to the corresponding DRU 52 |
|---|---|---|
| 4 | −110, −105, −101, −96, −92, −87, −83, −78, −74, −69, −65, −60, −56, −51, −47, −42, −38, −33, −29, −24, −20, −15, −11, 6, 9, 14, 18, 23, 27, 32, 36, 41, 45, 50, 54, 59, 63, 68, 72, 77, 81, 86, 90, 95, 99, 108, 104, 113 | −121, −116, 119, 5 |

In the 20 MHz tone plan, the 20 MHz bandwidth may include two 106-tone DRUs, and each 106-tone DRU includes 102 data subcarriers and four pilot subcarriers. It may be considered that each 106-tone DRU includes two 52-tone DRUs and two supplementary subcarriers. In other words, it may alternatively be considered that each 106-tone DRU includes four 26-tone DRUs and two supplementary subcarriers. Specifically included subcarriers are shown in the following Table 12. Pilot subcarriers, supplementary subcarriers, and data subcarriers switched from pilot subcarriers in a 106-tone DRU are not considered. In this case, it can be learned from Table 12 that start indices of data subcarriers in 106-tone DRUs whose indices are 1 and 2 are respectively −113 and −112. In a data subcarrier set included in each 106-tone DRU (a total of 96 data subcarriers, where the 96 data subcarriers herein are data subcarriers in the two 52-tone DRUs included in the 106-tone DRU), a quantity of subcarriers spaced between two adjacent subcarriers whose indices are both positive numbers and a quantity of subcarriers spaced between two adjacent subcarriers whose indices are both negative numbers alternately appear as [1, 2, 1, 1], or in other words, an absolute value of a difference between index values of two adjacent subcarriers whose indices are both positive numbers and an absolute value of a difference between index values of two adjacent subcarriers whose indices are both negative numbers alternately appear as [2, 3, 2, 2]. In the data subcarrier set (the total of 96 data subcarriers) included in each 106-tone DRU, two adjacent data subcarriers whose indices are one positive number and one negative number are spaced by 12 subcarriers, or in other words, an absolute value of a difference between index values of two adjacent data subcarriers whose indices are one positive number and one negative number is 13. For adjacent 106-tone DRUs, a $j^{th}$ data subcarrier in a DRU 106 whose index is i is contiguous with a $j^{th}$ data subcarrier in a DRU 106 whose index is adjacent to i, that is, data subcarriers that are located at a same location in respective data subcarrier sets included in two adjacent DRUs are contiguous.

In addition, for pilot subcarriers included in a 106-tone DRU, in a possible implementation, in four pilot subcarriers included in each DRU 106, two adjacent pilot subcarriers whose indices are both positive numbers and two adjacent pilot subcarriers whose indices are both negative numbers are each spaced by 116 subcarriers, or in other words, an absolute value of a difference between index values of two adjacent pilot subcarriers whose indices are both positive numbers and an absolute value of a difference between index values of two adjacent pilot subcarriers whose indices are both negative numbers are each 117; and two adjacent subcarriers whose indices are one positive number and one negative number are spaced by 8 subcarriers, or in other words, an absolute value of a difference between index values of two adjacent subcarriers whose indices are one positive number and one negative number is 9.

TABLE 12

| DRU 106 index | Indices of data subcarriers belonging to a corresponding DRU 106 | | | Indices of pilot subcarriers belonging to the corresponding DRU 106 |
|---|---|---|---|---|
| | Indices of data subcarriers included in DRUs 52 or DRUs 26 belonging to the corresponding DRU 106 | Supplementary subcarriers | Data subcarriers switched from pilot subcarriers | |
| 1 | −113, −111, −108, −106, −104, −102, −99, −97, −95, −93, −90, −88, −86, −84, −81, −79, −77, −75, −72, −70, −68, −66, −63, −61, −59, −57, −54, −52, −50, −48, −45, −43, −41, −39, −36, −34, −32, −30, −27, −25, −23, −21, −18, −16, −14, −12, −9, −7, 6, 8, 11, 13, 15, 17, 20, 22, 24, 26, 29, 31, 33, 35, 38, 40, 42, 44, 47, 49, 51, 53, 56, 58, 60, 62, 65, 67, 69, 71, 74, 76, 78, 80, 83, 85, 87, 89, 92, 94, 96, 98, 101, 103, 105, 107, 110, 112 | −115, 114 | −119, −117, 116, 118 | −122, −5, 4, 121 |
| 2 | −112, −110, −107, −105, −103, −101, −98, −96, −94, −92, −89, −87, −85, −83, −80, −78, −76, −74, −71, −69, −67, −65, −62, −60, −58, −56, −53, −51, −49, −47, −44, −42, −40, −38, −35, −33, −31, | −114, 115 | −118, −116, 117, 119 | −121, −4, 5, 122 |

TABLE 12-continued

| | Indices of data subcarriers belonging to a corresponding DRU 106 | | | Indices of pilot |
|---|---|---|---|---|
| DRU 106 index | Indices of data subcarriers included in DRUs 52 or DRUs 26 belonging to the corresponding DRU 106 | Supplementary subcarriers | Data subcarriers switched from pilot subcarriers | subcarriers belonging to the corresponding DRU 106 |
| | −29, −26, −24, −22, −20, −17, −15, −13, −11, −8, −6, 7, 9, 12, 14, 16, 18, 21, 23, 25, 27, 30, 32, 34, 36, 39, 41, 43, 45, 48, 50, 52, 54, 57, 59, 61, 63, 66, 68, 70, 72, 75, 77, 79, 81, 84, 86, 88, 90, 93, 95, 97, 99, 102, 104, 106, 108, 111, 113 | | | |

It can be learned from Table 12 that indices of DRUs 52 included in the DRU 106 whose index is 1 are 1 and 3, or indices of DRUs 26 included in the DRU 106 whose index is 1 are 1, 3, 6, and 8. Indices of DRUs 52 included in the DRU 106 whose index is 2 are 2 and 4, or indices of DRUs 26 included in the DRU 106 whose index is 2 are 2, 4, 7, and 9. It may be understood that because two 52-tone DRUs (or four 26-tone DRUs) include eight pilot subcarriers, and one 106-tone DRU needs only four pilot subcarriers, optionally, for a 106-tone DRU, four pilot subcarriers may be selected from the eight pilot subcarriers as pilot subcarriers of the 106-tone DRU, and the other four subcarriers are switched to data subcarriers (that is, the data subcarriers switched from the pilot subcarriers in Table 12). In other words, each 106-tone DRU includes 100 data subcarriers, two supplementary subcarriers, and four pilot subcarriers. Because the supplementary subcarrier is also a data subcarrier, it is equivalent that each 106-tone DRU includes 102 data subcarriers and four pilot subcarriers.

A person skilled in the art may understand that the standard may use any one of or an appropriate alternative of another combination of the foregoing 20 MHz tone plans.

For example, pilot subcarriers of a DRU in the foregoing examples meet a corresponding combination relationship. For example, pilot subcarriers of a DRU 52 are a set of pilot subcarriers of DRUs 26 that constitute the DRU 52. It should be noted that this combination relationship is merely an example. Pilot subcarriers of DRUs of various sizes may be replaced with other subcarrier combinations. In other words, the combination relationship may not be met, but other subcarriers in the pilot subcarrier set mentioned above are used as pilot subcarriers. This is not limited in this application.

Based on the 20 MHz tone plan used in the foregoing standard, the access point may schedule any DRU in a 20 MHz tone plan used in the standard, or may schedule a plurality of DRUs that do not conflict with each other; and allocate each DRU to one or more different stations. The foregoing description "do not conflict with each other" means that there is no same subcarrier or no overlap (overlap). For example, a DRU 106 whose index is 1 is allocated to one or more stations, a DRU 52 whose index is 2 is allocated to one or more other stations, a DRU 26 whose index is 4 is allocated to one or more still other stations, and a DRU 26 whose index is 9 is allocated to one or more yet other stations. Other embodiments are similar, and details are not described herein.

Specifically, in one uplink scheduling, either a continuous RU or a discrete RU is used. Generally, the continuous RU and the discrete RU are not allocated at the same time. Therefore, on the premise that whether the current RU is the continuous RU or the discrete RU is indicated in a manner, only a piece of resource block allocation signaling may be required in scheduling information. A person skilled in the art may understand that, in the foregoing implementations, an existing continuous RU allocation signaling indication field may be reused for DRU allocation, but a meaning of the field is replaced with an indication for the DRU, for example, the indication manner shown in Table 3. Therefore, additional signaling overheads are reduced on the whole, so that complexity can be reduced. DRU allocation signaling may be an uplink RU allocation indication in a trigger frame or another MAC frame (for example, a triggered response scheduling (triggered response scheduling, TRS) field).

The foregoing content describes in detail subcarriers (data subcarriers and pilot subcarriers) included in each of different DRUs on the 20 MHz bandwidth. To make characteristics of a carrier plan for the DRU on the 20 MHz bandwidth clearer, the following describes characteristics followed by the carrier plan for the DRU on the 20 MHz bandwidth.

It may be understood that indices of data and pilot subcarriers on the 20 MHz bandwidth are [−122: −4, 4: 122].

Characteristic 1: A data subcarrier set and a pilot subcarrier set are included. For each 26-tone DRU and each 52-tone DRU on the 20 MHz bandwidth, a used data subcarrier set includes 216 subcarriers, and a used pilot subcarrier set includes 18 subcarriers. For each 106-tone DRU on the 20 MHz bandwidth, a used data subcarrier set includes 228 subcarriers, and a used pilot subcarrier set includes eight subcarriers.

In a possible implementation, data and pilot subcarriers whose indices are [−122: −4, 4: 122] are used as an initial subcarrier set, 216 subcarriers in the middle part of [−122: −4, 4: 122] are used as an initial data subcarrier set, the initial data subcarrier set is [−113: −6, 6: 113], 18 subcarriers in a subcarrier range [−122: −114, −5: −4, 4: 5, 114: 122] are used as pilot subcarriers, and the remaining four subcarriers are null subcarriers (for a 26-tone DRU and a 52-tone DRU) or are used as supplementary subcarriers of two 106-tone DRUs.

Alternatively, a negative frequency part of 216 subcarriers whose indices are [−113: −6, 6: 113] may be shifted leftward by y subcarriers, and a positive frequency part of the 216 subcarriers whose indices are [−113: −6, 6: 113] may be shifted rightward by z subcarriers. [−113−y: −6−y, 6+z: 113+z] is used as a data subcarrier set. 18 pilot subcarriers are selected from the remaining [−122: −114−y, −5−y: −4, 4: 5+z, 114+z: 122], and the remaining four subcarriers are null subcarriers (for a 26-tone RU and a 52-tone RU) or are used as supplementary subcarriers of two 106-tone RUs. y and z are positive integers, and y and z may be the same or may be different. Values of y and z may be 0, 1, 2, 3, 4, 5, 6, 7, 8, or 9. When y and z are different, the foregoing case in which negative subcarrier indices and positive subcarrier indices of the data subcarrier set are not completely symmetric occurs. It may be understood that if y=z=0, [−113: −6, 6: 113] is used as the data subcarrier set.

It should be noted that the initial data subcarrier set may be [−113: −6, 6: 113], or may be other 216 subcarriers in [−122: −4, 4: 122]. In other words, selection of the initial data subcarrier set is not limited in this application.

Characteristic 2: The data subcarrier set includes M subcarrier sets (tone sets), where M is greater than 18, and M is a positive integer. Preferably, M is 36 or 72. Quantities of subcarriers included in all subcarrier sets are the same, and indices of the subcarriers are evenly distributed as much as possible.

Characteristic 3: Data subcarriers in a DRU on the 20 MHz bandwidth include a plurality of evenly discrete subcarrier sets in the M subcarrier sets.

For example, data subcarriers of a 26-tone DRU include four evenly discrete subcarrier sets, and data subcarriers of a 52-tone DRU include eight evenly discrete subcarrier sets. In a possible implementation, M is equal to 36, and six data subcarriers included in each group of data subcarriers are discrete in frequency domain. Each group of data subcarriers includes three subcarriers whose indices are positive numbers and three subcarriers whose indices are negative numbers. That the indices of the subcarriers are "evenly distributed as much as possible" means that a spacing between two adjacent data subcarriers whose indices are both positive numbers or negative numbers in each group of data subcarriers is greater than 1 (the spacing herein may be understood as an absolute value of a difference between indices of the two adjacent data subcarriers). Spacings are the same as much as possible, or a change of a quantity of spaced subcarriers does not exceed 1 or 2. In addition, two adjacent data subcarriers whose indices are one positive number and one negative number in each group of data subcarriers are spaced by at least 46 subcarriers. For example, two adjacent data subcarriers whose indices are both negative numbers in each group of data subcarriers are spaced by 35 subcarriers, and two adjacent data subcarriers whose indices are both positive numbers in each group of data subcarriers are also spaced by 35 subcarriers. Two adjacent data subcarriers whose indices are one positive number and one negative number in each group of data subcarriers are spaced by at least 46 subcarriers. An $n^{th}$ data subcarrier of each group of data subcarriers in the 36 groups of data subcarriers is contiguous with an $n^{th}$ data subcarrier of a group of data subcarriers that is adjacent to the group of data subcarriers, where n is a positive integer.

Specifically, when y=z=2, that is, in a case corresponding to the carrier plan for a DRU in Example 1, it is equivalent that the negative frequency part of the 216 subcarriers whose indices are [−113: −6, 6: 113] is shifted leftward by two subcarriers, and the positive frequency part of the 216 subcarriers whose indices are [−113: −6, 6: 113] is shifted rightward by two subcarriers, that is, subcarriers whose indices are [−115: −8, 8: 115] are used as a data subcarrier set. Correspondingly, 18 subcarriers in 22 subcarriers whose indices are [−122: −116, −7: −4, 4: 7, 116: 122] are used as pilot subcarriers, and the remaining four subcarriers are null subcarriers (for a 26-tone RU and a 52-tone RU) or are used as supplementary subcarriers of two 106-tone RUs. A total of 216 data subcarriers whose indices are [−115: −8, 8: 115] are evenly divided into 36 groups. An index (or a number) of a first data subcarrier included in a first group of data subcarriers in the 36 groups of data subcarriers is −115. Two adjacent data subcarriers whose indices are one positive number and one negative number in each group of data subcarriers are spaced by 50 subcarriers. Two adjacent data subcarriers whose indices are both positive numbers and two adjacent data subcarriers whose indices are both negative numbers in each group of data subcarriers are each spaced by 35 subcarriers. Specifically, in each group of data subcarriers, a first data subcarrier and a second data subcarrier are spaced by 35 subcarriers, the second data subcarrier and a third data subcarrier are spaced by 35 subcarriers, the third data subcarrier and a fourth data subcarrier are spaced by 50 subcarriers, the fourth data subcarrier and a fifth data subcarrier are spaced by 35 subcarriers, and the fifth data subcarrier and a sixth data subcarrier are spaced by 35 subcarriers. Specifically, the following Table 13 shows indices of data subcarriers included in each group of data subcarriers in the 36 groups of data subcarriers. For example, as shown in Table 13, the first data subcarrier (whose index is −115) in the first group of data subcarriers is contiguous with a first data subcarrier (whose index is −114) in a second group of data subcarriers; and a third data subcarrier (whose index is −40) in a fourth group of data subcarriers is contiguous with both a third data subcarrier (whose index is −39) in a fifth group of data subcarriers and a third data subcarrier (whose index is −41) of a third group of data subcarriers.

TABLE 13

| Group 1 of data subcarriers on the 20 MHz bandwidth | |
|---|---|
| Number of a subcarrier set (tone set) | Subcarrier indices (tone indices) |
| 1 | −115, −79, −43, 8, 44, 80 |
| 2 | −114, −78, −42, 9, 45, 81 |
| 3 | −113, −77, −41, 10, 46, 82 |
| 4 | −112, −76, −40, 11, 47, 83 |
| 5 | −111, −75, −39, 12, 48, 84 |
| 6 | −110, −74, −38, 13, 49, 85 |
| 7 | −109, −73, −37, 14, 50, 86 |
| 8 | −108, −72, −36, 15, 51, 87 |
| 9 | −107, −71, −35, 16, 52, 88 |
| 10 | −106, −70, −34, 17, 53, 89 |
| 11 | −105, −69, −33, 18, 54, 90 |
| 12 | −104, −68, −32, 19, 55, 91 |
| 13 | −103, −67, −31, 20, 56, 92 |
| 14 | −102, −66, −30, 21, 57, 93 |
| 15 | −101, −65, −29, 22, 58, 94 |
| 16 | −100, −64, −28, 23, 59, 95 |
| 17 | −99, −63, −27, 24, 60, 96 |
| 18 | −98, −62, −26, 25, 61, 97 |
| 19 | −97, −61, −25, 26, 62, 98 |
| 20 | −96, −60, −24, 27, 63, 99 |
| 21 | −95, −59, −23, 28, 64, 100 |
| 22 | −94, −58, −22, 29, 65, 101 |
| 23 | −93, −57, −21, 30, 66, 102 |
| 24 | −92, −56, −20, 31, 67, 103 |
| 25 | −91, −55, −19, 32, 68, 104 |
| 26 | −90, −54, −18, 33, 69, 105 |
| 27 | −89, −53, −17, 34, 70, 106 |
| 28 | −88, −52, −16, 35, 71, 107 |
| 29 | −87, −51, −15, 36, 72, 108 |

TABLE 13-continued

| Group 1 of data subcarriers on the 20 MHz bandwidth | |
|---|---|
| Number of a subcarrier set (tone set) | Subcarrier indices (tone indices) |
| 30 | −86, −50, −14, 37, 73, 109 |
| 31 | −85, −49, −13, 38, 74, 110 |
| 32 | −84, −48, −12, 39, 75, 111 |
| 33 | −83, −47, −11, 40, 76, 112 |
| 34 | −82, −46, −10, 41, 77, 113 |

TABLE 13-continued

| Group 1 of data subcarriers on the 20 MHz bandwidth | |
|---|---|
| Number of a subcarrier set (tone set) | Subcarrier indices (tone indices) |
| 35 | −81, −45, −9, 42, 78, 114 |
| 36 | −80, −44, −8, 43, 79, 115 |

26-tone DRU: There are a total of nine 26-tone DRUs on the 20 MHz bandwidth, and each 26-tone DRU includes 24 data subcarriers (four groups in total) and two pilot subcarriers. Subcarriers (that is, subcarriers whose indices are [−122: −116, −7: −4, 4: 7, 114: 122]) other than a data subcarrier set on the 20 MHz bandwidth include nine groups of pilot subcarriers, each group of pilot subcarriers includes two pilot subcarriers, and the other four subcarriers are null subcarriers. The null subcarrier is an unused subcarrier. Each 26-tone DRU includes one group of pilot subcarriers. For example, the 26-tone DRU is constructed based on the foregoing described group of data subcarriers. Subcarriers included in each of the nine 26-tone DRUs on the 20 MHz bandwidth are shown in the following Table 14. Table 14 shows a data subcarrier set (corresponding to the group of data subcarriers in Table 13) and pilot subcarriers included in each 26-tone DRU. It can be learned that, a DRU 26 whose index is 1 is used as an example, and in this case, a quantity of subcarriers spaced between two adjacent data subcarriers whose indices are both positive numbers or both negative numbers is 8, and a change of a quantity of subcarriers spaced between two adjacent data subcarriers is 0.

TABLE 14

| Example of a subcarrier distribution of a DRU 26 | | | | | | | | | |
|---|---|---|---|---|---|---|---|---|---|
| DRU 26 | Index of a physical subcarrier belonging to a corresponding DRU 26/a subcarrier set | | | | | | | | |
| index | 1 | 2 | 3 | 4 | 5 | 6 | 7 | 8 | 9 |
| Data subcarrier set (a number of the subcarrier set) | 1, 10, 19, 28 | 2, 11, 20, 29 | 3, 12, 21, 30 | 4, 13, 22, 31 | 5, 14, 23, 32 | 6, 15, 24, 33 | 7, 16, 25, 34 | 8, 17, 26, 35 | 9, 18, 27, 36 |
| Pilot subcarriers (subcarrier indices) | −7, 118 | −6, 119 | −5, 120 | −4, 121 | −122, 122 | −121, 4 | −120, 5 | −119, 6 | −118, 7 |

52-tone DRU: There are a total of four 52-tone DRUs on the 20 MHz bandwidth, and each 52-tone DRU includes two 26-tone DRUs. In other words, each 52-tone DRU includes 48 data subcarriers (eight groups in total) and four pilot subcarriers (that is, two groups of pilot subcarriers). For example, a 52-tone DRU is constructed by using 26-tone DRUs. Subcarriers included in each of the four 52-tone DRUs on the 20 MHz bandwidth are shown in the following Table 15. Table 15 shows indices of DRUs 26 (corresponding to the DRUs 26 in Table 13) included in each 52-tone DRU.

TABLE 15

| Indices of DRUs 26 belonging to a corresponding DRU 52 | | | | |
|---|---|---|---|---|
| DRU 52 index | 1 | 2 | 3 | 4 |
| Indices of included DRUs 26 | 1, 6 | 2, 7 | 3, 8 | 4, 9 |
| Data subcarrier set (a number of the subcarrier set) | 1, 6, 10, 15, 19, 24, 28, 33 | 2, 7, 11, 16, 20, 25, 29, 34 | 3, 12, 21, 30, 8, 17, 26, 35 | 4, 13, 22, 31, 9, 18, 27, 36 |

106-tone DRU: There are a total of two 106-tone DRUs on the 20 MHz bandwidth, and each 106-tone DRU includes two 52-tone DRUs and two supplementary subcarriers. In other words, each 106-tone DRU includes 100 data subcarriers, two supplementary subcarriers, and four pilot subcarriers. Because the supplementary subcarrier is also a data subcarrier, each 106-tone DRU may also be understood as including 102 data subcarriers and four pilot subcarriers. For example, subcarriers included in each of the two 106-tone DRUs on the 20 MHz bandwidth are shown in the following Table 16. Because two 52-tone DRUs include eight pilot subcarriers, and one 106-tone DRU needs only four pilot subcarriers, optionally, four pilot subcarriers are selected from the eight pilot subcarriers in the 106-tone DRU as pilot subcarriers of the 106-tone DRU, and the other four pilot subcarriers are switched to data subcarriers (that is, indices of subcarriers that are switched to data subcarriers and that are in a DRU 52 or a DRU 26 in Table 16). Specifically, Table 16 shows indices of DRUs 26 (corresponding to the DRUs 26 in Table 14), DRUs 52 (corresponding to the DRUs 52 in Table 15), supplementary subcarriers (which are also data subcarriers), and pilot subcarriers that are included in each 106-tone DRU.

TABLE 16

| Indices of DRUs 26 and physical subcarriers belonging to a corresponding DRU 106, and a carrier shifting plan | | |
|---|---|---|
| DRU 106 index | 1 | 2 |
| Indices of included DRUs 52 | 1, 3 | 2, 4 |
| Indices of included DRUs 26 | 1, 3, 6, 8 | 2, 4, 7, 9 |
| Indices of included supplementary subcarriers | −117, 116 | −116, 117 |
| Indices of subcarriers that are switched to data subcarriers in the DRU 52 or the DRU 26 (pilot tones in the DRU 52 or the DRU 26 switched to data tones in the 106-tone DRU) | −119, 118, −5, 4 | −118, 119, −4, 5 |
| Pilot subcarriers in the 106-tone DRU (pilot tones in the 106-tone DRU) | −121, −7, 6, 120 | −120, −6, 7, 121 |

When y=z=4, that is, in a case corresponding to the carrier plan for a DRU in Example 2, it is equivalent that the negative frequency part of the 216 subcarriers whose indices are [−113: −6, 6: 113] is shifted leftward by four subcarriers, and the positive frequency part of the 216 subcarriers whose indices are [−113: −6, 6: 113] is shifted rightward by four subcarriers, that is, subcarriers whose indices are [−117: −10, 10: 117] are used as a data subcarrier set. Correspondingly, 18 subcarriers in 22 subcarriers whose indices are [−122: −118, −9: −4, 4: 9, 118: 122] are used as pilot subcarriers, and the remaining four subcarriers are null subcarriers (for a 26-tone RU and a 52-tone RU) or are used as supplementary subcarriers of two 106-tone RUs. A total of 216 data subcarriers whose indices are [−115: −8, 8: 115] are evenly divided into 36 groups. An index (or a number) of a first data subcarrier included in a first group of data subcarriers in the 36 groups of data subcarriers is −117. Two adjacent data subcarriers whose indices are one positive number and one negative number in each group of data subcarriers are spaced by 54 subcarriers. Two adjacent data subcarriers whose indices are both positive numbers and two adjacent data subcarriers whose indices are both negative numbers in each group of data subcarriers are each spaced by 35 subcarriers. Specifically, in each group of data subcarriers, a first data subcarrier and a second data subcarrier are spaced by 35 subcarriers, the second data subcarrier and a third data subcarrier are spaced by 35 subcarriers, the third data subcarrier and a fourth data subcarrier are spaced by 54 subcarriers, the fourth data subcarrier and a fifth data subcarrier are spaced by 35 subcarriers, and the fifth data subcarrier and a sixth data subcarrier are spaced by 35 subcarriers. Specifically, the following Table 17 shows indices of data subcarriers included in each group of data subcarriers in the 36 groups of data subcarriers. For example, as shown in Table 17, the first data subcarrier (whose index is −117) in the first group of data subcarriers is contiguous with a first data subcarrier (whose index is −116) in a second group of data subcarriers; and a fourth data subcarrier (whose index is 20) in an eleventh group of data subcarriers is contiguous with both a fourth data subcarrier (whose index is 21) in a twelfth group of data subcarriers and a fourth data subcarrier (whose index is 19) of a tenth group of data subcarriers.

TABLE 17

| Group 2 of data subcarriers on the 20 MHz bandwidth | |
|---|---|
| Number of a subcarrier set (tone set) | Subcarrier indices (tone indices) |
| 1 | −117, −81, −45, 10, 46, 82 |
| 2 | −116, −80, −44, 11, 47, 83 |
| 3 | −115, −79, −43, 12, 48, 84 |
| 4 | −114, −78, −42, 13, 49, 85 |
| 5 | −113, −77, −41, 14, 50, 86 |
| 6 | −112, −76, −40, 15, 51, 87 |
| 7 | −111, −75, −39, 16, 52, 88 |
| 8 | −110, −74, −38, 17, 53, 89 |
| 9 | −109, −73, −37, 18, 54, 90 |
| 10 | −108, −72, −36, 19, 55, 91 |
| 11 | −107, −71, −35, 20, 56, 92 |
| 12 | −106, −70, −34, 21, 57, 93 |
| 13 | −105, −69, −33, 22, 58, 94 |
| 14 | −104, −68, −32, 23, 59, 95 |
| 15 | −103, −67, −31, 24, 60, 96 |
| 16 | −102, −66, −30, 25, 61, 97 |
| 17 | −101, −65, −29, 26, 62, 98 |
| 18 | −100, −64, −28, 27, 63, 99 |
| 19 | −99, −63, −27, 28, 64, 100 |

TABLE 17-continued

| Group 2 of data subcarriers on the 20 MHz bandwidth | |
|---|---|
| Number of a subcarrier set (tone set) | Subcarrier indices (tone indices) |
| 20 | −98, −62, −26, 29, 65, 101 |
| 21 | −97, −61, −25, 30, 66, 102 |
| 22 | −96, −60, −24, 31, 67, 103 |
| 23 | −95, −59, −23, 32, 68, 104 |
| 24 | −94, −58, −22, 33, 69, 105 |
| 25 | −93, −57, −21, 34, 70, 106 |
| 26 | −92, −56, −20, 35, 71, 107 |
| 27 | −91, −55, −19, 36, 72, 108 |
| 28 | −90, −54, −18, 37, 73, 109 |
| 29 | −89, −53, −17, 38, 74, 110 |
| 30 | −88, −52, −16, 39, 75, 111 |
| 31 | −87, −51, −15, 40, 76, 112 |
| 32 | −86, −50, −14, 41, 77, 113 |
| 33 | −85, −49, −13, 42, 78, 114 |
| 34 | −84, −48, −12, 43, 79, 115 |
| 35 | −83, −47, −11, 44, 80, 116 |
| 36 | −82, −46, −10, 45, 81, 117 |

26-tone DRU: There are a total of nine 26-tone DRUs on the 20 MHz bandwidth, and each 26-tone DRU includes 24 data subcarriers (four groups in total) and two pilot subcarriers. Subcarriers (that is, subcarriers whose indices are [−122: −118, −9: −4, 4: 9, 118: 122]) other than data subcarriers on the 20 MHz bandwidth include nine groups of pilot subcarriers, each group of pilot subcarriers includes two pilot subcarriers, and the other four subcarriers are null subcarriers. The null subcarrier is an unused subcarrier. Each 26-tone DRU includes one group of pilot subcarriers. For example, the 26-tone DRU is constructed based on the foregoing described group of data subcarriers. Subcarriers included in each of the nine 26-tone DRUs on the 20 MHz bandwidth are shown in the following Table 18. Table 18 shows a data subcarrier set (corresponding to the group of data subcarriers in Table 18) and pilot subcarriers included in each 26-tone DRU.

TABLE 18

| Example of a subcarrier distribution of a DRU 26 | | | | | | | | | |
|---|---|---|---|---|---|---|---|---|---|
| DRU 26 | Index of a physical subcarrier belonging to a corresponding DRU 26/a subcarrier set | | | | | | | | |
| index | 1 | 2 | 3 | 4 | 5 | 6 | 7 | 8 | 9 |
| Data subcarrier set (a number of the subcarrier set) | 1, 10, 19, 28 | 2, 11, 20, 29 | 3, 12, 21, 30 | 4, 13, 22, 31 | 5, 14, 23, 32 | 6, 15, 24, 33 | 7, 16, 25, 34 | 8, 17, 26, 35 | 9, 18, 27, 36 |
| Pilot subcarriers (subcarrier indices) | −122, 4 | −121, 5 | −120, 6 | −119, 7 | −118, 118 | −7, 119 | −6, 120 | −5, 121 | −4, 122 |

52-tone DRU: There are a total of four 52-tone DRUs on the 20 MHz bandwidth, and each 52-tone DRU includes two 26-tone DRUs. In other words, each 52-tone DRU includes 48 data subcarriers (eight groups in total) and four pilot subcarriers (that is, two groups of pilot subcarriers). For example, a 52-tone DRU is constructed by using 26-tone DRUs. Subcarriers included in each of the four 52-tone DRUs on the 20 MHz bandwidth are shown in the following Table 19. Table 19 shows indices of DRUs 26 (corresponding to the DRUs 26 in Table 18) included in each 52-tone DRU.

TABLE 19

| Indices of DRUs 26 belonging to a corresponding DRU 52 | | | | |
|---|---|---|---|---|
| DRU 52 index | 1 | 2 | 3 | 4 |
| Indices of included DRUs 26 | 1, 6 | 2, 7 | 3, 8 | 4, 9 |
| Data subcarrier set (a number of the subcarrier set) | 1, 6, 10, 15, 19, 24, 28, 33 | 2, 7, 11, 16, 20, 25, 29, 34 | 3, 12, 21, 30, 8, 17, 26, 35 | 4, 13, 22, 31, 9, 18, 27, 36 |

106-tone DRU: There are a total of two 106-tone DRUs on the 20 MHz bandwidth, and each 106-tone DRU includes two 52-tone DRUs and two supplementary subcarriers. In other words, each 106-tone DRU includes 100 data subcarriers, two supplementary subcarriers, and four pilot subcarriers. Because the supplementary subcarrier is also a data subcarrier, each 106-tone DRU may also be understood as including 102 data subcarriers and four pilot subcarriers. For example, a 106-tone DRU is constructed by using 26-tone DRUs. Subcarriers included in each of the two 106-tone DRUs on the 20 MHz bandwidth are shown in the following Table 20. Table 20 shows indices of DRUs 26 (corresponding to the DRUs 26 in Table 18), DRUs 52 (corresponding to the DRUs 52 in Table 19), supplementary subcarriers (which are also data subcarriers), and pilot subcarriers that are included in each 106-tone DRU.

TABLE 20

Indices of DRUs 26 and physical subcarriers belonging to a corresponding DRU 106, and a carrier shifting plan

| DRU 106 index | 1 | 2 |
|---|---|---|
| Indices of included DRUs 52 | 1, 3 | 2, 4 |
| Indices of included DRUs 26 | 1, 3, 6, 8 | 2, 4, 7, 9 |
| Indices of included supplementary subcarriers | −9, 8 | −8, 9 |
| Indices of subcarriers that are switched to data subcarriers in the DRU 52 or the DRU 26 (pilot tones in the DRU 52 or the DRU 26 switched to data tones in the 106-tone DRU) | −120, −5, 4, 119 | −119, −4, 5, 120 |
| Pilot subcarriers in the 106-tone DRU (pilot tones in the 106-tone DRU) | −122, −7, 6, 121 | −121, −6, 7, 122 |

When y=z=0 or shifting is not performed, that is, in a case corresponding to the carrier plan for a DRU in Example 3, it is equivalent that the total of 216 subcarriers [−113: −6, 6: 113] are used as a data subcarrier set. Correspondingly, 18 subcarriers in 22 subcarriers whose indices are [−122: −114, −5: −4, 4: 5, 114: 122] are used as pilot subcarriers, and the remaining four subcarriers are null subcarriers (for a 26-tone RU and a 52-tone RU) or are used as supplementary subcarriers of two 106-tone RUs. The 216 data subcarriers (that is, [−113: −6, 6: 113]) are evenly divided into 36 groups, and an index (or a number) of a first data subcarrier included in a first group of data subcarriers in the 36 groups of data subcarriers is −113. In each group of data subcarriers, a first data subcarrier and a second data subcarrier are spaced by 35 subcarriers, the second data subcarrier and a third data subcarrier are spaced by 35 subcarriers, the third data subcarrier and a fourth data subcarrier are spaced by 46 subcarriers, the fourth data subcarrier and a fifth data subcarrier are spaced by 35 subcarriers, and the fifth data subcarrier and a sixth data subcarrier are spaced by 35 subcarriers. Specifically, the following Table 21 shows indices of data subcarriers included in each group of data subcarriers in the 36 groups of data subcarriers. For example, as shown in Table 21, a fifth data subcarrier (whose index is 77) in a $36^{th}$ group of data subcarriers is contiguous with a fifth data subcarrier (whose index is 76) in a $35^{th}$ group of data subcarriers; and a second data subcarrier (whose index is −53) in a $25^{th}$ group of data subcarriers is contiguous with both a second data subcarrier (whose index is −52) in a $26^{th}$ group of data subcarriers and a second data subcarrier (whose index is −54) of a $24^{th}$ group of data subcarriers.

TABLE 21

Group 3 of data subcarriers on the 20 MHz bandwidth

| Number of a subcarrier set (tone set) | Subcarrier indices (tone indices) |
|---|---|
| 1 | −113, −77, −41, 6, 42, 78 |
| 2 | −112, −76, −40, 7, 43, 79 |
| 3 | −111, −75, −39, 8, 44, 80 |
| 4 | −110, −74, −38, 9, 45, 81 |
| 5 | −109, −73, −37, 10, 46, 82 |
| 6 | −108, −72, −36, 11, 47, 83 |
| 7 | −107, −71, −35, 12, 48, 84 |
| 8 | −106, −70, −34, 13, 49, 85 |
| 9 | −105, −69, −33, 14, 50, 86 |
| 10 | −104, −68, −32, 15, 51, 87 |
| 11 | −103, −67, −31, 16, 52, 88 |
| 12 | −102, −66, −30, 17, 53, 89 |
| 13 | −101, −65, −29, 18, 54, 90 |
| 14 | −100, −64, −28, 19, 55, 91 |
| 15 | −99, −63, −27, 20, 56, 92 |
| 16 | −98, −62, −26, 21, 57, 93 |
| 17 | −97, −61, −25, 22, 58, 94 |
| 18 | −96, −60, −24, 23, 59, 95 |
| 19 | −95, −59, −23, 24, 60, 96 |
| 20 | −94, −58, −22, 25, 61, 97 |
| 21 | −93, −57, −21, 26, 62, 98 |
| 22 | −92, −56, −20, 27, 63, 99 |
| 23 | −91, −55, −19, 28, 64, 100 |
| 24 | −90, −54, −18, 29, 65, 101 |
| 25 | −89, −53, −17, 30, 66, 102 |
| 26 | −88, −52, −16, 31, 67, 103 |
| 27 | −87, −51, −15, 32, 68, 104 |
| 28 | −86, −50, −14, 33, 69, 105 |
| 29 | −85, −49, −13, 34, 70, 106 |
| 30 | −84, −48, −12, 35, 71, 107 |
| 31 | −83, −47, −11, 36, 72, 108 |
| 32 | −82, −46, −10, 37, 73, 109 |
| 33 | −81, −45, −9, 38, 74, 110 |
| 34 | −80, −44, −8, 39, 75, 111 |
| 35 | −79, −43, −7, 40, 76, 112 |
| 36 | −78, −42, −6, 41, 77, 113 |

26-tone DRU: There are a total of nine 26-tone DRUs on the 20 MHz bandwidth, and each 26-tone DRU includes 24 data subcarriers (four groups in total) and two pilot subcarriers. Subcarriers (that is, subcarriers whose indices are [−122: −114, −5: −4, 4: 5, 114: 122]) other than data subcarriers on the 20 MHz bandwidth include nine groups of pilot subcarriers, each group of pilot subcarriers includes two pilot subcarriers, and the other four subcarriers are null subcarriers. The null subcarrier is an unused subcarrier. Each 26-tone DRU includes one group of pilot subcarriers. For example, the 26-tone DRU is constructed based on the foregoing described group of data subcarriers. Subcarriers included in each of the nine 26-tone RUs on the 20 MHz bandwidth are shown in the following Table 22. Table 22 shows a data subcarrier set (corresponding to the group of data subcarriers in Table 21) and pilot subcarriers included in each 26-tone DRU.

TABLE 22

| Example of a subcarrier distribution of a DRU 26 | | | | | | | | | |
|---|---|---|---|---|---|---|---|---|---|
| DRU 26 | Index of a physical subcarrier belonging to a corresponding DRU 26/a subcarrier set | | | | | | | | |
| index | 1 | 2 | 3 | 4 | 5 | 6 | 7 | 8 | 9 |
| Data subcarrier set (a number of the subcarrier set) | 1, 10, 19, 28 | 2, 11, 20, 29 | 3, 12, 21, 30 | 4, 13, 22, 31 | 5, 14, 23, 32 | 6, 15, 24, 33 | 7, 16, 25, 34 | 8, 17, 26, 35 | 9, 18, 27, 36 |
| Pilot subcarriers (subcarrier indices) | −5, 116 | −4, 117 | −122, 118 | −121, 119 | −120, 120 | −119, 121 | −118, 122 | −117, 4 | −116, 5 |

52-tone DRU: There are a total of four 52-tone DRUs on the 20 MHz bandwidth, and each 52-tone DRU includes two 26-tone DRUs. In other words, each 52-tone DRU includes 48 data subcarriers (eight groups in total) and four pilot subcarriers (that is, two groups of pilot subcarriers). For example, a 52-tone DRU is constructed by using 26-tone DRUs. Subcarriers included in each of the four 52-tone DRUs on the 20 MHz bandwidth are shown in the following Table 23. Table 23 shows indices of DRUs 26 (corresponding to the DRUs 26 in Table 22) included in each 52-tone DRU.

TABLE 23

| Indices of DRUs 26 belonging to a corresponding DRU 52 | | | | |
|---|---|---|---|---|
| DRU 52 index | 1 | 2 | 3 | 4 |
| Indices of included DRUs 26 | 1, 6 | 2, 7 | 3, 8 | 4, 9 |
| Data subcarrier set (a number of the subcarrier set) | 1, 6, 10, 15, 19, 24, 28, 33 | 2, 7, 11, 16, 20, 25, 29, 34 | 3, 12, 21, 30, 8, 17, 26, 35 | 4, 13, 22, 31, 9, 18, 27, 36 |

106-tone DRU: There are a total of two 106-tone DRUs on the 20 MHz bandwidth, and each 106-tone DRU includes two D52-tone RUs and two supplementary subcarriers. In other words, each 106-tone DRU includes 100 data subcarriers, two supplementary subcarriers, and four pilot subcarriers. Because the supplementary subcarrier is also a data subcarrier, each 106-tone DRU may also be understood as including 102 data subcarriers and four pilot subcarriers. For example, a 106-tone DRU is constructed by using 26-tone DRUs. Subcarriers included in each of the two 106-tone DRUs on the 20 MHz bandwidth are shown in the following Table 24. Table 24 shows indices of DRUs 26 (corresponding to the DRUs 26 in Table 22), DRUs 52 (corresponding to the DRUs 52 in Table 23), supplementary subcarriers (which are also data subcarriers), and pilot subcarriers that are included in each 106-tone RU.

TABLE 24

| Indices of DRUs 26 and physical subcarriers belonging to a corresponding DRU 106 | | |
|---|---|---|
| DRU 106 index | 1 | 2 |
| Indices of included DRUs 52 | 1, 3 | 2, 4 |
| Indices of included DRUs 26 | 1, 3, 6, 8 | 2, 4, 7, 9 |
| Indices of included supplementary subcarriers | −115, 114 | −114, 115 |

TABLE 24-continued

| Indices of DRUs 26 and physical subcarriers belonging to a corresponding DRU 106 | | |
|---|---|---|
| DRU 106 index | 1 | 2 |
| Indices of subcarriers that are switched to data subcarriers in the DRU 52 or the DRU 26 (pilot tones in the DRU 52 or the DRU 26 switched to data tones in the 106-tone DRU) | −119, −117, 116, 118 | −118, −116, 117, 119 |
| Pilot subcarriers in the 106-tone DRU (pilot tones in the 106-tone DRU) | −122, −5, 4, 121 | −121, −4, 5, 122 |

Similarly, it should be uniformly noted that, pilot subcarriers of a DRU in the foregoing examples meet a corresponding combination relationship. For example, pilot subcarriers of a DRU 52 are a set of pilot subcarriers of DRUs 26 that constitute the DRU 52. It should be noted that this combination relationship is merely an example. Pilot subcarriers of DRUs of various sizes may be replaced with other subcarrier combinations. In other words, the combination relationship may not be met, pilot subcarriers are reselected from the pilot subcarrier set mentioned above. This is not limited in this application.

It should be understood that, embodiments of this application describes an example in which the subcarriers [−113: −6, 6: 113] are used as a start point for left-right shifting. Both Example 1 (the data subcarrier set is [−115: −8, 8: 115]) and Example 2 (the data subcarrier set is [−117: −10, 10: 117]) are obtained by performing left-right shifting based on the subcarriers [−113: −6, 6: 113]. Certainly, based on a same design idea, in this application, the subcarriers [−117: −10, 10: 117] may alternatively be used as a start point for left-right shifting. Both Example 1 (the data subcarrier set is [−115: −8, 8: 115]) and Example 3 may be understood as being obtained by performing left-right shifting based on the subcarriers [−117: −10, 10: 117]. Similarly, in this application, the subcarriers [−115: −8, 8: 115] may alternatively be used as a start point for left-right shifting. Both Example 2 (the data subcarrier set is [−117: −10, 10: 117]) and Example 3 may be understood as being obtained by performing left-right shifting based on the subcarriers [−115: −8, 8: 115]. This is not limited in embodiments of this application.

When a frequency-domain diversity gain is considered, during pilot configuration, a spacing between pilot subcarriers included in each resource unit is usually enabled to be as large as possible. In addition, because small RUs are adjacent to each other, and a large RU is obtained by combining small RUs, pilot subcarriers are approximately evenly configured, to ensure a pilot spacing in each RU. The small RU herein is relative to the large RU. For example, two 26-tone RUs constitute one 52-tone. In this case, it may be considered that the 26-tone RU is a small RU, and the 52-tone RU is a large RU. However, for a distributed RU, even configuration of pilot subcarriers is not conducive to increasing a power amplification multiple. Therefore, in this application, during designing of a carrier plan for a distributed RU, pilot subcarriers are not evenly configured, but a middle part of a positive frequency band and a negative frequency band (that is, subcarriers whose indices are [−122: −4, 4: 122]) is used as a data subcarrier set, and a part in the subcarrier set [−122: −4, 4: 122] except the data subcarrier set is used as a pilot subcarrier set. This increases a transmit power.

In addition, in this embodiment of this application, the data subcarrier set includes 36 groups, and each group includes six subcarriers. This can ensure sufficient discretization of data subcarriers. For example, a 26-tone RU includes four groups of data subcarriers in the data subcarrier set, and the four groups of data subcarriers included in the 26-tone RU have a characteristic of a largest and even subcarrier spacing. Further, the 26-tone RU includes two pilot subcarriers, and the pilot subcarriers follow a principle of one positive frequency and one negative frequency, to ensure that a pilot subcarrier spacing is large enough and data/pilot subcarriers are discrete enough.

In this embodiment of this application, a 52-tone DRU or a 106-tone DRU may include a plurality of 26-tone DRUs. For example, for the 52-tone DRU, a DRU 26-5 (which indicates a DRU 26 whose index is 5) is kept unchanged; a DRU 26-1 (which indicates a DRU 26 whose index is 1) and a DRU 26-6 (which indicates a DRU 26 whose index is 6) are combined into a first DRU 52, or in other words, a first DRU 52 includes a DRU 26-1 (which indicates a DRU 26 whose index is 1) and a DRU 26-6 (which indicates a DRU 26 whose index is 6); a DRU 26-2 and a DRU 26-7 are combined into a second DRU 52, or in other words, a second DRU 52 includes a DRU 26-2 and a DRU 26-7; a DRU 26-3 and a DRU 26-8 are combined into a third DRU 52, or in other words, a third DRU 52 includes a DRU 26-3 and a DRU 26-8; and a DRU 26-4 and a DRU 26-9 are combined into a fourth DRU 52, or in other words, a fourth DRU 52 includes a DRU 26-4 and a DRU 26-9. For the 106-tone DRU, the 106-tone DRU may be considered as including four 26-tone DRUs, and the four 26-tone DRUs have eight pilot subcarriers in total. However, in practice, only four pilot subcarriers need to be configured for the 106-tone DRU. According to a principle of a maximum distance (to be specific, indices of selected four subcarriers are sorted in ascending order, and a minimum value of a distance (that is, an absolute value of a difference between indices of subcarriers) between any two adjacent subcarriers is maximized), four of the eight pilot subcarriers included in the 26-tone DRUs may be used as pilot subcarriers of the 106-tone DRU, and the other four pilot subcarriers are used as data subcarriers. Therefore, the 52-tone DRU and the 106-tone DRU also follow a principle of even allocation and a largest spacing, to ensure that a spacing of carriers included in the DRU is as large as possible. This increases a transmit power.

In all of the foregoing embodiments, the DRU allocated by the AP to the station may be any one of a 26-tone DRU, a 52-tone DRU, and a 106-tone DRU, or may be a combination of a 26-tone DRU, a 52-tone DRU, and a 106-tone DRU. In other words, the AP indicates, by using the DRU indication information in the trigger frame, the location and the size of the DRU allocated to the station, and the STA may uniquely determine, based on the indication of the DRU indication information, data subcarriers and pilot subcarriers that are included in the DRU.

For example, it is assumed that the DRU indication information indicates that the DRU allocated to the STA is the 26-tone DRU whose index is 3, and it is assumed that the carrier plan for a distributed RU on a 20 MHz bandwidth uses Example 1. In this case, as shown in Table 4a or Table 4b, the DRU allocated to the STA includes data subcarriers whose indices are −113, −104, −95, −86, −77, −68, −59, −50, −41, −32, −23, −14, 10, 19, 28, 37, 46, 55, 64, 73, 82, 91, 100, and 109, and pilot subcarriers whose indices are −5 and 120. In other words, the DRU allocated to the STA may alternatively include the third, the twelfth, the twenty-first, and the thirtieth groups of data subcarriers in Table 13, and any two groups of data subcarriers are spaced by at least eight groups of data subcarriers. The station may send the data information of the TB PPDU on the data subcarriers included in the DRU, and send the pilot information of the TB PPDU on the pilot subcarriers included in the DRU. For another example, it is assumed that the DRU indication information indicates that the DRU allocated to the STA is the 52-tone DRU whose index is 1, and it is assumed that the carrier plan for a distributed RU on a 20 MHz bandwidth uses Example 3. In this case, the data subcarriers included in the DRU allocated to the STA are data subcarriers whose indices are in the second row and the second column in Table 11, and the pilot subcarriers included in the DRU allocated to the STA are subcarriers whose indices are −119, −5, 116, and 121. The station may send the data information of the TB PPDU on the data subcarriers included in the DRU, and send the pilot information of the TB PPDU on the pilot subcarriers included in the DRU. For another example, it is assumed that the DRU indication information indicates that the DRU allocated to the STA is the 106-tone DRU whose index is 1, and it is assumed that the carrier plan for a distributed RU on a 20 MHz bandwidth uses Example 2. In this case, the data subcarriers included in the DRU allocated to the STA are data subcarriers whose indices are in the third row and the second column (starting from the index −117) in Table 9 and data subcarriers whose indices are −120, −9, −5, 4, 8, and 119, and the pilot subcarriers included in the DRU allocated to the STA are subcarriers whose indices are −122, −7, 6, and 121. The station may send the data information of the TB PPDU on the data subcarriers included in the DRU, and send the pilot information of the TB PPDU on the pilot subcarriers included in the DRU.

Through calculation, when a power spectral density limitation condition is met, if the carrier plan for a distributed RU designed in embodiments of this application is used, a transmit power on each subcarrier in a 26-tone distributed RU can be increased by 6.5 times than that in a continuous RU, and correspondingly, a total power can also be increased by 6.5 times. A transmit power on each subcarrier in a 52-tone distributed RU can be increased by 4.33 times than that in the continuous RU, and correspondingly, a total power can also be increased by 4.33 times. A power on each subcarrier in a 106-tone distributed RU can be increased by 2.17 times than that in the continuous RU, and correspondingly, a total power can also be increased by 2.17 times.

In other words, based on the carrier plan for a distributed RU on a 20 MHz bandwidth designed in embodiments of this application, when the power spectral density limitation condition is met, a maximum power amplification multiple can be reached for each DRU on the 20 MHz bandwidth in comparison with the continuous RU. An example in which a station performs uplink transmission by using a 26-tone DRU is used. 13 contiguous subcarriers are randomly selected. It is assumed that a quantity of subcarriers carrying a signal in uplink transmission of the station does not exceed 2. In this case, in comparison with a case in which a 26-tone continuous RU is used, a power of the station can be increased by 13/2=6.5 times. If the power is further amplified, only 13 contiguous subcarriers can be randomly selected, and a maximum of one data/pilot subcarrier is included to carry a signal. In this case, at least 13*26=338 subcarriers are required to discretize 26 subcarriers that are in the 26-tone DRU and that carry a signal. This exceeds 256 subcarriers of 20 MHz, and cannot be implemented. Therefore, for the 26-tone DRU, 6.5 times is a maximum power amplification multiple. The same applies to a 52-tone DRU and a 106-tone DRU. For the 52-tone DRU, 13 contiguous subcarriers are randomly selected, and a quantity of subcarriers carrying a signal does not exceed 3. In this case, in comparison with a case in which a 52-tone continuous RU is used, a power of the 52-tone DRU can be increased by 13/3=4.33 times. If the power is further amplified, only 13 contiguous subcarriers can be randomly selected, and a maximum of two data/pilot subcarriers are included to carry a signal. In this case, at least 52/2*13=338 subcarriers are required to discretize 52 subcarriers that are in the 52-tone DRU and that carry a signal. This exceeds 256 subcarriers of 20 MHz, and cannot be implemented. For the 106-tone DRU, 13 contiguous subcarriers are randomly selected, and a quantity of subcarriers carrying a signal does not exceed 6. In this case, in comparison with a case in which a 106-tone continuous RU is used, a power of the 106-tone DRU can be increased by 13/6=2.17 times. If the power is further amplified (106/5*13=276, which exceeds 256 subcarriers), this cannot be implemented.

It can be learned that, in embodiments of this application, subcarriers included in an RU are discretized on a 20 MHz bandwidth as much as possible, so that a quantity of subcarriers carrying a signal in all 13 contiguous subcarriers on the 20 MHz bandwidth is as small as possible (for the 26-tone DRU, there are a maximum of two subcarriers carrying a signal in all the 13 contiguous subcarriers on the 20 MHz bandwidth; for the 52-tone DRU, there are a maximum of three subcarriers; and for the 106-tone DRU, there are a maximum of six subcarriers), to increase an average power on each subcarrier, and increase a signal-to-noise ratio. This increases a transmit power of a STA without an increase of a power spectral density (that is, a transmit power of 1 MHz is not increased, where 1 MHz includes about 13 contiguous subcarriers).

The foregoing content describes in detail the method provided in this application. To facilitate implementation of the foregoing solution in embodiments of this application, embodiments of this application further provide corresponding apparatuses or devices.

In embodiments of this application, the access point and the station may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in actual implementation. The following describes in detail a communication apparatus in embodiments of this application with reference to FIG. 9 to FIG. 11. The communication apparatus is an access point or a station. Further, the communication apparatus may be an apparatus (for example, a chip) in the AP, or the communication apparatus is an apparatus (for example, a chip) in the STA.

Figure 9:
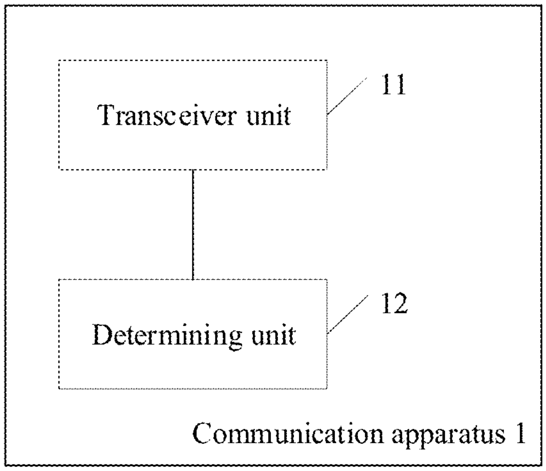
FIG. 9 is a schematic diagram of a structure of a communication apparatus 1 according to an embodiment of this application.

When an integrated unit is used, FIG. 9 is a schematic diagram of a structure of a communication apparatus 1 according to an embodiment of this application. The communication apparatus 1 may be a station or a chip, for example, a Wi-Fi chip, in a station. As shown in FIG. 9, the communication apparatus 1 includes a transceiver unit 11 and a determining unit 12.

The transceiver unit 11 is configured to receive a triggering frame, where the triggering frame includes discrete resource unit DRU indication information, the DRU indication information indicates information about a DRU allocated to the station, an operating bandwidth of the station is 20 MHz, the DRU is one or more of predefined discrete resource blocks, and an absolute value of a difference between indices of any two data subcarriers in each resource block in the predefined discrete resource blocks is greater than 1. The determining unit 12 is configured to determine, based on an indication of the DRU indication information, the DRU allocated to the station. The transceiver unit 11 is further configured to send a trigger-based physical layer protocol data unit TB PPDU by using the DRU.

Optionally, the predefined discrete resource blocks include nine discrete resource blocks DRUs 26 in each of which a quantity of subcarriers is 26, and each DRU 26 includes 24 data subcarriers and two pilot subcarriers. Indices of data subcarriers included in a DRU 26 whose index is 1 are −115, −106, −97, −88, −79, −70, −61, −52, −43, −34, −25, −16, 8, 17, 26, 35, 44, 53, 62, 71, 80, 89, 98, and 107, and indices of pilot subcarriers included in the DRU 26 whose index is 1 are −7 and 118. Indices of data subcarriers included in a DRU 26 whose index is 2 are −114, −105, −96, −87, −78, −69, −60, −51, −42, −33, −24, −15, 9, 18, 27, 36, 45, 54, 63, 72, 81, 90, 99, and 108, and indices of pilot subcarriers included in the DRU 26 whose index is 2 are −6 and 119. Indices of data subcarriers included in a DRU 26 whose index is 3 are −113, −104, −95, −86, −77, −68, −59, −50, −41, −32, −23, −14, 10, 19, 28, 37, 46, 55, 64, 73, 82, 91, 100, and 109, and indices of pilot subcarriers included in the DRU 26 whose index is 3 are −5 and 120. Indices of data subcarriers included in a DRU 26 whose index is 4 are −112, −103, −94, −85, −76, −67, −58, −49, −40, −31, −22, −13, 11, 20, 29, 38, 47, 56, 65, 74, 83, 92, 101, and 110, and indices of pilot subcarriers included in the DRU 26 whose index is 4 are −4 and 121. Indices of data subcarriers included in a DRU 26 whose index is 5 are −111, −102, −93, −84, −75, −66, −57, −48, −39, −30, −21, −12, 12, 21, 30, 39, 48, 57, 66, 75, 84, 93, 102, and 111, and indices of pilot subcarriers included in the DRU 26 whose index is 5 are −122 and 122. Indices of data subcarriers included in a DRU 26 whose index is 6 are −110, −101, −92, −83, −74, −65, −56, −47, −38, −29, −20, −11, 13, 22, 31, 40, 49, 58, 67, 76, 85, 94, 103, and 112, and indices of pilot subcarriers included in the DRU 26 whose index is 6 are −121 and 4. Indices of data subcarriers included in a DRU 26 whose index is 7 are −109, −100, −91, −82, −73, −64, −55, −46, −37, −28, −19, −10, 14, 23, 32, 41, 50, 59, 68, 77, 86, 95, 104, and 113, and indices of pilot subcarriers included in the DRU 26 whose index is 7 are −120 and 5. Indices of data subcarriers included in a DRU 26 whose index is 8 are −108, −99, −90, −81, −72, −63, −54, −45, −36, −27, −18, −9, 15, 24, 33, 42, 51, 60, 69, 78, 87, 96, 105, and 114, and indices of pilot subcarriers included in the DRU 26 whose index is 8 are −119 and 6. Indices of data subcarriers included in a DRU 26 whose index is 9 are −107, −98, −89, −80, −71, −62, −53, −44, −35, −26, −17, −8, 16, 25, 34, 43, 52, 61, 70, 79, 88, 97, 106, and 115, and indices of pilot subcarriers included in the DRU 26 whose index is 9 are −118 and 7.

Optionally, the predefined discrete resource blocks include four discrete resource blocks DRUs 52 in each of which a quantity of subcarriers is 52, and each DRU 52 includes 48 data subcarriers and four pilot subcarriers. Data subcarriers included in a DRU 52 whose index is 1 are the same as the data subcarriers in the DRUs 26 whose indices are 1 and 6, and pilot subcarriers included in the DRU 52 whose index is 1 are the same as the pilot subcarriers in the DRUs 26 whose indices are 1 and 6. Data subcarriers included in a DRU 52 whose index is 2 are the same as the data subcarriers in the DRUs 26 whose indices are 2 and 7, and pilot subcarriers included in the DRU 52 whose index is 2 are the same as the pilot subcarriers in the DRUs 26 whose indices are 2 and 7. Data subcarriers included in a DRU 52 whose index is 3 are the same as the data subcarriers in the DRUs 26 whose indices are 3 and 8, and pilot subcarriers included in the DRU 52 whose index is 3 are the same as the pilot subcarriers in the DRUs 26 whose indices are 3 and 8. Data subcarriers included in a DRU 52 whose index is 4 are the same as the data subcarriers in the DRUs 26 whose indices are 4 and 9, and pilot subcarriers included in the DRU 52 whose index is 4 are the same as the pilot subcarriers in the DRUs 26 whose indices are 4 and 9.

Optionally, the predefined discrete resource blocks include two discrete resource blocks DRUs 106 in each of which a quantity of subcarriers is 106, and each DRU 106 includes 102 data subcarriers and four pilot subcarriers. Data subcarriers included in a DRU 106 whose index is 1 are the data subcarriers in the DRUs 26 whose indices are 1, 3, 6, and 8, and data subcarriers whose indices are −117, 116, −119, −5, 118, and 4; and indices of pilot subcarriers included in the DRU 106 whose index is 1 are −121, −7, 6, and 120. Data subcarriers included in a DRU 106 whose index is 2 are the data subcarriers in the DRUs 26 whose indices are 2, 4, 7, and 9, and data subcarriers whose indices are −116, 117, −118, −4, 119, and 5; and indices of pilot subcarriers included in the DRU 106 whose index is 2 are −120, −6, 7, and 121.

Optionally, the predefined discrete resource blocks include nine discrete resource blocks DRUs 26 in each of which a quantity of subcarriers is 26, and each DRU 26 includes 24 data subcarriers and two pilot subcarriers. Indices of data subcarriers included in a DRU 26 whose index is 1 are −117, −108, −99, −90, −81, −72, −63, −54, −45, −36, −27, −18, 10, 19, 28, 37, 46, 55, 64, 73, 82, 91, 100, and 109, and indices of pilot subcarriers included in the DRU 26 whose index is 1 are −122 and 4. Indices of data subcarriers included in a DRU 26 whose index is 2 are −116, −107, −98, −89, −80, −71, −62, −53, −44, −35, −26, −17, 11, 20, 29, 38, 47, 56, 65, 74, 83, 92, 101, and 110, and indices of pilot subcarriers included in the DRU 26 whose index is 2 are −121 and 5. Indices of data subcarriers included in a DRU 26 whose index is 3 are −115, −106, −97, −88, −79, −70, −61, −52, −43, −34, −25, −16, 12, 21, 30, 39, 48, 57, 66, 75, 84, 93, 102, and 111, and indices of pilot subcarriers included in the DRU 26 whose index is 3 are −120 and 6. Indices of data subcarriers included in a DRU 26 whose index is 4 are −114, −105, −96, −87, −78, −69, −60, −51, −42, −33, −24, −15, 13, 22, 31, 40, 49, 58, 67, 76, 85, 94, 103, and 112, and indices of pilot subcarriers included in the DRU 26 whose index is 4 are −119 and 7. Indices of data subcarriers included in a DRU 26 whose index is 5 are −113, −104, −95, −86, −77, −68, −59, −50, −41, −32, −23, −14, 14, 23, 32, 41, 50, 59, 68, 77, 86, 95, 104, and 113, and indices of pilot subcarriers included in the DRU 26 whose index is 5 are −118 and 118. Indices of data subcarriers included in a DRU 26 whose index is 6 are −112, −103, −94, −85, −76, −67, −58, −49, −40, −31, −22, −13, 15, 24, 33, 42, 51, 60, 69, 78, 87, 96, 105, and 114, and indices of pilot subcarriers included in the DRU 26 whose index is 6 are −7 and 119. Indices of data subcarriers included in a DRU 26 whose index is 7 are −111, −102, −93, −84, −75, −66, −57, −48, −39, −30, −21, −12, 16, 25, 34, 43, 52, 61, 70, 79, 88, 97, 106, and 115, and indices of pilot subcarriers included in the DRU 26 whose index is 7 are −6 and 120. Indices of data subcarriers included in a DRU 26 whose index is 8 are −110, −101, −92, −83, −74, −65, −56, −47, −38, −29, −20, −11, 17, 26, 35, 44, 53, 62, 80, 89, 98, 71, 107, and 116, and indices of pilot subcarriers included in the DRU 26 whose index is 8 are −5 and 121. Indices of data subcarriers included in a DRU 26 whose index is 9 are −109, −100, −91, −82, −73, −64, −55, −46, −37, −28, −19, −10, 18, 27, 36, 45, 54, 63, 72, 81, 90, 99, 108, and 117, and indices of pilot subcarriers included in the DRU 26 whose index is 9 are −4 and 122.

Optionally, the predefined discrete resource blocks include four discrete resource blocks DRUs 52 in each of which a quantity of subcarriers is 52, and each DRU 52 includes 48 data subcarriers and four pilot subcarriers. Data subcarriers included in a DRU 52 whose index is 1 are the same as the data subcarriers in the DRUs 26 whose indices are 1 and 6, and pilot subcarriers included in the DRU 52 whose index is 1 are the same as the pilot subcarriers in the DRUs 26 whose indices are 1 and 6. Data subcarriers included in a DRU 52 whose index is 2 are the same as the data subcarriers in the DRUs 26 whose indices are 2 and 7, and pilot subcarriers included in the DRU 52 whose index is 2 are the same as the pilot subcarriers in the DRUs 26 whose indices are 2 and 7. Data subcarriers included in a DRU 52 whose index is 3 are the same as the data subcarriers in the DRUs 26 whose indices are 3 and 8, and pilot subcarriers included in the DRU 52 whose index is 3 are the same as the pilot subcarriers in the DRUs 26 whose indices are 3 and 8. Data subcarriers included in a DRU 52 whose index is 4 are the same as the data subcarriers in the DRUs 26 whose indices are 4 and 9, and pilot subcarriers included in the DRU 52 whose index is 4 are the same as the pilot subcarriers in the DRUs 26 whose indices are 4 and 9.

Optionally, the predefined discrete resource blocks include two discrete resource blocks DRUs 106 in each of which a quantity of subcarriers is 106, and each DRU 106 includes 102 data subcarriers and four pilot subcarriers. Data subcarriers included in a DRU 106 whose index is 1 are the data subcarriers in the DRUs 26 whose indices are 1, 3, 6, and 8, and data subcarriers whose indices are −9, 8, −120, −5, 4, and 119; and indices of pilot subcarriers included in the DRU 106 whose index is 1 are −122, −7, 6, and 121. Data subcarriers included in a DRU 106 whose index is 2 are the data subcarriers in the DRUs 26 whose indices are 2, 4, 7, and 9, and data subcarriers whose indices are −8, 9, −119, −4, 5, and 120; and indices of pilot subcarriers included in the DRU 106 whose index is 2 are −121, −6, 7, and 122.

Optionally, the predefined discrete resource blocks include nine discrete resource blocks DRUs 26 in each of which a quantity of subcarriers is 26, and each DRU 26 includes 24 data subcarriers and two pilot subcarriers. Indices of data subcarriers included in a DRU 26 whose index is 1 are −113, −104, −95, −86, −77, −68, −59, −50, −41, −32, −23, −14, 6, 15, 24, 33, 42, 51, 60, 69, 78, 87, 96, and 105, and indices of pilot subcarriers included in the DRU 26 whose index is 1 are −5 and 116. Indices of data subcarriers included in a DRU 26 whose index is 2 are −112, −103, −94, −85, −76, −67, −58, −49, −40, −31, −22, −13, 7, 16, 25, 34, 43, 52, 61, 70, 79, 88, 97, and 106, and indices of pilot subcarriers included in the DRU 26 whose index is 2 are −4 and 117. Indices of data subcarriers included in a DRU 26 whose index is 3 are −111, −102, −93, −84, −75, −66, −57, −48, −39, −30, −21, −12, 8, 17, 26, 35, 44, 53, 62, 71, 80, 89, 98, and 107, and indices of pilot subcarriers included in the DRU 26 whose index is 3 are −122 and 118. Indices of data subcarriers included in a DRU 26 whose index is 4 are −110, −101, −92, −83, −74, −65, −56, −47, −38, −29, −20, −11, 9, 18, 27, 36, 45, 54, 63, 72, 81, 90, 99, and 108, and indices of pilot subcarriers included in the DRU 26 whose index is 4 are −121 and 119. Indices of data subcarriers included in a DRU 26 whose index is 5 are −109, −100, −91, −82, −73, −64, −55, −46, −37, −28, −19, −10, 10, 19, 28, 37, 46, 55, 64, 73, 82, 91, 100, and 109, and indices of pilot subcarriers included in the DRU 26 whose index is 5 are −120 and 120. Indices of data subcarriers included in a DRU 26 whose index is 6 are −108, −99, −90, −81, −72, −63, −54, −45, −36, −27, −18, −9, 11, 20, 29, 38, 47, 56, 65, 74, 83, 92, 101, and 110, and indices of pilot subcarriers included in the DRU 26 whose index is 6 are −119 and 121. Indices of data subcarriers included in a DRU 26 whose index is 7 are −107, −98, −89, −80, −71, −62, −53, −44, −35, −26, −17, −8, 12, 21, 30, 39, 48, 57, 66, 75, 84, 93, 102, and 111, and indices of pilot subcarriers included in the DRU 26 whose index is 7 are −118 and 122. Indices of data subcarriers included in a DRU 26 whose index is 8 are −106, −97, −88, −79, −70, −61, −52, −43, −34, −25, −16, −7, 13, 22, 31, 40, 49, 58, 67, 76, 85, 94, 103, and 112, and indices of pilot subcarriers included in the DRU 26 whose index is 8 are −117 and 4. Indices of data subcarriers included in a DRU 26 whose index is 9 are −105, −96, −87, −78, −69, −60, −51, −42, −33, −24, −15, −6, 14, 23, 32, 41, 50, 59, 68, 77, 86, 95, 104, and 113, and indices of pilot subcarriers included in the DRU 26 whose index is 9 are −116 and 5.

Optionally, the predefined discrete resource blocks include four discrete resource blocks DRUs 52 in each of which a quantity of subcarriers is 52, and each DRU 52 includes 48 data subcarriers and four pilot subcarriers. Data subcarriers included in a DRU 52 whose index is 1 are the same as the data subcarriers in the DRUs 26 whose indices are 1 and 6, and pilot subcarriers included in the DRU 52 whose index is 1 are the same as the pilot subcarriers in the DRUs 26 whose indices are 1 and 6. Data subcarriers included in a DRU 52 whose index is 2 are the same as the data subcarriers in the DRUs 26 whose indices are 2 and 7, and pilot subcarriers included in the DRU 52 whose index is 2 are the same as the pilot subcarriers in the DRUs 26 whose indices are 2 and 7. Data subcarriers included in a DRU 52 whose index is 3 are the same as the data subcarriers in the DRUs 26 whose indices are 3 and 8, and pilot subcarriers included in the DRU 52 whose index is 3 are the same as the pilot subcarriers in the DRUs 26 whose indices are 3 and 8. Data subcarriers included in a DRU 52 whose index is 4 are the same as the data subcarriers in the DRUs 26 whose indices are 4 and 9, and pilot subcarriers included in the DRU 52 whose index is 4 are the same as the pilot subcarriers in the DRUs 26 whose indices are 4 and 9.

Optionally, the predefined discrete resource blocks include two discrete resource blocks DRUs 106 in each of which a quantity of subcarriers is 106, and each DRU 106 includes 102 data subcarriers and four pilot subcarriers. Data subcarriers included in a DRU 106 whose index is 1 are the data subcarriers in the DRUs 26 whose indices are 1, 3, 6, and 8, and data subcarriers whose indices are −115, 114, −119, −117, 116, and 118; and indices of pilot subcarriers included in the DRU 106 whose index is 1 are −122, −5, 4, and 121. Data subcarriers included in a DRU 106 whose index is 2 are the data subcarriers in the DRUs 26 whose indices are 2, 4, 7, and 9, and data subcarriers whose indices are −114, 115, −118, −116, 117, and 119; and indices of pilot subcarriers included in the DRU 106 whose index is 2 are −121, −4, 5, and 122.

Optionally, a change of a quantity of subcarriers spaced between two adjacent data subcarriers whose indices are both positive numbers or both negative numbers and that are included in the predefined discrete resource block does not exceed 1 or 2.

The determining unit 12 may also be referred to as a processing unit.

It should be understood that the communication apparatus 1 may correspondingly perform the foregoing method embodiment, and the foregoing operations or functions of the units in the communication apparatus 1 are separately intended to implement corresponding operations of the STA in the foregoing embodiment. For brevity, details are not described herein again.

Figure 10:
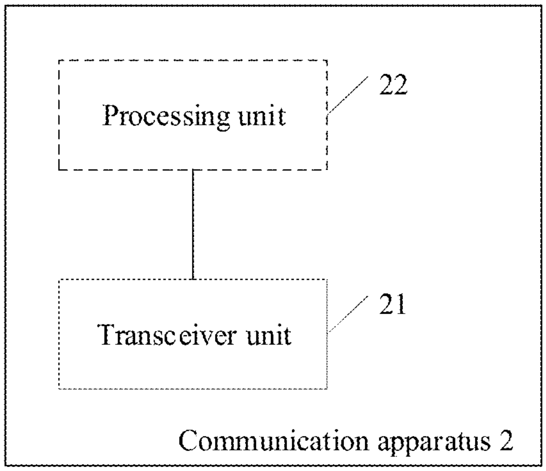
FIG. 10 is a schematic diagram of a structure of a communication apparatus 2 according to an embodiment of this application.

FIG. 10 is a schematic diagram of a structure of a communication apparatus 2 according to an embodiment of this application. The communication apparatus 2 may be an access point or a chip, for example, a Wi-Fi chip, in an access point. As shown in FIG. 10, the communication apparatus 2 includes a transceiver unit 21, and optionally includes a processing unit 22.

The transceiver unit 21 is configured to send a triggering frame, where the triggering frame includes discrete resource unit DRU indication information, the DRU indication information indicates information about a DRU allocated to a station, an operating bandwidth of the station is 20 MHz, the DRU is one or more of predefined discrete resource blocks, and an absolute value of a difference between indices of any two data subcarriers in each resource block in the predefined discrete resource blocks is greater than 1. The transceiver unit 21 is further configured to receive a TB PPDU on the DRU.

Optionally, the processing unit 22 is configured to generate the triggering frame.

Optionally, the predefined discrete resource blocks include nine discrete resource blocks DRUs 26 in each of which a quantity of subcarriers is 26, and each DRU 26 includes 24 data subcarriers and two pilot subcarriers. Indices of data subcarriers included in a DRU 26 whose index is 1 are −115, −106, −97, −88, −79, −70, −61, −52, −43, −34, −25, −16, 8, 17, 26, 35, 44, 53, 62, 71, 80, 89, 98, and 107, and indices of pilot subcarriers included in the DRU 26 whose index is 1 are −7 and 118. Indices of data subcarriers included in a DRU 26 whose index is 2 are −114, −105, −96, −87, −78, −69, −60, −51, −42, −33, −24, −15, 9, 18, 27, 36, 45, 54, 63, 72, 81, 90, 99, and 108, and indices of pilot subcarriers included in the DRU 26 whose index is 2 are −6 and 119. Indices of data subcarriers included in a DRU 26 whose index is 3 are −113, −104, −95, −86, −77, −68, −59, −50, −41, −32, −23, −14, 10, 19, 28, 37, 46, 55, 64, 73, 82, 91, 100, and 109, and indices of pilot subcarriers included in the DRU 26 whose index is 3 are −5 and 120. Indices of data subcarriers included in a DRU 26 whose index is 4 are −112, −103, −94, −85, −76, −67, −58, −49, −40, −31, −22, −13, 11, 20, 29, 38, 47, 56, 65, 74, 83, 92, 101, and 110, and indices of pilot subcarriers included in the DRU 26 whose index is 4 are −4 and 121. Indices of data subcarriers included in a DRU 26 whose index is 5 are −111, −102, −93, −84, −75, −66, −57, −48, −39, −30, −21, −12, 12, 21, 30, 39, 48, 57, 66, 75, 84, 93, 102, and 111, and indices of pilot subcarriers included in the DRU 26 whose index is 5 are −122 and 122. Indices of data subcarriers included in a DRU 26 whose index is 6 are −110, −101, −92, −83, −74, −65, −56, −47, −38, −29, −20, −11, 13, 22, 31, 40, 49, 58, 67, 76, 85, 94, 103, and 112, and indices of pilot subcarriers included in the DRU 26 whose index is 6 are −121 and 4. Indices of data subcarriers included in a DRU 26 whose index is 7 are −109, −100, −91, −82, −73, −64, −55, −46, −37, −28, −19, −10, 14, 23, 32, 41, 50, 59, 68, 77, 86, 95, 104, and 113, and indices of pilot subcarriers included in the DRU 26 whose index is 7 are −120 and 5. Indices of data subcarriers included in a DRU 26 whose index is 8 are −108, −99, −90, −81, −72, −63, −54, −45, −36, −27, −18, −9, 15, 24, 33, 42, 51, 60, 69, 78, 87, 96, 105, and 114, and indices of pilot subcarriers included in the DRU 26 whose index is 8 are −119 and 6. Indices of data subcarriers included in a DRU 26 whose index is 9 are −107, −98, −89, −80, −71, −62, −53, −44, −35, −26, −17, −8, 16, 25, 34, 43, 52, 61, 70, 79, 88, 97, 106, and 115, and indices of pilot subcarriers included in the DRU 26 whose index is 9 are −118 and 7.

Optionally, the predefined discrete resource blocks include four discrete resource blocks DRUs 52 in each of which a quantity of subcarriers is 52, and each DRU 52 includes 48 data subcarriers and four pilot subcarriers. Data subcarriers included in a DRU 52 whose index is 1 are the same as the data subcarriers in the DRUs 26 whose indices are 1 and 6, and pilot subcarriers included in the DRU 52 whose index is 1 are the same as the pilot subcarriers in the DRUs 26 whose indices are 1 and 6. Data subcarriers included in a DRU 52 whose index is 2 are the same as the data subcarriers in the DRUs 26 whose indices are 2 and 7, and pilot subcarriers included in the DRU 52 whose index is 2 are the same as the pilot subcarriers in the DRUs 26 whose indices are 2 and 7. Data subcarriers included in a DRU 52 whose index is 3 are the same as the data subcarriers in the DRUs 26 whose indices are 3 and 8, and pilot subcarriers included in the DRU 52 whose index is 3 are the same as the pilot subcarriers in the DRUs 26 whose indices are 3 and 8. Data subcarriers included in a DRU 52 whose index is 4 are the same as the data subcarriers in the DRUs 26 whose indices are 4 and 9, and pilot subcarriers included in the DRU 52 whose index is 4 are the same as the pilot subcarriers in the DRUs 26 whose indices are 4 and 9.

Optionally, the predefined discrete resource blocks include two discrete resource blocks DRUs 106 in each of which a quantity of subcarriers is 106, and each DRU 106 includes 102 data subcarriers and four pilot subcarriers. Data subcarriers included in a DRU 106 whose index is 1 are the data subcarriers in the DRUs 26 whose indices are 1, 3, 6, and 8, and data subcarriers whose indices are −117, 116, −119, −5, 118, and 4; and indices of pilot subcarriers included in the DRU 106 whose index is 1 are −121, −7, 6, and 120. Data subcarriers included in a DRU 106 whose index is 2 are the data subcarriers in the DRUs 26 whose indices are 2, 4, 7, and 9, and data subcarriers whose indices are −116, 117, −118, −4, 119, and 5; and indices of pilot subcarriers included in the DRU 106 whose index is 2 are −120, −6, 7, and 121.

Optionally, the predefined discrete resource blocks include nine discrete resource blocks DRUs 26 in each of which a quantity of subcarriers is 26, and each DRU 26 includes 24 data subcarriers and two pilot subcarriers. Indices of data subcarriers included in a DRU 26 whose index is 1 are −117, −108, −99, −90, −81, −72, −63, −54, −45, −36, −27, −18, 10, 19, 28, 37, 46, 55, 64, 73, 82, 91, 100, and 109, and indices of pilot subcarriers included in the DRU 26 whose index is 1 are −122 and 4. Indices of data subcarriers included in a DRU 26 whose index is 2 are −116, −107, −98, −89, −80, −71, −62, −53, −44, −35, −26, −17, 11, 20, 29, 38, 47, 56, 65, 74, 83, 92, 101, and 110, and indices of pilot subcarriers included in the DRU 26 whose index is 2 are −121 and 5. Indices of data subcarriers included in a DRU 26 whose index is 3 are −115, −106, −97, −88, −79, −70, −61, −52, −43, −34, −25, −16, 12, 21, 30, 39, 48, 57, 66, 75, 84, 93, 102, and 111, and indices of pilot subcarriers included in the DRU 26 whose index is 3 are −120 and 6. Indices of data subcarriers included in a DRU 26 whose index is 4 are −114, −105, −96, −87, −78, −69, −60, −51, −42, −33, −24, −15, 13, 22, 31, 40, 49, 58, 67, 76, 85, 94, 103, and 112, and indices of pilot subcarriers included in the DRU 26 whose index is 4 are −119 and 7. Indices of data subcarriers included in a DRU 26 whose index is 5 are −113, −104, −95, −86, −77, −68, −59, −50, −41, −32, −23, −14, 14, 23, 32, 41, 50, 59, 68, 77, 86, 95, 104, and 113, and indices of pilot subcarriers included in the DRU 26 whose index is 5 are −118 and 118. Indices of data subcarriers included in a DRU 26 whose index is 6 are −112, −103, −94, −85, −76, −67, −58, −49, −40, −31, −22, −13, 15, 24, 33, 42, 51, 60, 69, 78, 87, 96, 105, and 114, and indices of pilot subcarriers included in the DRU 26 whose index is 6 are −7 and 119. Indices of data subcarriers included in a DRU 26 whose index is 7 are −111, −102, −93, −84, −75, −66, −57, −48, −39, −30, −21, −12, 16, 25, 34, 43, 52, 61, 70, 79, 88, 97, 106, and 115, and indices of pilot subcarriers included in the DRU 26 whose index is 7 are −6 and 120. Indices of data subcarriers included in a DRU 26 whose index is 8 are −110, −101, −92, −83, −74, −65, −56, −47, −38, −29, −20, −11, 17, 26, 35, 44, 53, 62, 80, 89, 98, 71, 107, and 116, and indices of pilot subcarriers included in the DRU 26 whose index is 8 are −5 and 121. Indices of data subcarriers included in a DRU 26 whose index is 9 are −109, −100, −91, −82, −73, −64, −55, −46, −37, −28, −19, −10, 18, 27, 36, 45, 54, 63, 72, 81, 90, 99, 108, and 117, and indices of pilot subcarriers included in the DRU 26 whose index is 9 are −4 and 122.

Optionally, the predefined discrete resource blocks include four discrete resource blocks DRUs 52 in each of which a quantity of subcarriers is 52, and each DRU 52 includes 48 data subcarriers and four pilot subcarriers. Data subcarriers included in a DRU 52 whose index is 1 are the same as the data subcarriers in the DRUs 26 whose indices are 1 and 6, and pilot subcarriers included in the DRU 52 whose index is 1 are the same as the pilot subcarriers in the DRUs 26 whose indices are 1 and 6. Data subcarriers included in a DRU 52 whose index is 2 are the same as the data subcarriers in the DRUs 26 whose indices are 2 and 7, and pilot subcarriers included in the DRU 52 whose index is 2 are the same as the pilot subcarriers in the DRUs 26 whose indices are 2 and 7. Data subcarriers included in a DRU 52 whose index is 3 are the same as the data subcarriers in the DRUs 26 whose indices are 3 and 8, and pilot subcarriers included in the DRU 52 whose index is 3 are the same as the pilot subcarriers in the DRUs 26 whose indices are 3 and 8. Data subcarriers included in a DRU 52 whose index is 4 are the same as the data subcarriers in the DRUs 26 whose indices are 4 and 9, and pilot subcarriers included in the DRU 52 whose index is 4 are the same as the pilot subcarriers in the DRUs 26 whose indices are 4 and 9.

Optionally, the predefined discrete resource blocks include two discrete resource blocks DRUs 106 in each of which a quantity of subcarriers is 106, and each DRU 106 includes 102 data subcarriers and four pilot subcarriers. Data subcarriers included in a DRU 106 whose index is 1 are the data subcarriers in the DRUs 26 whose indices are 1, 3, 6, and 8, and data subcarriers whose indices are −9, 8, −120, −5, 4, and 119; and indices of pilot subcarriers included in the DRU 106 whose index is 1 are −122, −7, 6, and 121. Data subcarriers included in a DRU 106 whose index is 2 are the data subcarriers in the DRUs 26 whose indices are 2, 4, 7, and 9, and data subcarriers whose indices are −8, 9, −119, −4, 5, and 120; and indices of pilot subcarriers included in the DRU 106 whose index is 2 are −121, −6, 7, and 122.

Optionally, the predefined discrete resource blocks include nine discrete resource blocks DRUs 26 in each of which a quantity of subcarriers is 26, and each DRU 26 includes 24 data subcarriers and two pilot subcarriers. Indices of data subcarriers included in a DRU 26 whose index is 1 are −113, −104, −95, −86, −77, −68, −59, −50, −41, −32, −23, −14, 6, 15, 24, 33, 42, 51, 60, 69, 78, 87, 96, and 105, and indices of pilot subcarriers included in the DRU 26 whose index is 1 are −5 and 116. Indices of data subcarriers included in a DRU 26 whose index is 2 are −112, −103, −94, −85, −76, −67, −58, −49, −40, −31, −22, −13, 7, 16, 25, 34, 43, 52, 61, 70, 79, 88, 97, and 106, and indices of pilot subcarriers included in the DRU 26 whose index is 2 are −4 and 117. Indices of data subcarriers included in a DRU 26 whose index is 3 are −111, −102, −93, −84, −75, −66, −57, −48, −39, −30, −21, −12, 8, 17, 26, 35, 44, 53, 62, 71, 80, 89, 98, and 107, and indices of pilot subcarriers included in the DRU 26 whose index is 3 are −122 and 118. Indices of data subcarriers included in a DRU 26 whose index is 4 are −110, −101, −92, −83, −74, −65, −56, −47, −38, −29, −20, −11, 9, 18, 27, 36, 45, 54, 63, 72, 81, 90, 99, and 108, and indices of pilot subcarriers included in the DRU 26 whose index is 4 are −121 and 119. Indices of data subcarriers included in a DRU 26 whose index is 5 are −109, −100, −91, −82, −73, −64, −55, −46, −37, −28, −19, −10, 10, 19, 28, 37, 46, 55, 64, 73, 82, 91, 100, and 109, and indices of pilot subcarriers included in the DRU 26 whose index is 5 are −120 and 120. Indices of data subcarriers included in a DRU 26 whose index is 6 are −108, −99, −90, −81, −72, −63, −54, −45, −36, −27, −18, −9, 11, 20, 29, 38, 47, 56, 65, 74, 83, 92, 101, and 110, and indices of pilot subcarriers included in the DRU 26 whose index is 6 are −119 and 121. Indices of data subcarriers included in a DRU 26 whose index is 7 are −107, −98, −89, −80, −71, −62, −53, −44, −35, −26, −17, −8, 12, 21, 30, 39, 48, 57, 66, 75, 84, 93, 102, and 111, and indices of pilot subcarriers included in the DRU 26 whose index is 7 are −118 and 122. Indices of data subcarriers included in a DRU 26 whose index is 8 are −106, −97, −88, −79, −70, −61, −52, −43, −34, −25, −16, −7, 13, 22, 31, 40, 49, 58, 67, 76, 85, 94, 103, and 112, and indices of pilot subcarriers included in the DRU 26 whose index is 8 are −117 and 4. Indices of data subcarriers included in a DRU 26 whose index is 9 are −105, −96, −87, −78, −69, −60, −51, −42, −33, −24, −15, −6, 14, 23, 32, 41, 50, 59, 68, 77, 86, 95, 104, and 113, and indices of pilot subcarriers included in the DRU 26 whose index is 9 are −116 and 5.

Optionally, the predefined discrete resource blocks include four discrete resource blocks DRUs 52 in each of which a quantity of subcarriers is 52, and each DRU 52 includes 48 data subcarriers and four pilot subcarriers. Data subcarriers included in a DRU 52 whose index is 1 are the same as the data subcarriers in the DRUs 26 whose indices are 1 and 6, and pilot subcarriers included in the DRU 52 whose index is 1 are the same as the pilot subcarriers in the DRUs 26 whose indices are 1 and 6. Data subcarriers included in a DRU 52 whose index is 2 are the same as the data subcarriers in the DRUs 26 whose indices are 2 and 7, and pilot subcarriers included in the DRU 52 whose index is 2 are the same as the pilot subcarriers in the DRUs 26 whose indices are 2 and 7. Data subcarriers included in a DRU 52 whose index is 3 are the same as the data subcarriers in the DRUs 26 whose indices are 3 and 8, and pilot subcarriers included in the DRU 52 whose index is 3 are the same as the pilot subcarriers in the DRUs 26 whose indices are 3 and 8. Data subcarriers included in a DRU 52 whose index is 4 are the same as the data subcarriers in the DRUs 26 whose indices are 4 and 9, and pilot subcarriers included in the DRU 52 whose index is 4 are the same as the pilot subcarriers in the DRUs 26 whose indices are 4 and 9.

Optionally, the predefined discrete resource blocks include two discrete resource blocks DRUs 106 in each of which a quantity of subcarriers is 106, and each DRU 106 includes 102 data subcarriers and four pilot subcarriers. Data subcarriers included in a DRU 106 whose index is 1 are the data subcarriers in the DRUs 26 whose indices are 1, 3, 6, and 8, and data subcarriers whose indices are −115, 114, −119, −117, 116, and 118; and indices of pilot subcarriers included in the DRU 106 whose index is 1 are −122, −5, 4, and 121. Data subcarriers included in a DRU 106 whose index is 2 are the data subcarriers in the DRUs 26 whose indices are 2, 4, 7, and 9, and data subcarriers whose indices are −114, 115, −118, −116, 117, and 119; and indices of pilot subcarriers included in the DRU 106 whose index is 2 are −121, −4, 5, and 122.

Optionally, a change of a quantity of subcarriers spaced between two adjacent data subcarriers whose indices are both positive numbers or both negative numbers and that are included in the predefined discrete resource block does not exceed 1 or 2.

It should be understood that the communication apparatus 2 may correspondingly perform the foregoing embodiment, and the foregoing operations or functions of the units in the communication apparatus 2 are separately intended to implement corresponding operations of the AP in the foregoing method embodiment. For brevity, details are not described herein again.

The foregoing describes the access point and the station in embodiments of this application. The following describes possible product forms of the access point and the station. It should be understood that any product in any form that has the functions of the station in FIG. 9 and any product in any form that has the functions of the AP in FIG. 10 fall within the protection scope of embodiments of this application. It should be further understood that the following description is merely an example, and product forms of the AP and the station in embodiments of this application are not limited thereto.

In a possible product form, the AP and the STA in embodiments of this application may be implemented by using general bus architectures.

Figure 11:
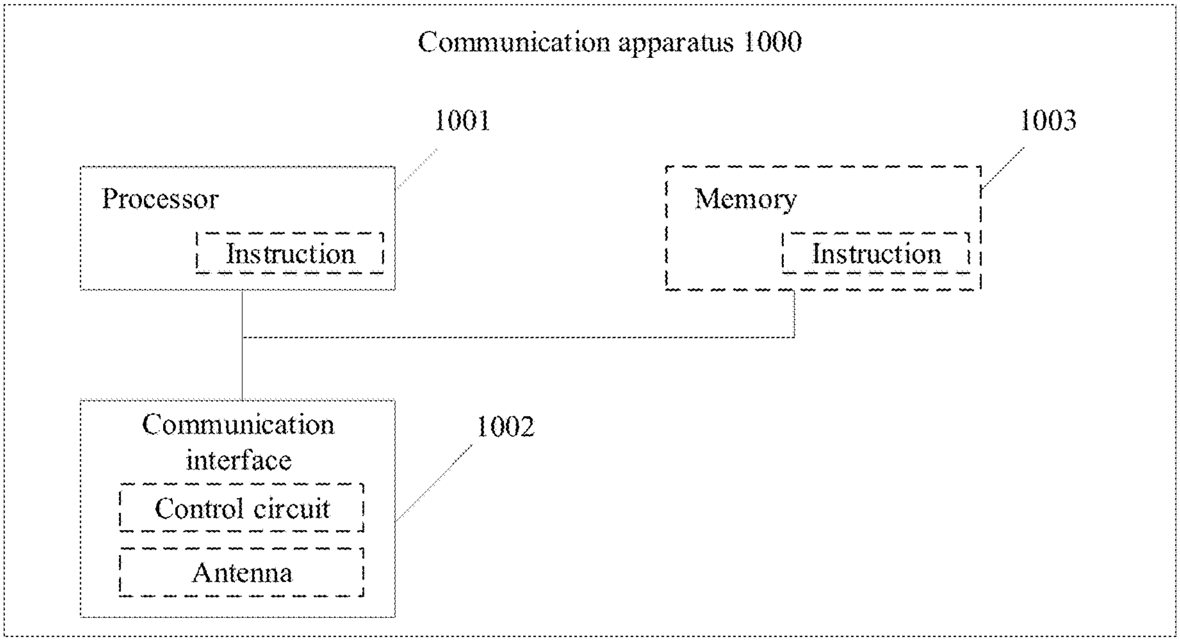
FIG. 11 is a schematic diagram of a structure of a communication apparatus 1000 according to an embodiment of this application.

For ease of description, FIG. 11 is a schematic diagram of a structure of a communication apparatus 1000 according to an embodiment of this application. The communication apparatus 1000 may be an AP or a STA, or a chip in an AP or a STA. FIG. 11 shows only main components of the communication apparatus 1000. The communication apparatus 1000 includes a processor 1001 and a communication interface 1002.

Optionally, the communication apparatus 1000 may further include a memory 1003 and/or an input/output apparatus (not shown in the figure). The memory 1003 may be located inside the communication apparatus 1000, or may be located outside the communication apparatus 1000. This is not limited in this application.

The processor 1001 may be configured to: process a communication protocol and/or communication data, control the entire communication apparatus, execute a software program, and process data of the software program. The memory 1003 may be configured to store a software program (or instructions) and data. The communication interface 1002 is configured to input and output data or information. Specifically, the communication interface 1002 may include a control circuit and an antenna. The control circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to: receive data input by a user and output data to the user.

After the communication apparatus is powered on, the processor 1001 may read the software program in the memory 1003, interpret and execute instructions of the software program, and process data of the software program. When data needs to be sent wirelessly, the processor 1001 performs baseband processing on the to-be-sent data, and then outputs a baseband signal to a radio frequency circuit. The radio frequency circuit performs radio frequency processing on the baseband signal, and then sends a radio frequency signal through the antenna in an electromagnetic wave form. When data is sent to the communication apparatus, the radio frequency circuit receives a radio frequency signal through the antenna, converts the radio frequency signal into a baseband signal, and outputs the baseband signal to the processor 1001. The processor 1001 converts the baseband signal into data, and processes the data.

Optionally, the memory 1003 may be located inside the processor 1001.

In another implementation, the radio frequency circuit and the antenna may be disposed independently of the processor that performs baseband processing. For example, in a distributed scenario, the radio frequency circuit and the antenna may be disposed remotely and independently of the communication apparatus.

The processor 1001, the communication interface 1002, and the memory 1003 may be connected through a communication bus.

In a design, the communication apparatus 1000 may be configured to perform the functions of the AP in the foregoing method embodiment. The processor 1001 may be configured to generate the triggering frame that is sent in step S101 in FIG. 8, and/or configured to perform another method process of the technology described in this specification. The communication interface 1002 may be configured to perform step S101 and step S105 in FIG. 8, and/or configured to perform another method process of the technology described in this specification.

In another design, the communication apparatus 1000 may be configured to perform the functions of the STA in the foregoing method embodiment. The processor 1001 may be configured to perform step S103 in FIG. 8, and/or configured to perform another process of the technology described in this specification. The communication interface 1002 may be configured to perform step S102 and step S104 in FIG. 8, and/or configured to perform another process of the technology described in this specification.

In either of the foregoing designs, the processor 1001 may include a communication interface configured to implement receiving and sending functions. For example, the communication interface may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In either of the foregoing designs, the processor 1001 may store instructions. The instructions may be a computer program. The computer program is run on the processor 1001, so that the communication apparatus 1000 can perform the method described in the foregoing method embodiment. The computer program may be fixed in the processor 1001, and in this case, the processor 1001 may be implemented by hardware.

In an implementation, the communication apparatus 1000 may include a circuit, and the circuit may implement a sending, receiving, or communication function in the foregoing method embodiment. The processor and the transceiver described in this application may be implemented on an integrated circuit (integrated circuit, IC), an analog IC, a radio frequency integrated circuit (radio frequency integrated circuit, RFIC), a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communication apparatus described in this application is not limited thereto, and a structure of the communication apparatus may not be limited by that in FIG. 11. The communication apparatus may be an independent device or may be a part of a large device. For example, the communication apparatus may be:

(1) an independent integrated circuit IC, a chip, or a chip system or subsystem;
(2) a set including one or more ICs, where optionally, the set of ICs may also include a storage component configured to store data and a computer program;
(3) an ASIC, for example, a modem (Modem);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) another device, or the like.

In a possible product form, the AP and the STA in embodiments of this application may be implemented by using general-purpose processors (or chips).

The general-purpose processor for implementing the AP includes a processing circuit and an input/output interface that is internally connected to and communicates with the processing circuit. The general-purpose processor may be configured to perform the functions of the AP in the foregoing method embodiment. Specifically, the processing circuit may be configured to generate the triggering frame that is sent in step S101 in FIG. 8, and/or configured to perform another process of the technology described in this specification. The input/output interface may be configured to perform step S101 and step S105 in FIG. 8, and/or configured to perform another process of the technology described in this specification.

The general-purpose processor for implementing the STA includes a processing circuit and an input/output interface that is internally connected to and communicates with the processing circuit. The general-purpose processor may be configured to perform the functions of the STA in the foregoing method embodiment. Specifically, the processing circuit may be configured to perform step S103 in FIG. 8, and/or configured to perform another process of the technology described in this specification. The input/output interface may be configured to perform step S102 and step S104 in FIG. 8, and/or configured to perform another process of the technology described in this specification.

It should be understood that the communication apparatuses in the foregoing various product forms have any function of the AP or STA in the foregoing method embodiment. Details are not described herein again.

An embodiment of this application further provides a computer-readable storage medium. The computer-readable storage medium stores computer program code. When the foregoing processor executes the computer program code, an electronic device performs the method in the foregoing method embodiment.

An embodiment of this application further provides a computer program product. When the computer program product is run on a computer, the computer is enabled to perform the method in the foregoing method embodiment.

An embodiment of this application further provides a communication apparatus. The apparatus may exist in a product form of a chip. A structure of the apparatus includes a processor and an interface circuit. The processor is configured to communicate with another apparatus through a receiving circuit, so that the apparatus performs the method in the foregoing method embodiment.

An embodiment of this application further provides a wireless communication system, including an AP and a STA. The AP and the STA may perform the method in the foregoing method embodiment.

Method or algorithm steps described in combination with the content disclosed in this application may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to the processor, so that the processor can read information from the storage medium and write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, these functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another place. The storage medium may be any available medium accessible to a general-purpose or a dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A trigger-based physical layer protocol data unit transmission method, comprising:

receiving, by a station, a triggering frame, wherein the triggering frame comprises discrete resource unit (DRU) indication information, the DRU indication information indicates information about a DRU allocated to the station, an operating bandwidth of the station is 20 MHz, the DRU is one or more of predefined discrete resource blocks, and an absolute value of a difference between indices of any two data subcarriers in each resource block in the predefined discrete resource blocks is greater than 1;

determining, by the station, the allocated DRU based on an indication of the DRU indication information; and sending, by the station, a trigger-based physical layer protocol data unit (TB PPDU) by using the DRU.

2. The method according to claim 1, wherein the predefined discrete resource blocks comprise nine discrete resource blocks DRUs 26, a quantity of subcarriers of each DRU 26 in the nine discrete resource blocks DRUs 26 is 26, and each DRU 26 in the nine discrete resource blocks DRUs 26 comprises 24 data subcarriers and two pilot subcarriers, wherein indices of data subcarriers comprised in a DRU 26 whose index is 1 are −115, −106, −97, −88, −79, −70, −61, −52, −43, −34, −25, −16, 8, 17, 26, 35, 44, 53, 62, 71, 80, 89, 98, and 107, and indices of pilot subcarriers comprised in the DRU 26 whose index is 1 are −7 and 118;

indices of data subcarriers comprised in a DRU 26 whose index is 2 are −114, −105, −96, −87, −78, −69, −60, −51, −42, −33, −24, −15, 9, 18, 27, 36, 45, 54, 63, 72, 81, 90, 99, and 108, and indices of pilot subcarriers comprised in the DRU 26 whose index is 2 are −6 and 119;

indices of data subcarriers comprised in a DRU 26 whose index is 3 are −113, −104, −95, −86, −77, −68, −59, −50, −41, −32, −23, −14, 10, 19, 28, 37, 46, 55, 64, 73, 82, 91, 100, and 109, and indices of pilot subcarriers comprised in the DRU 26 whose index is 3 are −5 and 120;

indices of data subcarriers comprised in a DRU 26 whose index is 4 are −112, −103, −94, −85, −76, −67, −58, −49, −40, −31, −22, −13, 11, 20, 29, 38, 47, 56, 65, 74, 83, 92, 101, and 110, and indices of pilot subcarriers comprised in the DRU 26 whose index is 4 are −4 and 121;

indices of data subcarriers comprised in a DRU 26 whose index is 5 are −111, −102, −93, −84, −75, −66, −57, −48, −39, −30, −21, −12, 12, 21, 30, 39, 48, 57, 66, 75, 84, 93, 102, and 111, and indices of pilot subcarriers comprised in the DRU 26 whose index is 5 are −122 and 122;

indices of data subcarriers comprised in a DRU 26 whose index is 6 are −110, −101, −92, −83, −74, −65, −56, −47, −38, −29, −20, −11, 13, 22, 31, 40, 49, 58, 67, 76, 85, 94, 103, and 112, and indices of pilot subcarriers comprised in the DRU 26 whose index is 6 are −121 and 4;

indices of data subcarriers comprised in a DRU 26 whose index is 7 are −109, −100, −91, −82, −73, −64, −55, −46, −37, −28, −19, −10, 14, 23, 32, 41, 50, 59, 68, 77, 86, 95, 104, and 113, and indices of pilot subcarriers comprised in the DRU 26 whose index is 7 are −120 and 5;

indices of data subcarriers comprised in a DRU 26 whose index is 8 are −108, −99, −90, −81, −72, −63, −54, −45, −36, −27, −18, −9, 15, 24, 33, 42, 51, 60, 69, 78, 87, 96, 105, and 114, and indices of pilot subcarriers comprised in the DRU 26 whose index is 8 are −119 and 6; and indices of data subcarriers comprised in a DRU 26 whose index is 9 are −107, −98, −89, −80, −71, −62, −53, −44, −35, −26, −17, −8, 16, 25, 34, 43, 52, 61, 70, 79, 88, 97, 106, and 115, and indices of pilot subcarriers comprised in the DRU 26 whose index is 9 are −118 and 7.

3. The method according to claim 2, wherein the predefined discrete resource blocks comprise four discrete resource blocks DRUs 52, a quantity of subcarriers of each DRU 52 in the four discrete resource blocks DRUs 52 is 52, and each DRU 52 in the four discrete resource blocks DRUs 52 comprises 48 data subcarriers and four pilot subcarriers, wherein data subcarriers comprised in a DRU 52 whose index is 1 are the same as the data subcarriers in the DRUs 26 whose indices are is 1 and 6, and pilot subcarriers comprised in the DRU 52 whose index is 1 are the same as the pilot subcarriers in the DRUs 26 whose indices are 1 and 6;

data subcarriers comprised in a DRU 52 whose index is 2 are the same as the data subcarriers in the DRUs 26 whose indices are 2 and 7, and pilot subcarriers comprised in the DRU 52 whose index is 2 are the same as the pilot subcarriers in the DRUs 26 whose indices are 2 and 7;

data subcarriers comprised in a DRU 52 whose index is 3 are the same as the data subcarriers in the DRUs 26 whose indices are 3 and 8, and pilot subcarriers comprised in the DRU 52 whose index is 3 are the same as the pilot subcarriers in the DRUs 26 whose indices are 3 and 8; and data subcarriers comprised in a DRU 52 whose index is 4 are the same as the data subcarriers in the DRUs 26 whose indices are 4 and 9, and pilot subcarriers comprised in the DRU 52 whose index is 4 are the same as the pilot subcarriers in the DRUs 26 whose indices are 4 and 9.

4. The method according to claim 2, wherein the predefined discrete resource blocks comprise two discrete resource blocks DRUs 106, a quantity of subcarriers of each DRU 26 106 in the two discrete resource blocks DRUs 106 is 106, and each DRU 106 in the two discrete resource blocks DRUs 106 comprises 102 data subcarriers and four pilot subcarriers, wherein data subcarriers comprised in a DRU 106 whose index is 1 are the data subcarriers in the DRUs 26 whose indices are 1, 3, 6, and 8, and data subcarriers whose indices are −117, 116, −119, −5, 118, and 4; and indices of pilot subcarriers comprised in the DRU 106 whose index is 1 are −121, −7, 6, and 120; and data subcarriers comprised in a DRU 106 whose index is 2 are the data subcarriers in the DRUs 26 whose indices are 2, 4, 7, and 9, and data subcarriers whose indices are −116, 117, −118, −4, 119, and 5; and indices of pilot subcarriers comprised in the DRU 106 whose index is 2 are −120, −6, 7, and 121.

5. The method according to claim 1, wherein the predefined discrete resource blocks comprise nine discrete resource blocks DRUs 26, a quantity of subcarriers of each DRU 26 in the nine discrete resource blocks DRUs 26 is 26, and each DRU 26 in the nine discrete resource blocks DRUs 26 comprises 24 data subcarriers and two pilot subcarriers, wherein indices of data subcarriers comprised in a DRU 26 whose index is 1 are −117, −108, −99, −90, −81, −72, −63, −54, −45, −36, −27, −18, 10, 19, 28, 37, 46, 55, 64, 73, 82, 91, 100, and 109, and indices of pilot subcarriers comprised in the DRU 26 whose index is 1 are −122 and 4;

indices of data subcarriers comprised in a DRU 26 whose index is 2 are −116, −107, −98, −89, −80, −71, −62, −53, −44, −35, −26, −17, 11, 20, 29, 38, 47, 56, 65, 74, 83, 92, 101, and 110, and indices of pilot subcarriers comprised in the DRU 26 whose index is 2 are −121 and 5;

indices of data subcarriers comprised in a DRU 26 whose index is 3 are −115, −106, −97, −88, −79, −70, −61, −52, −43, −34, −25, −16, 12, 21, 30, 39, 48, 57, 66, 75, 84, 93, 102, and 111, and indices of pilot subcarriers comprised in the DRU 26 whose index is 3 are −120 and 6;

indices of data subcarriers comprised in a DRU 26 whose index is 4 are −114, −105, −96, −87, −78, −69, −60, −51, −42, −33, −24, −15, 13, 22, 31, 40, 49, 58, 67, 76, 85, 94, 103, and 112, and indices of pilot subcarriers comprised in the DRU 26 whose index is 4 are −119 and 7;

indices of data subcarriers comprised in a DRU 26 whose index is 5 are −113, −104, −95, −86, −77, −68, −59, −50, −41, −32, −23, −14, 14, 23, 32, 41, 50, 59, 68, 77, 86, 95, 104, and 113, and indices of pilot subcarriers comprised in the DRU 26 whose index is 5 are −118 and 118;

indices of data subcarriers comprised in a DRU 26 whose index is 6 are −112, −103, −94, −85, −76, −67, −58, −49, −40, −31, −22, −13, 15, 24, 33, 42, 51, 60, 69, 78, 87, 96, 105, and 114, and indices of pilot subcarriers comprised in the DRU 26 whose index is 6 are −7 and 119;

indices of data subcarriers comprised in a DRU 26 whose index is 7 are −111, −102, −93, −84, −75, −66, −57, −48, −39, −30, −21, −12, 16, 25, 34, 43, 52, 61, 70, 79, 88, 97, 106, and 115, and indices of pilot subcarriers comprised in the DRU 26 whose index is 7 are −6 and 120;

indices of data subcarriers comprised in a DRU 26 whose index is 8 are −110, −101, −92, −83, −74, −65, −56, −47, −38, −29, −20, −11, 17, 26, 35, 44, 53, 62, 80, 89, 98, 71, 107, and 116, and indices of pilot subcarriers comprised in the DRU 26 whose index is 8 are −5 and 121; and indices of data subcarriers comprised in a DRU 26 whose index is 9 are −109, −100, −91, −82, −73, −64, −55, −46, −37, −28, −19, −10, 18, 27, 36, 45, 54, 63, 72, 81, 90, 99, 108, and 117, and indices of pilot subcarriers comprised in the DRU 26 whose index is 9 are −4 and 122.

6. The method according to claim 5, wherein the predefined discrete resource blocks comprise four discrete resource blocks DRUs 52, a quantity of subcarriers of each DRU 52 in the four discrete resource blocks DRUs 52 is 52, and each DRU 52 in the four discrete resource blocks DRUs 52 comprises 48 data subcarriers and four pilot subcarriers, wherein data subcarriers comprised in a DRU 52 whose index is 1 are the same as the data subcarriers in the DRUs 26 whose indices are 1 and 6, and pilot subcarriers comprised in the DRU 52 whose index is 1 are the same as the pilot subcarriers in the DRUs 26 whose indices are 1 and 6;

data subcarriers comprised in a DRU 52 whose index is 2 are the same as the data subcarriers in the DRUs 26 whose indices are 2 and 7, and pilot subcarriers comprised in the DRU 52 whose index is 2 are the same as the pilot subcarriers in the DRUs 26 whose indices are 2 and 7;

data subcarriers comprised in a DRU 52 whose index is 3 are the same as the data subcarriers in the DRUs 26 whose indices are 3 and 8, and pilot subcarriers comprised in the DRU 52 whose index is 3 are the same as the pilot subcarriers in the DRUs 26 whose indices are 3 and 8; and data subcarriers comprised in a DRU 52 whose index is 4 are the same as the data subcarriers in the DRUs 26 whose indices are 4 and 9, and pilot subcarriers comprised in the DRU 52 whose index is 4 are the same as the pilot subcarriers in the DRUs 26 whose indices are 4 and 9.

7. The method according to claim 5, wherein the predefined discrete resource blocks comprise two discrete resource blocks DRUs 106, a quantity of subcarriers of each DRU 26 106 in the two discrete resource blocks DRUs 106 is 106, and each DRU 106 in the two discrete resource blocks DRUs 106 comprises 102 data subcarriers and four pilot subcarriers, wherein data subcarriers comprised in a DRU 106 whose index is 1 are the data subcarriers in the DRUs 26 whose indices are 1, 3, 6, and 8, and data subcarriers whose indices are −9, 8, −120, −5, 4, and 119; and indices of pilot subcarriers comprised in the DRU 106 whose index is 1 are −122, −7, 6, and 121; and data subcarriers comprised in a DRU 106 whose index is 2 are the data subcarriers in the DRUs 26 whose indices are 2, 4, 7, and 9, and data subcarriers whose indices are −8, 9, −119, −4, 5, and 120; and indices of pilot subcarriers comprised in the DRU 106 whose index is 2 are −121, −6, 7, and 122.

8. The method according to claim 1, wherein the predefined discrete resource blocks comprise nine discrete resource blocks DRUs 26, a quantity of subcarriers of each DRU 26 in the nine discrete resource blocks DRUs 26 is 26, and each DRU 26 in the nine discrete resource blocks DRUs 26 comprises 24 data subcarriers and two pilot subcarriers, wherein indices of data subcarriers comprised in a DRU 26 whose index is 1 are −113, −104, −95, −86, −77, −68, −59, −50, −41, −32, −23, −14, 6, 15, 24, 33, 42, 51, 60, 69, 78, 87, 96, and 105, and indices of pilot subcarriers comprised in the DRU 26 whose index is 1 are −5 and 116;

indices of data subcarriers comprised in a DRU 26 whose index is 2 are −112, −103, −94, −85, −76, −67, −58, −49, −40, −31, −22, −13, 7, 16, 25, 34, 43, 52, 61, 70, 79, 88, 97, and 106, and indices of pilot subcarriers comprised in the DRU 26 whose index is 2 are −4 and 117;

indices of data subcarriers comprised in a DRU 26 whose index is 3 are −111, −102, −93, −84, −75, −66, −57, −48, −39, −30, −21, −12, 8, 17, 26, 35, 44, 53, 62, 71, 80, 89, 98, and 107, and indices of pilot subcarriers comprised in the DRU 26 whose index is 3 are −122 and 118;

indices of data subcarriers comprised in a DRU 26 whose index is 4 are −110, −101, −92, −83, −74, −65, −56, −47, −38, −29, −20, −11, 9, 18, 27, 36, 45, 54, 63, 72, 81, 90, 99, and 108, and indices of pilot subcarriers comprised in the DRU 26 whose index is 4 are −121 and 119;

indices of data subcarriers comprised in a DRU 26 whose index is 5 are −109, −100, −91, −82, −73, −64, −55, −46, −37, −28, −19, −10, 10, 19, 28, 37, 46, 55, 64, 73, 82, 91, 100, and 109, and indices of pilot subcarriers comprised in the DRU 26 whose index is 5 are −120 and 120;

indices of data subcarriers comprised in a DRU 26 whose index is 6 are −108, −99, −90, −81, −72, −63, −54, −45, −36, −27, −18, −9, 11, 20, 29, 38, 47, 56, 65, 74, 83, 92, 101, and 110, and indices of pilot subcarriers comprised in the DRU 26 whose index is 6 are −119 and 121;

indices of data subcarriers comprised in a DRU 26 whose index is 7 are −107, −98, −89, −80, −71, −62, −53, −44, −35, −26, −17, −8, 12, 21, 30, 39, 48, 57, 66, 75, 84, 93, 102, and 111, and indices of pilot subcarriers comprised in the DRU 26 whose index is 7 are −118 and 122;

indices of data subcarriers comprised in a DRU 26 whose index is 8 are −106, −97, −88, −79, −70, −61, −52, −43, −34, −25, −16, −7, 13, 22, 31, 40, 49, 58, 67, 76, 85, 94, 103, and 112, and indices of pilot subcarriers comprised in the DRU 26 whose index is 8 are −117 and 4; and indices of data subcarriers comprised in a DRU 26 whose index is 9 are −105, −96, −87, −78, −69, −60, −51, −42, −33, −24, −15, −6, 14, 23, 32, 41, 50, 59, 68, 77, 86, 95, 104, and 113, and indices of pilot subcarriers comprised in the DRU 26 whose index is 9 are −116 and 5.

9. The method according to claim 8, wherein the predefined discrete resource blocks comprise four discrete resource blocks DRUs 52, a quantity of subcarriers of each DRU 52 in the four discrete resource blocks DRUs 52 is 52, and each DRU 52 in the four discrete resource blocks DRUs 52 comprises 48 data subcarriers and four pilot subcarriers, wherein data subcarriers comprised in a DRU 52 whose index is 1 are the same as the data subcarriers in the DRUs 26 whose indices are 1 and 6, and pilot subcarriers comprised in the DRU 52 whose index is 1 are the same as the pilot subcarriers in the DRUs 26 whose indices are 1 and 6;

data subcarriers comprised in a DRU 52 whose index is 2 are the same as the data subcarriers in the DRUs 26 whose indices are 2 and 7, and pilot subcarriers comprised in the DRU 52 whose index is 2 are the same as the pilot subcarriers in the DRUs 26 whose indices are 2 and 7;

data subcarriers comprised in a DRU 52 whose index is 3 are the same as the data subcarriers in the DRUs 26 whose indices are 3 and 8, and pilot subcarriers comprised in the DRU 52 whose index is 3 are the same as the pilot subcarriers in the DRUs 26 whose indices are 3 and 8; and data subcarriers comprised in a DRU 52 whose index is 4 are the same as the data subcarriers in the DRUs 26 whose indices are 4 and 9, and pilot subcarriers comprised in the DRU 52 whose index is 4 are the same as the pilot subcarriers in the DRUs 26 whose indices are 4 and 9.

10. The method according to claim 8, wherein the predefined discrete resource blocks comprise two discrete resource blocks DRUs 106, a quantity of subcarriers of each DRU 26 106 in the two discrete resource blocks DRUs 106 is 106, and each DRU 106 in the two discrete resource blocks DRUs 106 comprises 102 data subcarriers and four pilot subcarriers, wherein data subcarriers comprised in a DRU 106 whose index is 1 are the data subcarriers in the DRUs 26 whose indices are 1, 3, 6, and 8, and data subcarriers whose indices are −115, 114, −119, −117, 116, and 118; and indices of pilot subcarriers comprised in the DRU 106 whose index is 1 are −122, −5, 4, and 121; and data subcarriers comprised in a DRU 106 whose index is 2 are the data subcarriers in the DRUs 26 whose indices are 2, 4, 7, and 9, and data subcarriers whose indices are −114, 115, −118, −116, 117, and 119; and indices of pilot subcarriers comprised in the DRU 106 whose index is 2 are −121, −4, 5, and 122.

11. A communication apparatus, comprising at least one processor, wherein the at least one processor is coupled to a memory, and the at least one processor is configured to execute instructions to cause the communication apparatus to perform operations comprising:

receiving, by a station, a triggering frame, wherein the triggering frame comprises discrete resource unit (DRU) indication information, the DRU indication information indicates information about a DRU allocated to the station, an operating bandwidth of the station is 20 MHz, the DRU is one or more of predefined discrete resource blocks, and an absolute value of a difference between indices of any two data subcarriers in each resource block in the predefined discrete resource blocks is greater than 1;

determining, by the station, the allocated DRU based on an indication of the DRU indication information; and sending, by the station, a trigger-based physical layer protocol data unit (TB PPDU) by using the DRU.

12. The communication apparatus according to claim 11, wherein the predefined discrete resource blocks comprise nine discrete resource blocks DRUs 26, a quantity of subcarriers of each DRU 26 in the nine discrete resource blocks DRUs 26 is 26, and each DRU 26 in the nine discrete resource blocks DRUs 26 comprises 24 data subcarriers and two pilot subcarriers, wherein indices of data subcarriers comprised in a DRU 26 whose index is 1 are −115, −106, −97, −88, −79, −70, −61, −52, −43, −34, −25, −16, 8, 17, 26, 35, 44, 53, 62, 71, 80, 89, 98, and 107, and indices of pilot subcarriers comprised in the DRU 26 whose index is 1 are −7 and 118;

indices of data subcarriers comprised in a DRU 26 whose index is 2 are −114, −105, −96, −87, −78, −69, −60, −51, −42, −33, −24, −15, 9, 18, 27, 36, 45, 54, 63, 72, 81, 90, 99, and 108, and indices of pilot subcarriers comprised in the DRU 26 whose index is 2 are −6 and 119;

indices of data subcarriers comprised in a DRU 26 whose index is 3 are −113, −104, −95, −86, −77, −68, −59, −50, −41, −32, −23, −14, 10, 19, 28, 37, 46, 55, 64, 73, 82, 91, 100, and 109, and indices of pilot subcarriers comprised in the DRU 26 whose index is 3 are −5 and 120;

indices of data subcarriers comprised in a DRU 26 whose index is 4 are −112, −103, −94, −85, −76, −67, −58, −49, −40, −31, −22, −13, 11, 20, 29, 38, 47, 56, 65, 74, 83, 92, 101, and 110, and indices of pilot subcarriers comprised in the DRU 26 whose index is 4 are −4 and 121;

indices of data subcarriers comprised in a DRU 26 whose index is 5 are −111, −102, −93, −84, −75, −66, −57, −48, −39, −30, −21, −12, 12, 21, 30, 39, 48, 57, 66, 75, 84, 93, 102, and 111, and indices of pilot subcarriers comprised in the DRU 26 whose index is 5 are −122 and 122;

indices of data subcarriers comprised in a DRU 26 whose index is 6 are −110, −101, −92, −83, −74, −65, −56, −47, −38, −29, −20, −11, 13, 22, 31, 40, 49, 58, 67, 76, 85, 94, 103, and 112, and indices of pilot subcarriers comprised in the DRU 26 whose index is 6 are −121 and 4;

indices of data subcarriers comprised in a DRU 26 whose index is 7 are −109, −100, −91, −82, −73, −64, −55, −46, −37, −28, −19, −10, 14, 23, 32, 41, 50, 59, 68, 77, 86, 95, 104, and 113, and indices of pilot subcarriers comprised in the DRU 26 whose index is 7 are −120 and 5;

indices of data subcarriers comprised in a DRU 26 whose index is 8 are −108, −99, −90, −81, −72, −63, −54, −45, −36, −27, −18, −9, 15, 24, 33, 42, 51, 60, 69, 78, 87, 96, 105, and 114, and indices of pilot subcarriers comprised in the DRU 26 whose index is 8 are −119 and 6; and indices of data subcarriers comprised in a DRU 26 whose index is 9 are −107, −98, −89, −80, −71, −62, −53, −44, −35, −26, −17, −8, 16, 25, 34, 43, 52, 61, 70, 79, 88, 97, 106, and 115, and indices of pilot subcarriers comprised in the DRU 26 whose index is 9 are −118 and 7.

13. The communication apparatus according to claim 12, wherein the predefined discrete resource blocks comprise four discrete resource blocks DRUs 52, a quantity of subcarriers of each DRU 52 in the four discrete resource blocks DRUs 52 is 52, and each DRU 52 in the four discrete resource blocks DRUs 52 comprises 48 data subcarriers and four pilot subcarriers, wherein data subcarriers comprised in a DRU 52 whose index is 1 are the same as the data subcarriers in the DRUs 26 whose indices are is 1 and 6, and pilot subcarriers comprised in the DRU 52 whose index is 1 are the same as the pilot subcarriers in the DRUs 26 whose indices are 1 and 6;

data subcarriers comprised in a DRU 52 whose index is 2 are the same as the data subcarriers in the DRUs 26 whose indices are 2 and 7, and pilot subcarriers comprised in the DRU 52 whose index is 2 are the same as the pilot subcarriers in the DRUs 26 whose indices are 2 and 7;

data subcarriers comprised in a DRU 52 whose index is 3 are the same as the data subcarriers in the DRUs 26 whose indices are 3 and 8, and pilot subcarriers comprised in the DRU 52 whose index is 3 are the same as the pilot subcarriers in the DRUs 26 whose indices are 3 and 8; and data subcarriers comprised in a DRU 52 whose index is 4 are the same as the data subcarriers in the DRUs 26 whose indices are 4 and 9, and pilot subcarriers comprised in the DRU 52 whose index is 4 are the same as the pilot subcarriers in the DRUs 26 whose indices are 4 and 9.

14. The communication apparatus according to claim 12, wherein the predefined discrete resource blocks comprise two discrete resource blocks DRUs 106, a quantity of subcarriers of each DRU 26 106 in the two discrete resource blocks DRUs 106 is 106, and each DRU 106 in the two discrete resource blocks DRUs 106 comprises 102 data subcarriers and four pilot subcarriers, wherein data subcarriers comprised in a DRU 106 whose index is 1 are the data subcarriers in the DRUs 26 whose indices are 1, 3, 6, and 8, and data subcarriers whose indices are −117, 116, −119, −5, 118, and 4; and indices of pilot subcarriers comprised in the DRU 106 whose index is 1 are −121, −7, 6, and 120; and data subcarriers comprised in a DRU 106 whose index is 2 are the data subcarriers in the DRUs 26 whose indices are 2, 4, 7, and 9, and data subcarriers whose indices are −116, 117, −118, −4, 119, and 5; and indices of pilot subcarriers comprised in the DRU 106 whose index is 2 are −120, −6, 7, and 121.

15. The communication apparatus according to claim 11, wherein the predefined discrete resource blocks comprise nine discrete resource blocks DRUs 26, a quantity of subcarriers of each DRU 26 in the nine discrete resource blocks DRUs 26 is 26, and each DRU 26 in the nine discrete resource blocks DRUs 26 comprises 24 data subcarriers and two pilot subcarriers, wherein indices of data subcarriers comprised in a DRU 26 whose index is 1 are −117, −108, −99, −90, −81, −72, −63, −54, −45, −36, −27, −18, 10, 19, 28, 37, 46, 55, 64, 73, 82, 91, 100, and 109, and indices of pilot subcarriers comprised in the DRU 26 whose index is 1 are −122 and 4;

indices of data subcarriers comprised in a DRU 26 whose index is 2 are −116, −107, −98, −89, −80, −71, −62, −53, −44, −35, −26, −17, 11, 20, 29, 38, 47, 56, 65, 74, 83, 92, 101, and 110, and indices of pilot subcarriers comprised in the DRU 26 whose index is 2 are −121 and 5;

indices of data subcarriers comprised in a DRU 26 whose index is 3 are −115, −106, −97, −88, −79, −70, −61, −52, −43, −34, −25, −16, 12, 21, 30, 39, 48, 57, 66, 75, 84, 93, 102, and 111, and indices of pilot subcarriers comprised in the DRU 26 whose index is 3 are −120 and 6;

indices of data subcarriers comprised in a DRU 26 whose index is 4 are −114, −105, −96, −87, −78, −69, −60, −51, −42, −33, −24, −15, 13, 22, 31, 40, 49, 58, 67, 76, 85, 94, 103, and 112, and indices of pilot subcarriers comprised in the DRU 26 whose index is 4 are −119 and 7;

indices of data subcarriers comprised in a DRU 26 whose index is 5 are −113, −104, −95, −86, −77, −68, −59, −50, −41, −32, −23, −14, 14, 23, 32, 41, 50, 59, 68, 77, 86, 95, 104, and 113, and indices of pilot subcarriers comprised in the DRU 26 whose index is 5 are −118 and 118;

indices of data subcarriers comprised in a DRU 26 whose index is 6 are −112, −103, −94, −85, −76, −67, −58, −49, −40, −31, −22, −13, 15, 24, 33, 42, 51, 60, 69, 78, 87, 96, 105, and 114, and indices of pilot subcarriers comprised in the DRU 26 whose index is 6 are −7 and 119;

indices of data subcarriers comprised in a DRU 26 whose index is 7 are −111, −102, −93, −84, −75, −66, −57, −48, −39, −30, −21, −12, 16, 25, 34, 43, 52, 61, 70, 79, 88, 97, 106, and 115, and indices of pilot subcarriers comprised in the DRU 26 whose index is 7 are −6 and 120;

indices of data subcarriers comprised in a DRU 26 whose index is 8 are −110, −101, −92, −83, −74, −65, −56, −47, −38, −29, −20, −11, 17, 26, 35, 44, 53, 62, 80, 89, 98, 71, 107, and 116, and indices of pilot subcarriers comprised in the DRU 26 whose index is 8 are −5 and 121; and indices of data subcarriers comprised in a DRU 26 whose index is 9 are −109, −100, −91, −82, −73, −64, −55, −46, −37, −28, −19, −10, 18, 27, 36, 45, 54, 63, 72, 81, 90, 99, 108, and 117, and indices of pilot subcarriers comprised in the DRU 26 whose index is 9 are −4 and 122.

16. The communication apparatus according to claim 15, wherein the predefined discrete resource blocks comprise four discrete resource blocks DRUs 52, a quantity of subcarriers of each DRU 52 in the four discrete resource blocks DRUs 52 is 52, and each DRU 52 in the four discrete resource blocks DRUs 52 comprises 48 data subcarriers and four pilot subcarriers, wherein data subcarriers comprised in a DRU 52 whose index is 1 are the same as the data subcarriers in the DRUs 26 whose indices are 1 and 6, and pilot subcarriers comprised in the DRU 52 whose index is 1 are the same as the pilot subcarriers in the DRUs 26 whose indices are 1 and 6;

data subcarriers comprised in a DRU 52 whose index is 2 are the same as the data subcarriers in the DRUs 26 whose indices are 2 and 7, and pilot subcarriers comprised in the DRU 52 whose index is 2 are the same as the pilot subcarriers in the DRUs 26 whose indices are 2 and 7;

data subcarriers comprised in a DRU 52 whose index is 3 are the same as the data subcarriers in the DRUs 26 whose indices are 3 and 8, and pilot subcarriers comprised in the DRU 52 whose index is 3 are the same as the pilot subcarriers in the DRUs 26 whose indices are 3 and 8; and data subcarriers comprised in a DRU 52 whose index is 4 are the same as the data subcarriers in the DRUs 26 whose indices are 4 and 9, and pilot subcarriers comprised in the DRU 52 whose index is 4 are the same as the pilot subcarriers in the DRUs 26 whose indices are 4 and 9.

17. The communication apparatus according to claim 15, wherein the predefined discrete resource blocks comprise two discrete resource blocks DRUs 106, a quantity of subcarriers of each DRU 26 106 in the two discrete resource blocks DRUs 106 is 106, and each DRU 106 in the two discrete resource blocks DRUs 106 comprises 102 data subcarriers and four pilot subcarriers, wherein data subcarriers comprised in a DRU 106 whose index is 1 are the data subcarriers in the DRUs 26 whose indices are 1, 3, 6, and 8, and data subcarriers whose indices are −9, 8, −120, −5, 4, and 119; and indices of pilot subcarriers comprised in the DRU 106 whose index is 1 are −122, −7, 6, and 121; and data subcarriers comprised in a DRU 106 whose index is 2 are the data subcarriers in the DRUs 26 whose indices are 2, 4, 7, and 9, and data subcarriers whose indices are −8, 9, −119, −4, 5, and 120; and indices of pilot subcarriers comprised in the DRU 106 whose index is 2 are −121, −6, 7, and 122.

18. The communication apparatus according to claim 11, wherein the predefined discrete resource blocks comprise nine discrete resource blocks DRUs 26, a quantity of subcarriers of each DRU 26 in the nine discrete resource blocks DRUs 26 is 26, and each DRU 26 in the nine discrete resource blocks DRUs 26 comprises 24 data subcarriers and two pilot subcarriers, wherein indices of data subcarriers comprised in a DRU 26 whose index is 1 are −113, −104, −95, −86, −77, −68, −59, −50, −41, −32, −23, −14, 6, 15, 24, 33, 42, 51, 60, 69, 78, 87, 96, and 105, and indices of pilot subcarriers comprised in the DRU 26 whose index is 1 are −5 and 116;

indices of data subcarriers comprised in a DRU 26 whose index is 2 are −112, −103, −94, −85, −76, −67, −58, −49, −40, −31, −22, −13, 7, 16, 25, 34, 43, 52, 61, 70, 79, 88, 97, and 106, and indices of pilot subcarriers comprised in the DRU 26 whose index is 2 are −4 and 117;

indices of data subcarriers comprised in a DRU 26 whose index is 3 are −111, −102, −93, −84, −75, −66, −57, −48, −39, −30, −21, −12, 8, 17, 26, 35, 44, 53, 62, 71, 80, 89, 98, and 107, and indices of pilot subcarriers comprised in the DRU 26 whose index is 3 are −122 and 118;

indices of data subcarriers comprised in a DRU 26 whose index is 4 are −110, −101, −92, −83, −74, −65, −56, −47, −38, −29, −20, −11, 9, 18, 27, 36, 45, 54, 63, 72, 81, 90, 99, and 108, and indices of pilot subcarriers comprised in the DRU 26 whose index is 4 are −121 and 119;

indices of data subcarriers comprised in a DRU 26 whose index is 5 are −109, −100, −91, −82, −73, −64, −55, −46, −37, −28, −19, −10, 10, 19, 28, 37, 46, 55, 64, 73, 82, 91, 100, and 109, and indices of pilot subcarriers comprised in the DRU 26 whose index is 5 are −120 and 120;

indices of data subcarriers comprised in a DRU 26 whose index is 6 are −108, −99, −90, −81, −72, −63, −54, −45, −36, −27, −18, −9, 11, 20, 29, 38, 47, 56, 65, 74, 83, 92, 101, and 110, and indices of pilot subcarriers comprised in the DRU 26 whose index is 6 are −119 and 121;

indices of data subcarriers comprised in a DRU 26 whose index is 7 are −107, −98, −89, −80, −71, −62, −53, −44, −35, −26, −17, −8, 12, 21, 30, 39, 48, 57, 66, 75, 84, 93, 102, and 111, and indices of pilot subcarriers comprised in the DRU 26 whose index is 7 are −118 and 122;

indices of data subcarriers comprised in a DRU 26 whose index is 8 are −106, −97, −88, −79, −70, −61, −52, −43, −34, −25, −16, −7, 13, 22, 31, 40, 49, 58, 67, 76, 85, 94, 103, and 112, and indices of pilot subcarriers comprised in the DRU 26 whose index is 8 are −117 and 4; and indices of data subcarriers comprised in a DRU 26 whose index is 9 are −105, −96, −87, −78, −69, −60, −51, −42, −33, −24, −15, −6, 14, 23, 32, 41, 50, 59, 68, 77, 86, 95, 104, and 113, and indices of pilot subcarriers comprised in the DRU 26 whose index is 9 are −116 and 5.

19. The communication apparatus according to claim 18, wherein the predefined discrete resource blocks comprise four discrete resource blocks DRUs 52, a quantity of subcarriers of each DRU 52 in the four discrete resource blocks DRUs 52 is 52, and each DRU 52 in the four discrete resource blocks DRUs 52 comprises 48 data subcarriers and four pilot subcarriers, wherein data subcarriers comprised in a DRU 52 whose index is 1 are the same as the data subcarriers in the DRUs 26 whose indices are 1 and 6, and pilot subcarriers comprised in the DRU 52 whose index is 1 are the same as the pilot subcarriers in the DRUs 26 whose indices are 1 and 6;

data subcarriers comprised in a DRU 52 whose index is 2 are the same as the data subcarriers in the DRUs 26 whose indices are 2 and 7, and pilot subcarriers comprised in the DRU 52 whose index is 2 are the same as the pilot subcarriers in the DRUs 26 whose indices are 2 and 7;

data subcarriers comprised in a DRU 52 whose index is 3 are the same as the data subcarriers in the DRUs 26 whose indices are 3 and 8, and pilot subcarriers comprised in the DRU 52 whose index is 3 are the same as the pilot subcarriers in the DRUs 26 whose indices are 3 and 8; and data subcarriers comprised in a DRU 52 whose index is 4 are the same as the data subcarriers in the DRUs 26 whose indices are 4 and 9, and pilot subcarriers comprised in the DRU 52 whose index is 4 are the same as the pilot subcarriers in the DRUs 26 whose indices are 4 and 9.

20. The communication apparatus according to claim 18, wherein the predefined discrete resource blocks comprise two discrete resource blocks DRUs 106, a quantity of subcarriers of each DRU 26 106 in the two discrete resource blocks DRUs 106 is 106, and each DRU 106 in the two discrete resource blocks DRUs 106 comprises 102 data subcarriers and four pilot subcarriers, wherein data subcarriers comprised in a DRU 106 whose index is 1 are the data subcarriers in the DRUs 26 whose indices are 1, 3, 6, and 8, and data subcarriers whose indices are −115, 114, −119, −117, 116, and 118; and indices of pilot subcarriers comprised in the DRU 106 whose index is 1 are −122, −5, 4, and 121; and data subcarriers comprised in a DRU 106 whose index is 2 are the data subcarriers in the DRUs 26 whose indices are 2, 4, 7, and 9, and data subcarriers whose indices are −114, 115, −118, −116, 117, and 119; and indices of pilot subcarriers comprised in the DRU 106 whose index is 2 are −121, −4, 5, and 122.

* * * * *